United States Patent [19]

Wong

[11] Patent Number: 5,224,827
[45] Date of Patent: Jul. 6, 1993

[54] BALE ENCASING AND DE-CASING SYSTEM

[75] Inventor: Foo-Kong Wong, Surabaya, Indonesia

[73] Assignee: Tien Pao Liem, Singapore

[21] Appl. No.: 956,912

[22] Filed: Oct. 5, 1992

Related U.S. Application Data

[62] Division of Ser. No. 822,384, Jan. 17, 1992.

[51] Int. Cl.$^5$ .................................... B65B 69/00
[52] U.S. Cl. ........................ 53/381.4; 414/796.9; 414/796.5; 414/795.4
[58] Field of Search ............. 53/381.4, 492, 381.1; 414/796.5, 796.9, 411, 412, 796.2, 795.9, 795.8, 795.4

[56] References Cited

U.S. PATENT DOCUMENTS

| 3,844,427 | 10/1974 | Miles-Luscombe et al. | 414/795.4 |
| 3,946,880 | 3/1976 | Schmitt | 414/795.9 |
| 4,343,131 | 8/1982 | McCormick et al. | 53/526 X |
| 4,799,350 | 1/1989 | Rias | 53/449 X |
| 5,048,267 | 9/1991 | Kudo et al. | 53/492 |
| 5,169,284 | 12/1992 | Berger et al. | 414/796.9 |

FOREIGN PATENT DOCUMENTS 2651746 3/1991 France .................... 220/4.32

Primary Examiner—James F. Coan
Attorney, Agent, or Firm—Fliesler, Dubb, Meyer & Lovejoy

[57] ABSTRACT

An apparatus for encasing a bale of compressed, expandable material, including a compliant sleeve, surrounding the bale of material; first and second sideframes arranged at opposing sides of the bale; and first and second slats, arranged at opposing sides of the bale and between the first and second sideframes, the slats interlocking with the sideframes for retaining the sideframes in position.

Another aspect of the invention is a warehousing system for storing and retrieving bales of material. The system includes storage means for encasing the bales of material. The storage means includes a compliant sleeve, surrounding the material; first and second sideframes arranged at first and second opposing sides of the bale; and first and second slats, arranged at third and fourth opposing sides of the bale and between the first and second sideframes, the slats interlocking with the sideframes for retaining the sideframes in position. The system also includes automated means for removing the storage means from the bales of material. In one aspect the automated means includes means for positioning one or more of the bales in a de-casing region, and de-casing means for simultaneously securing the slats and removing the sideframes. In another aspect of the invention, the automated means further includes means for stacking the removed sideframes, and means for stacking storage pallets on which a plurality of bales are stacked.

10 Claims, 52 Drawing Sheets

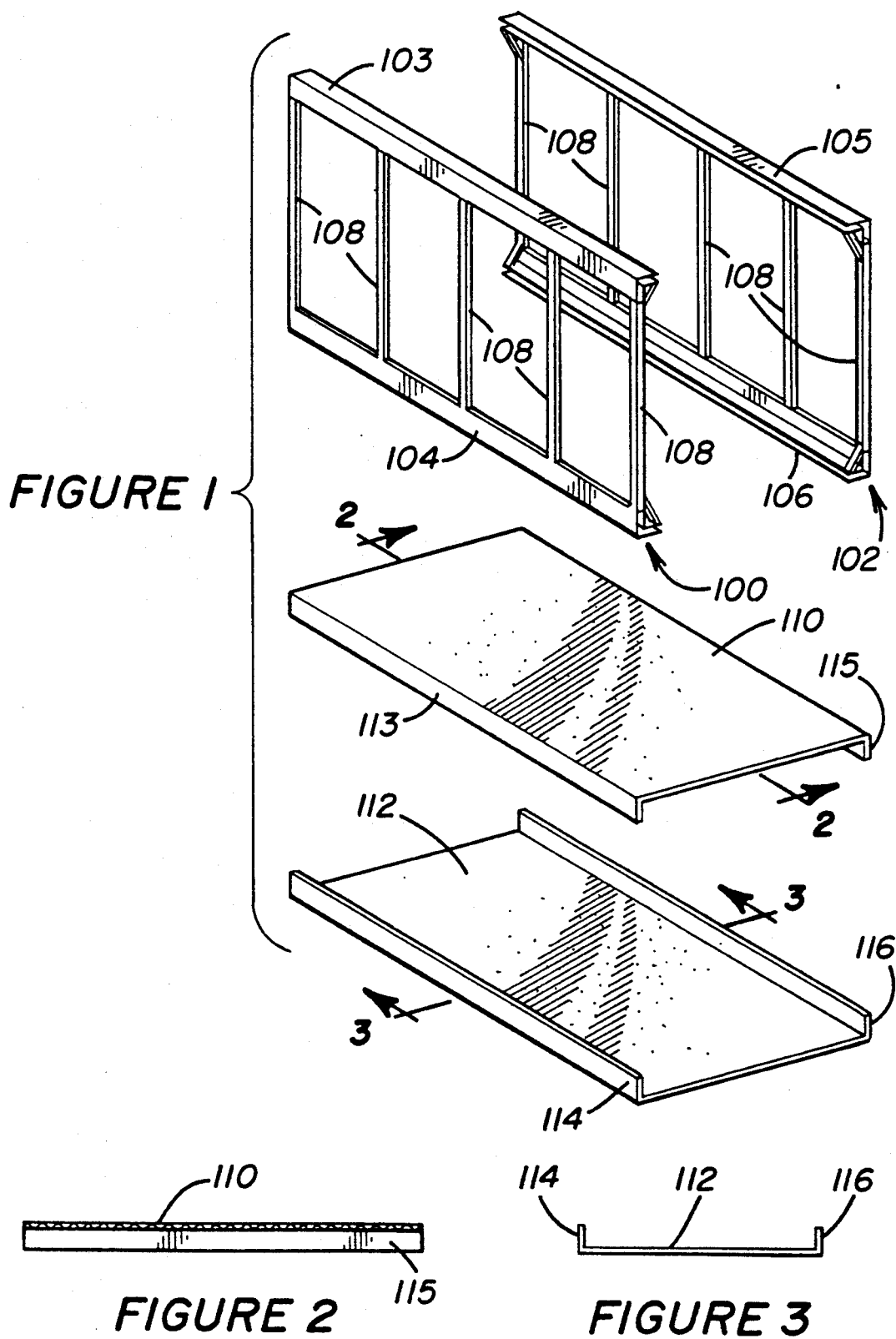

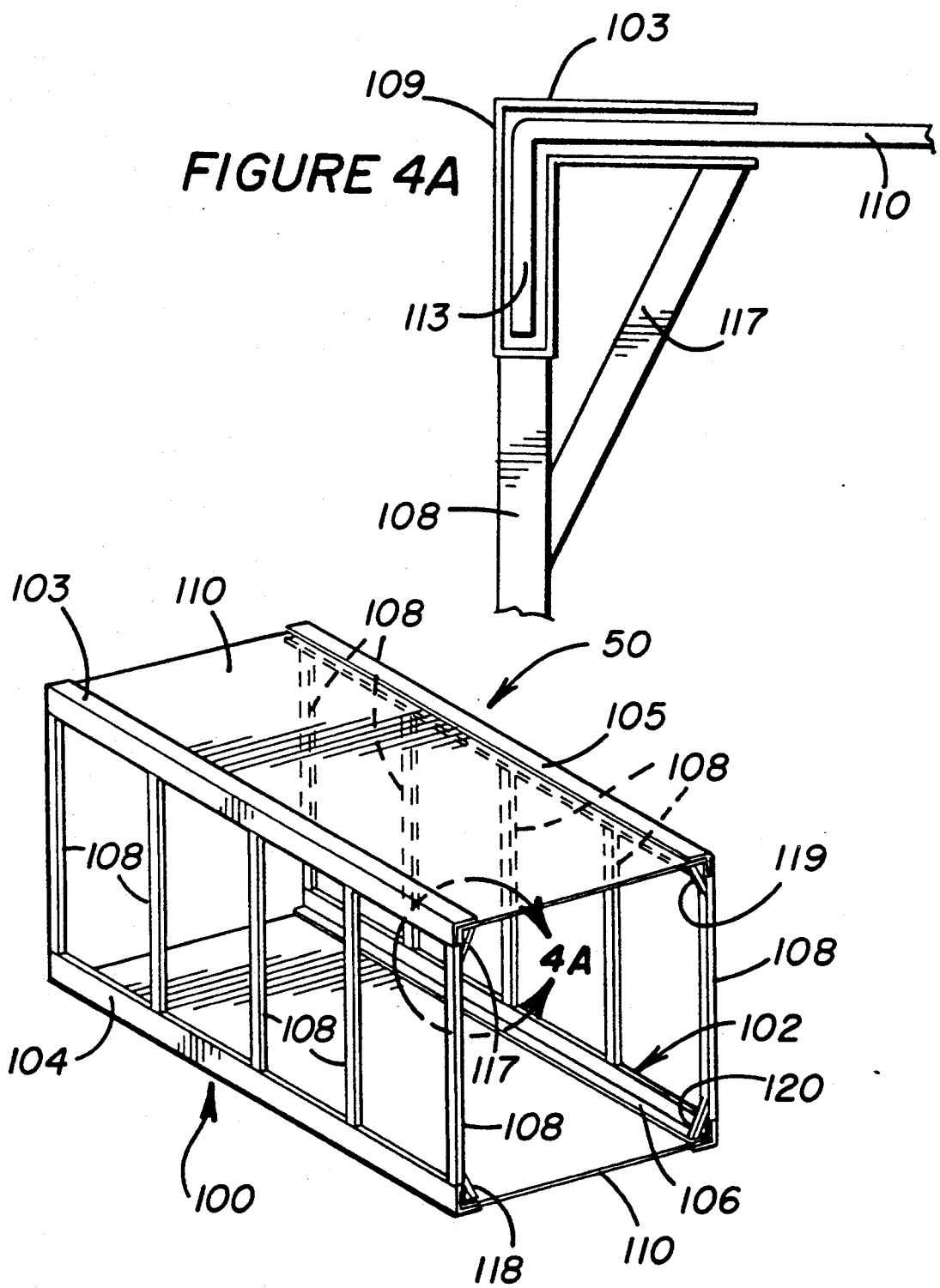

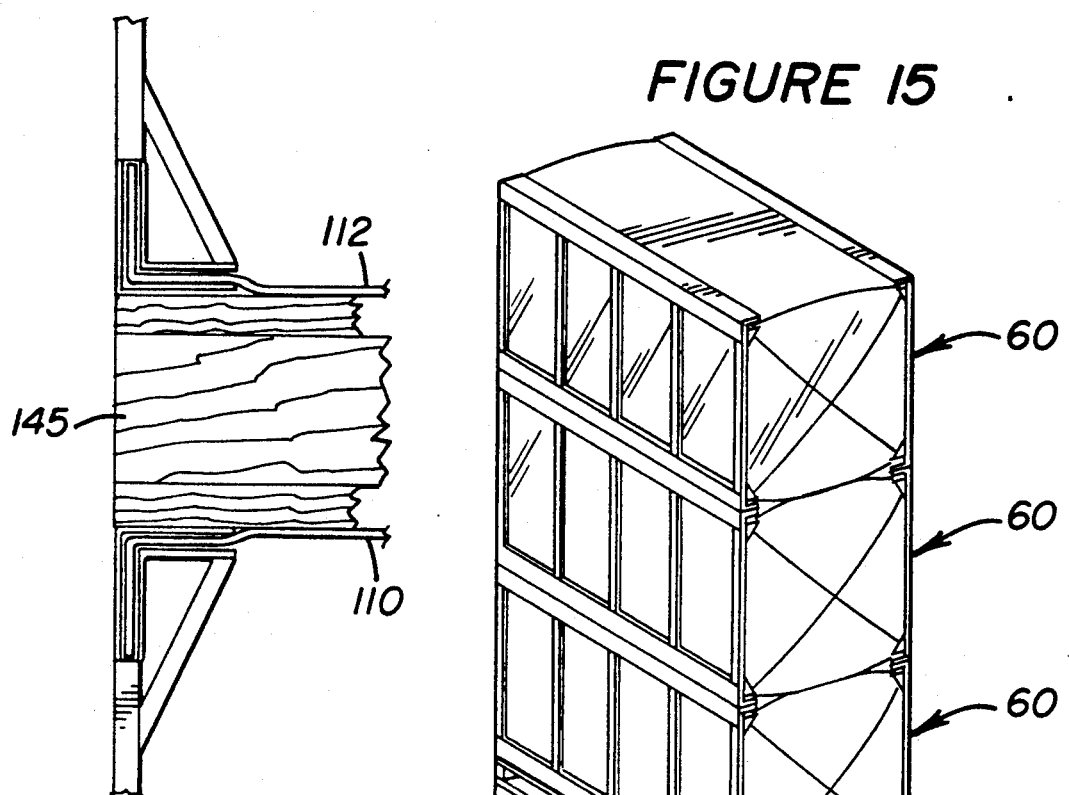
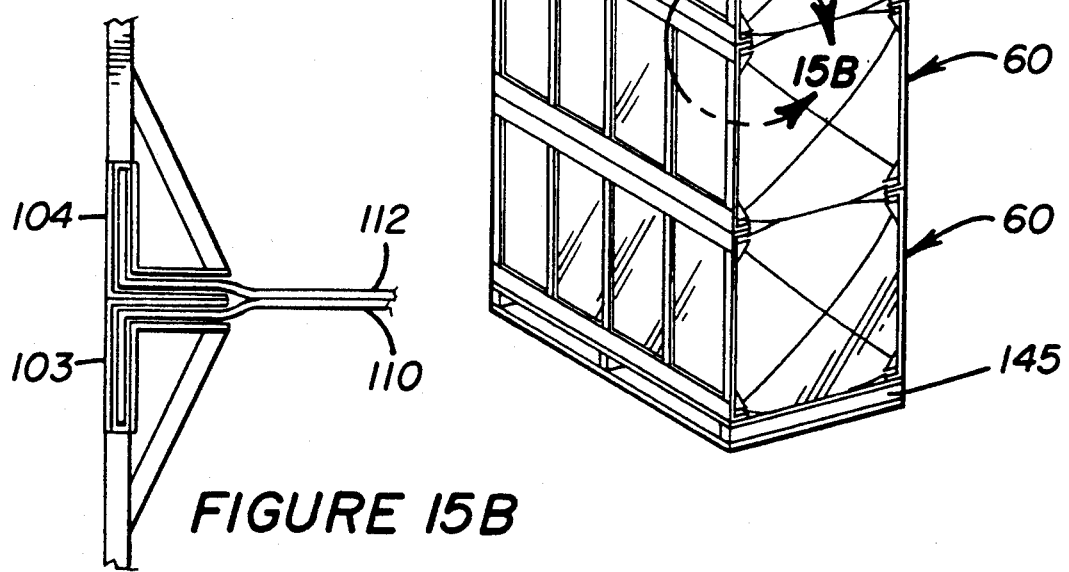
FIGURE 15
FIGURE 15A
FIGURE 15B

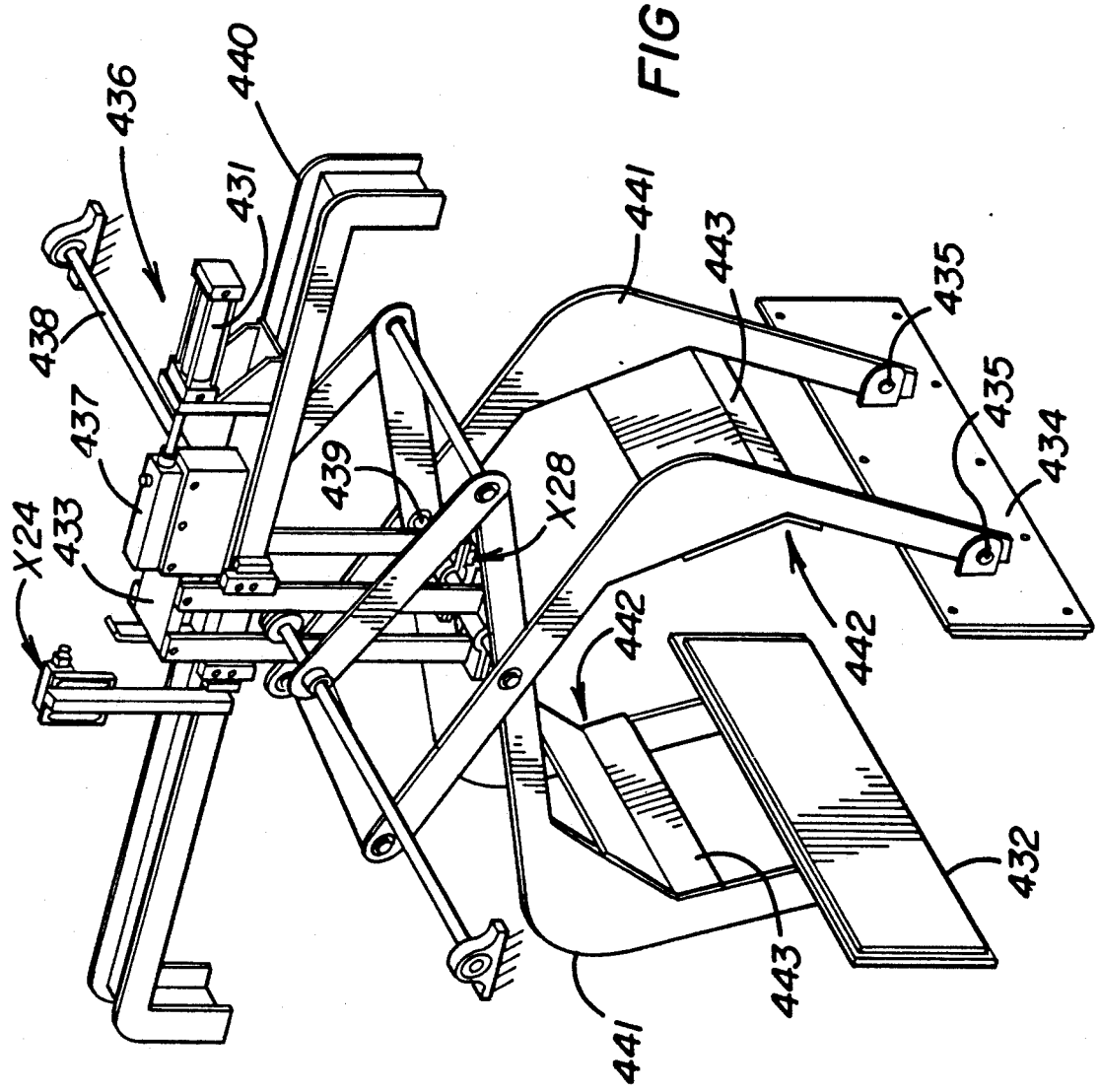

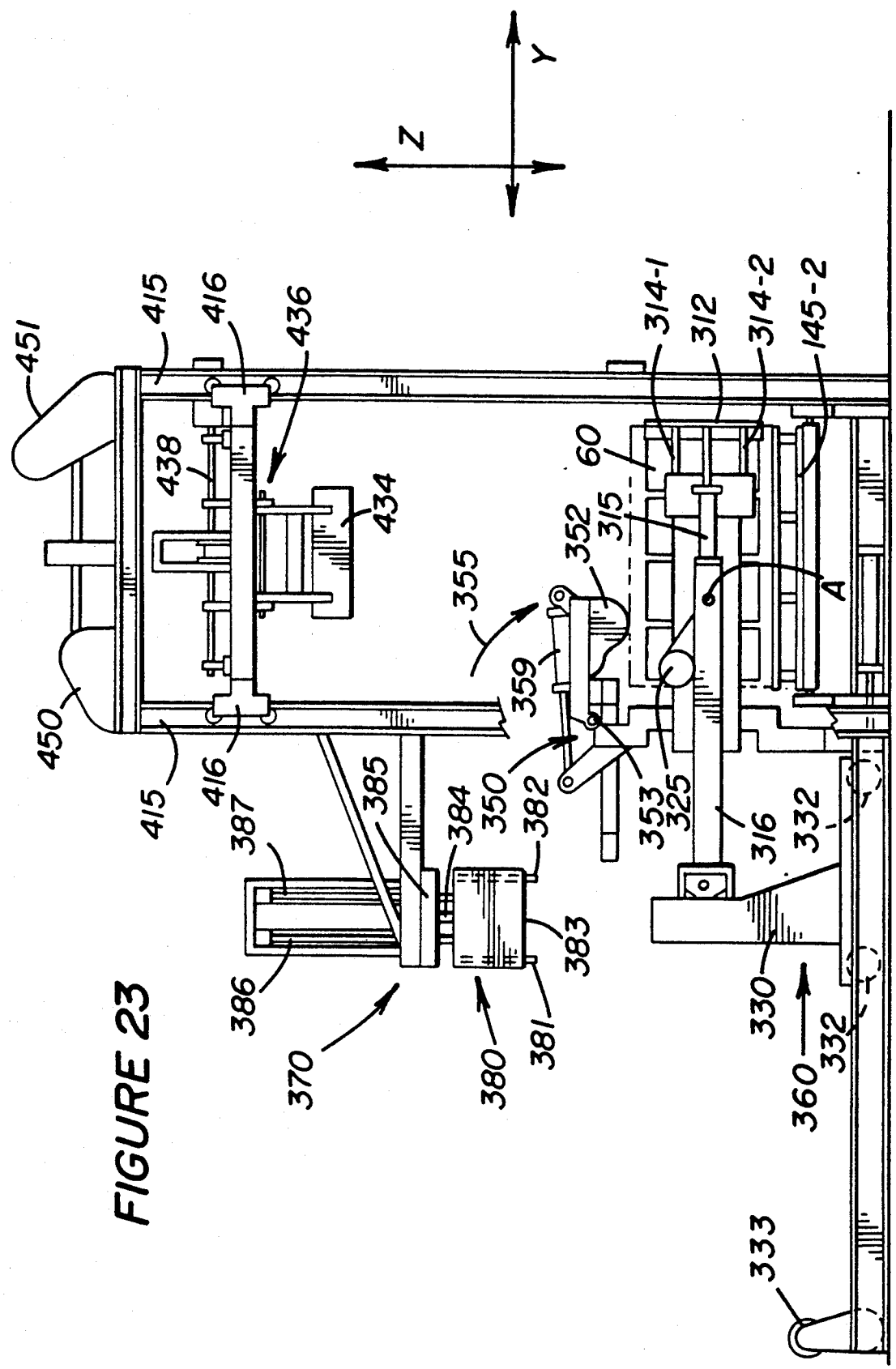

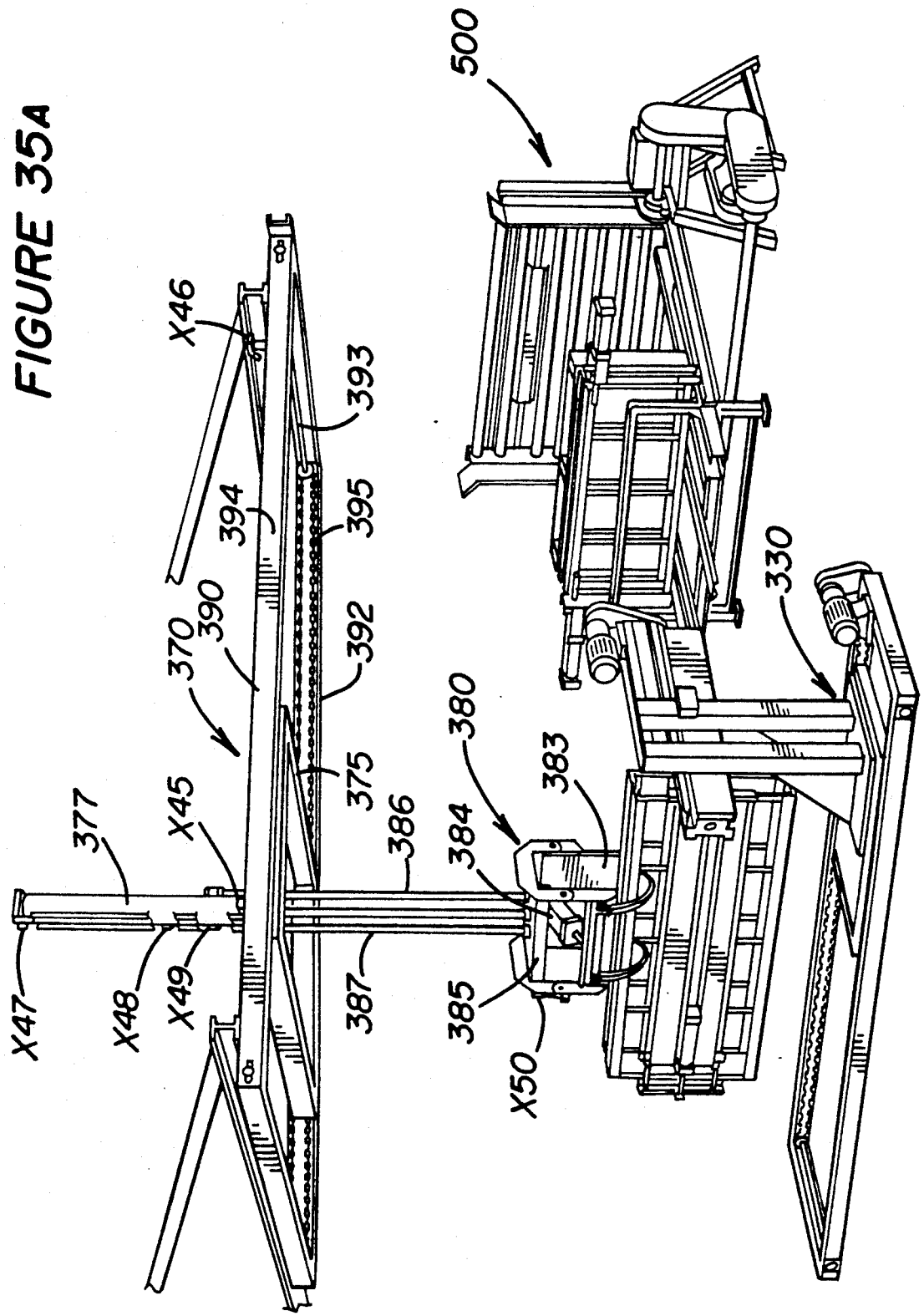

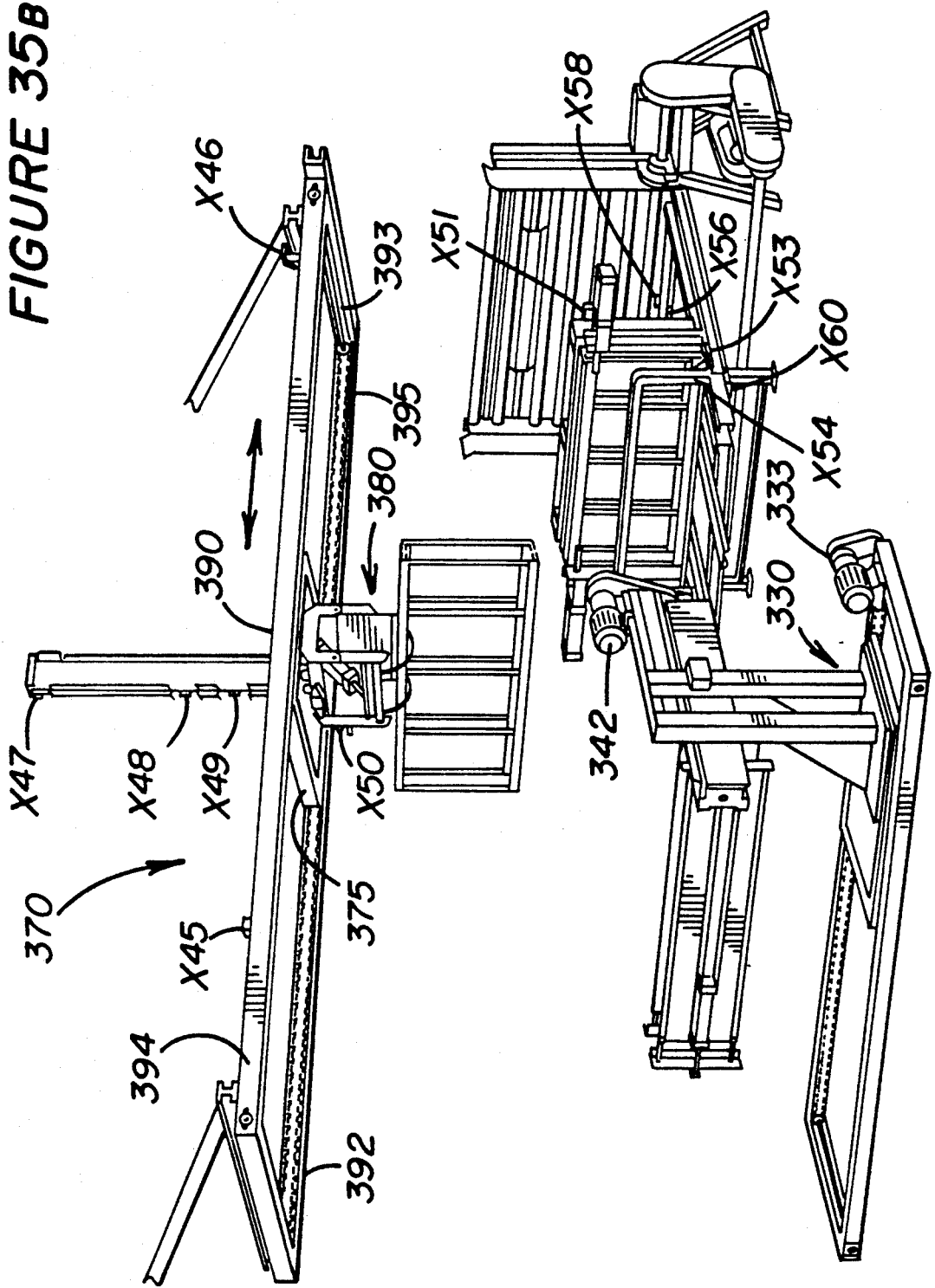

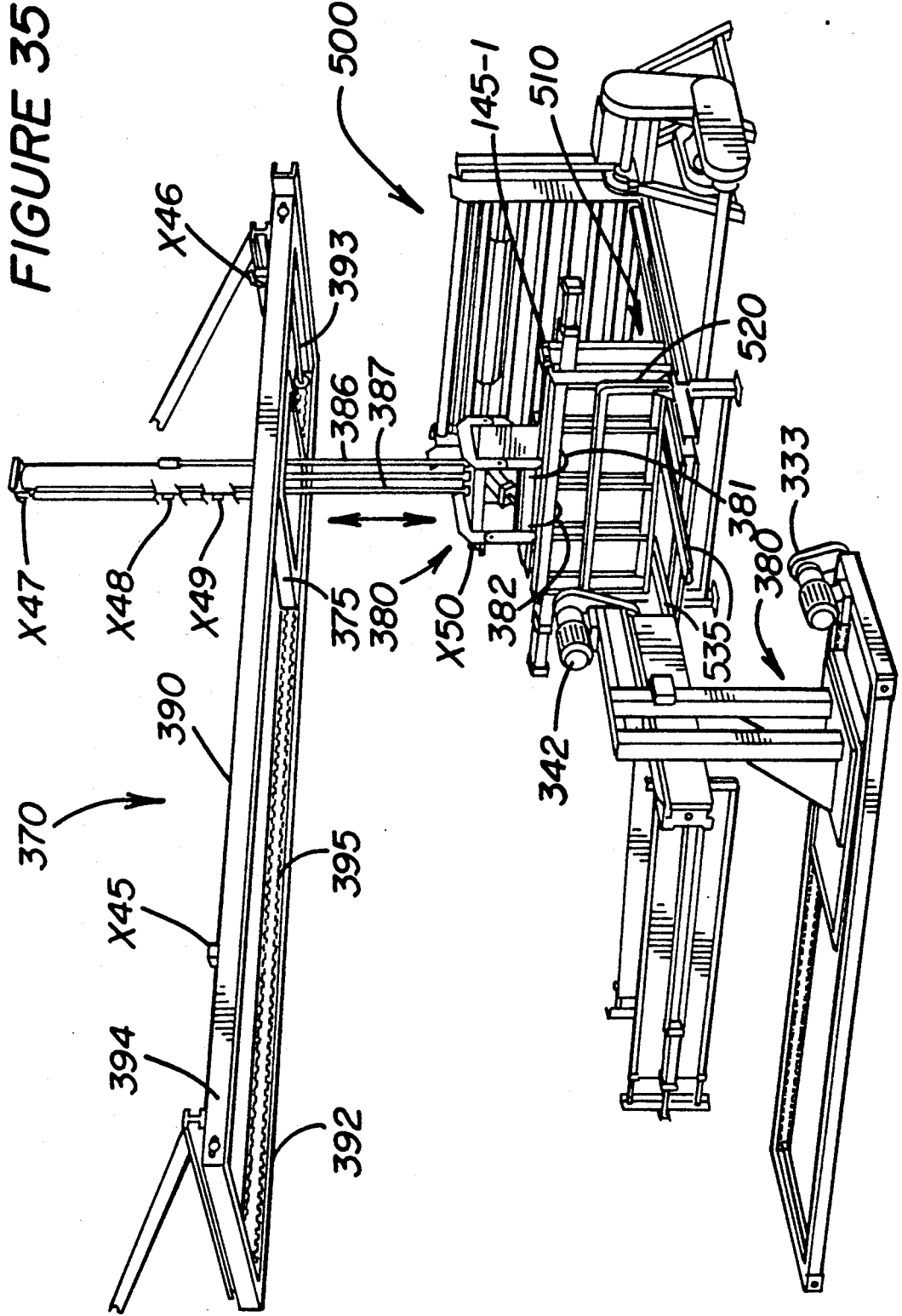

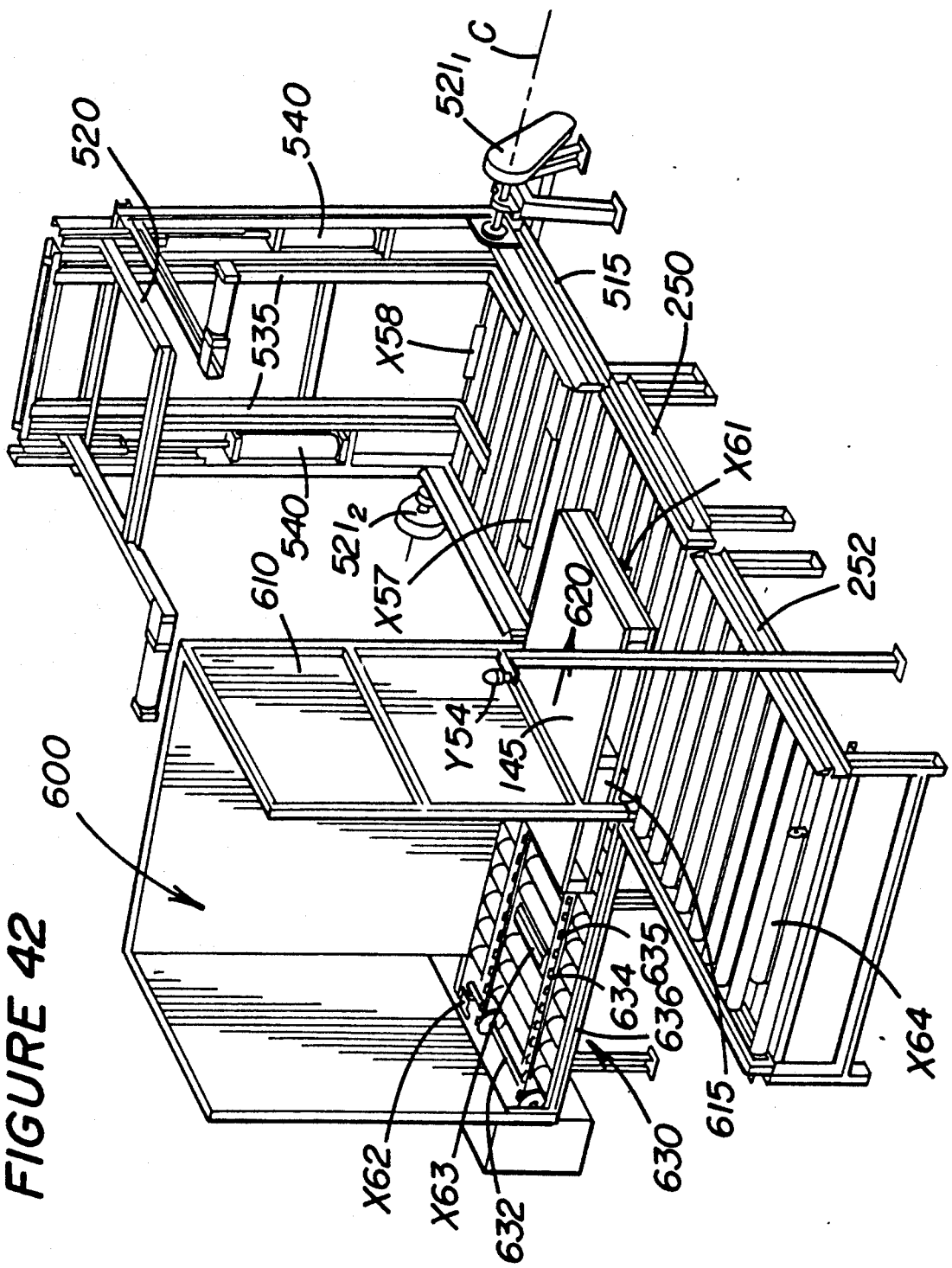

BALE ENCASING AND DE-CASING SYSTEM

This application is a division of Ser. No. 07/822,384, filed Jan. 17, 1992.

BACKGROUND OF THE INVENTION

1. Field of the Invention

The invention relates to a system for storing, encasing, and easily unpacking a quantity of loose, compressed material having the tendency to expand

2. Description of the Related Art

Loose, compressible materials, such as tobacco, peat moss, and asbestos, have historically been packed into large, bundled block form or "bales" to facilitate storage and manufacturing manipulation of the material. It is advantageous to store such bales in a stacked arrangement thereby increasing the efficiency of the storage area used for housing the bales prior to processing. To provide greater stacking stability, containers may be provided surrounding the bales. Preferably, such containers are manufactured to be lightweight and durable, and are designed for ease in application to and removal from the baled material.

Often, baled materials are stored in large bags which are sealed after the bale is placed therein. Generally, the baled material is compressed into a volume sufficient to allow the bag to be fitted over the material and the material thereafter inserted into the bag. Although such bags may be pre-formed to have a block-like shape, which allows the material to be packaged and stacked for storage purposes, the bagged bales tend to lose their squared shape, bulging under the weight of other bales stacked thereon, thereby creating an unstable stacking arrangement.

One solution to the problem of bulging is conventionally known as a "tersa" bale and comprises rigidly strapping pieces of wooden board on the top and bottom portions of a tobacco bale. The bale is then rotated 90° on its side such that the weight of stacked bales rests on the rigid wood frames. However, tersa bales also suffer from stacking instability problems. Further, increasing the stacking integrity of stored bales through assembly of tersa bales requires that the bales be strapped, a process generally designed to resist the tendency of the baled material to expand. Such strapping of the bales is usually an inefficient, time intensive process.

In addition, in high volume production processing of baled material, with conventional casing systems, it is generally necessary to manually remove the casing in order to proceed with material processing. Such manual processing requires significant human time, generally increasing the cost of the production process. Thus it is desirable to provide both a casing system which is easily removed from the baled material and one in which an automated process may be utilized to remove the case from the baled material.

Thus, an object of the invention is to provide an improved casing method and apparatus for storing compressed, expandable material.

A further object of the invention is to provide such an improved casing method and apparatus allowing the encased material to be easily and stably stacked for storing purposes.

It is further desireable to provide the casing materials in an automated process, thereby simplifying encasing and de-casing of bales of material.

It is a further object of the invention to provide an automated means of removing the packing material and casing from the stored material.

SUMMARY OF THE INVENTION

In one aspect, the invention comprises an apparatus for encasing a bale of compressed, expandable material. The apparatus for encasing includes a compliant sleeve, surrounding the bale of material; first and second sideframes arranged at opposing sides of the bale; and first and second slats, arranged at opposing sides of the bale and between the first and second sideframes, the slats interlocking with the sideframes for retaining the sideframes in position.

Another aspect of the invention comprises a method for encasing an expandable material in block form. The method generally comprises the steps of: (1) surrounding the block of material with a compliant sleeve to completely encase the material; (2) providing a first and second rigid support frames at a first and second opposing sides of the block of material, each of the frames having first and second slots provided at first and second edges, respectively, of the frames; and (3) inserting into the frame slots a first and second slat members, the slat members being arranged at third and fourth opposing sides of the block and between the support frames.

Yet another aspect of the invention is a system for storing and retrieving bales of material. The system includes storage means for encasing the bales of material. The storage means includes a compliant sleeve, surrounding the material; first and second sideframes arranged at first and second opposing sides of the bale; and first and second slats, arranged at third and fourth opposing sides of the bale and between the first and second sideframes, the slats interlocking with the sideframes for retaining the sideframes in position. The system also includes automated means for removing the storage means from the bales of material. In one aspect the automated means includes means for positioning one or more of the bales in a de-casing region, and de-casing means for simultaneously securing the slats and removing the sideframes. In another aspect of the invention, the automated means further includes means for stacking the removed sideframes, and means for stacking storage pallets on which a plurality of bales are stacked.

BRIEF DESCRIPTION OF THE DRAWINGS

The invention will be described with respect to the particular embodiments thereof. Other objects, features, and advantages of the invention will be apparent with reference to the specification and the drawings in which:

FIG. 1 is a perspective view of the slotted sideframe members, and top and bottom interlocking members, of the casing structure in accordance with the present invention.

FIG. 2 is a cross-section along line 2—2 in FIG. 1.

FIG. 3 is a cross section along line 3—3 in FIG. 1.

FIG. 4 is a perspective view of an assembled case structure in accordance with the present invention.

FIG. 4A is an enlarged, cross section view of area 4A in FIG. 4.

FIG. 15 is a perspective view of a stacked series of casing members in accordance with the present invention.

FIG. 15A is an enlarged, cross sectional view of area 15A in FIG. 15 showing the relationship of the stacked casing members to a wooden pallet separating a series of three stacked casing structures.

FIG. 15B is an enlarged, cross sectional view of area 15B showing the relationship of adjacent casing frames in a stacked relationship.

FIG. 22A-22B are enlarged, partial views of the tong structure utilized to lift and carry encased bales in the encasing and de-casing apparatus of the present invention.

FIG. 23 is a view along line 23—23 in FIG. 18 showing the operation of the bale positioning apparatus, frame removal apparatus, and sideframe transport apparatus of the present invention.

FIGS. 35A-35C are perspective views of the sideframe stacking apparatus of the present invention illustrating movement of interdigited sideframes from the de-casing apparatus of the present invention to the case stacker apparatus.

FIGS. 40-42A are perspective views of the sideframe stacking apparatus of the de-casing system of the present invention illustrating the removal of stacked sideframes from the de-casing system.

DESCRIPTION OF THE PREFERRED EMBODIMENT

Figure 5:
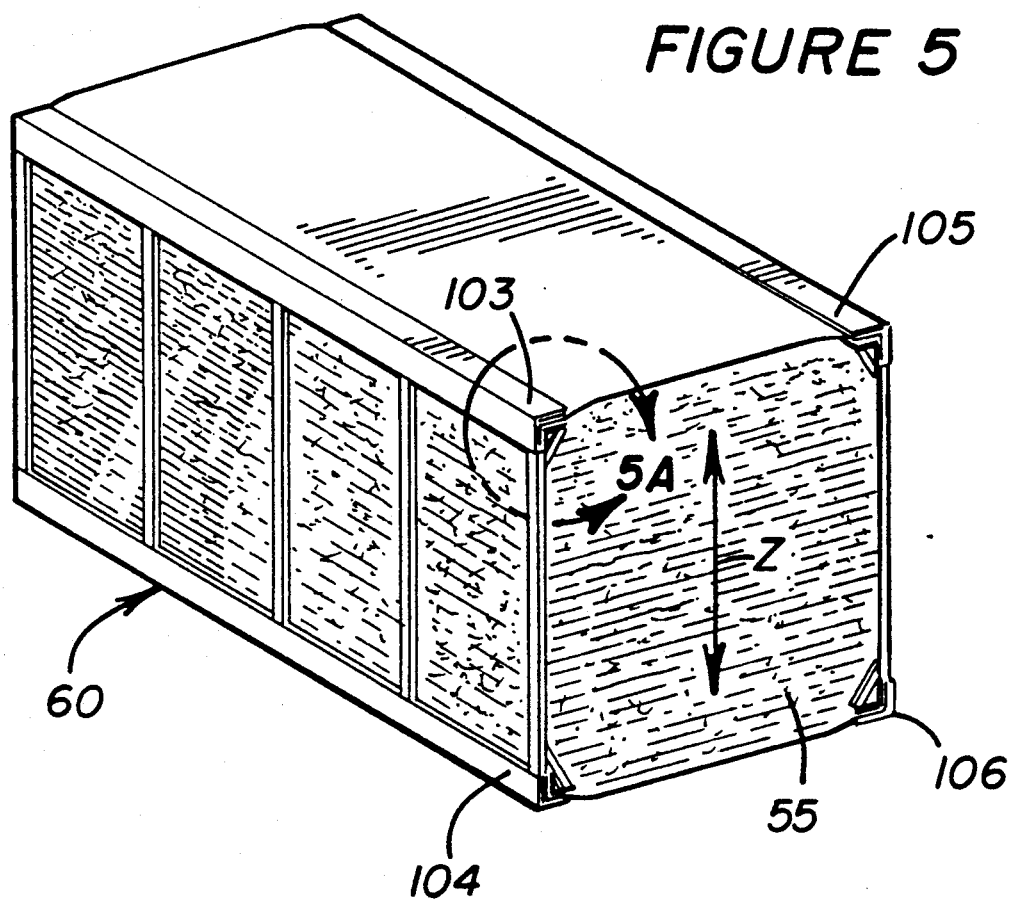
FIG. 5 is a perspective view of an encased bale demonstrating the effect of the expansive force of the material on the top and bottom members of the case.

The system for efficiently encasing and de-casing a bale of material generally includes an improved casing structure which takes advantage of the tendency of a compressed material to expand against the force of compression, and an automated system for efficiently applying the casing structure to and from a bale of material to facilitate further processing of the material. In addition, an automated case removal or "de-casing" system is provided for moving the improved casing structure form the bale of compressed material, and conducting successive case removal operations in an orderly manner.

In general, a bale of material will be provided in the casing structure during an encasing process. Once secured in the casing structure, the baled material, such as tobacco, may be stored indefinitely in a convenient and stable manner, until further processing of the material is desired. At that time, the automated de-casing system may be utilized to remove the bales of material from the casing structure and provide baled material subsequent processing steps. In one embodiment, the de-casing system includes means for storing the component parts of the casing structure and shipping pallets used to store and transport encased bales in an orderly, automated manner.

The novel casing structure of the present invention will be described with reference to FIGS. 1-5. A processes for placing encased bales in the casing structure will be described with reference to FIGS. 6-4. The unique storage aspects of the casing system of the present invention are discussed with reference to FIGS. 15-16. Finally, the automated de-casing system for removing the casing structure from baled material is discussed with reference to FIGS. 17-49.

FIG. 1 shows a perspective view of the component parts of a casing structure of the present invention including identical slotted steel sideframe members 100,102 and interlocking members 110,112 used in conjunction therewith. Generally, interlocking members 110,112 may be comprised of corrugated cardboard material, as shown in FIG. 2. Sideframe members 100,102 include horizontal, slotted, L-shaped members 103-106 coupled by vertical struts 108 joining respective ones of members 103 and 104, and 105 and 106. Interlocking members 110,112 include vertical bosses 113-116 (FIG. 3) formed therein which, as described below, allow interlocking members 110,112 to secure sideframe members 100,102 adjacent a bale of material 55.

As shown in FIG. 4, interlocking members 110,112 may be inserted into slotted sideframe members 100 102 to form an assembled frame structure 50. As detailed in FIG. 4A, each slotted L-shape member 103-106 includes L-shaped slot 109 for receiving interlocking members 110-112, including vertical bosses 113-116; FIG. 4A, for example, depicts L-shaped member 103 and slot 109 receiving boss 113. Frames 100,102 also include trusses 117-120 on one end of each frame member 100,102 in order that the frames 100,102 may be carried along by the bale of material 55 while the latter is being extruded.

Figure 5A:
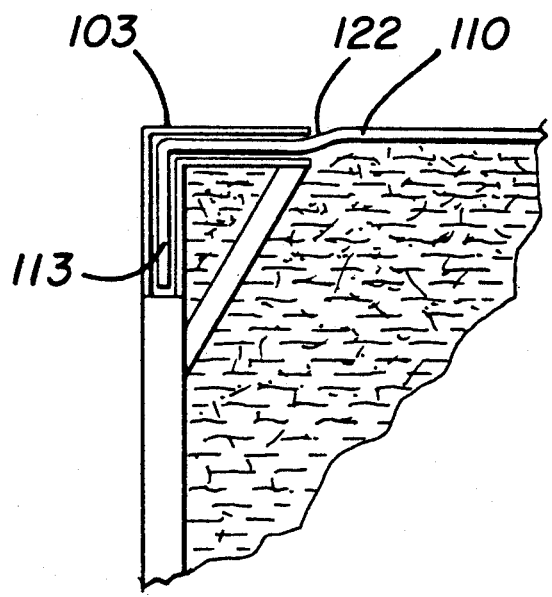
FIG. 5A is an enlarged cross sectional view of area 5A in FIG. 5.

In FIGS. 5 and 5A, assembled casing structure 50 is shown surrounding bale 55 of material encased therein. FIGS. 5 and 5A demonstrate the nature of casing structure 50 to incorporate the expansion force of bale 55 to increase the integrity of casing structure 50. Packing material 55 may comprise, for example, tobacco, a material which, When compressed, exhibits a tendency to expand after compression in a direction along the Z-axis in FIG. 5. As detailed in FIG. 5A, the force along the Z-axis tends to expand interlocking member 110 in a direction divergent from member 112. This force creates crease 122 in member 110, and associated creases adjacent L-shaped members 104-106 which, in conjunction with the positioning vertical bosses 113-116 in slots 109, retain sideframes 100,102 adjacent bale 55. As a result, no strapping of the casing structure is required to maintain sideframes 100,102 against packed material 55. Further, the expansion force of packing material 55 and the tension provided between sideframe members 100,102 maintain structure 50 as a rigid integral unit.

Figure 6:
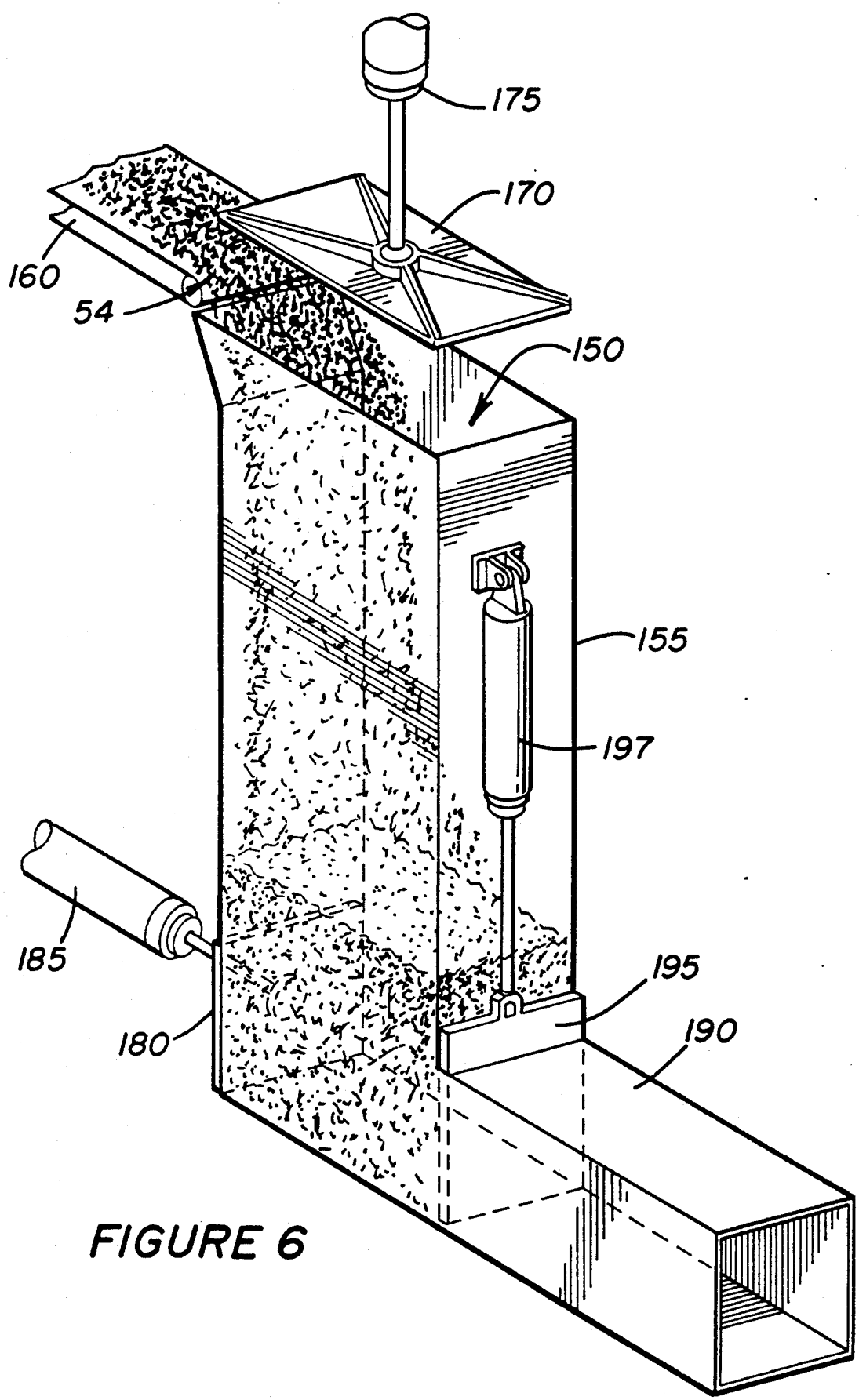
FIG. 6 is a perspective view of a baling press used in conjunction with the casing structure of the present invention.

FIGS. 6-14 illustrate the process utilized for assembling the packing material, such as tobacco, into casing structure 50 in accordance with the present invention. FIG. 6 generally shows baling press 150 comprising compression chute 155, into which the packing material 54 is loaded in loose form from conveyor 160. Baling press 150 includes baling ram 170 powered, for example, by hydraulic cylinder 175, for pressing loose material 54 into the packed volume required. Also included is extrusion ram 180, powered, for example, by pneumatic cylinder 185. Extrusion ram 180 is utilized to force the baled material 54 through a extrusion chute 190. Sliding door 195, operated by hydraulic cylinder 197, opens to allow a compressed bale to be positioned into extrusion chute 190 when the bale is pushed into chute 190 by extrusion ram 180, and closes to form a secure baling environment within chute 150.

Figure 7:
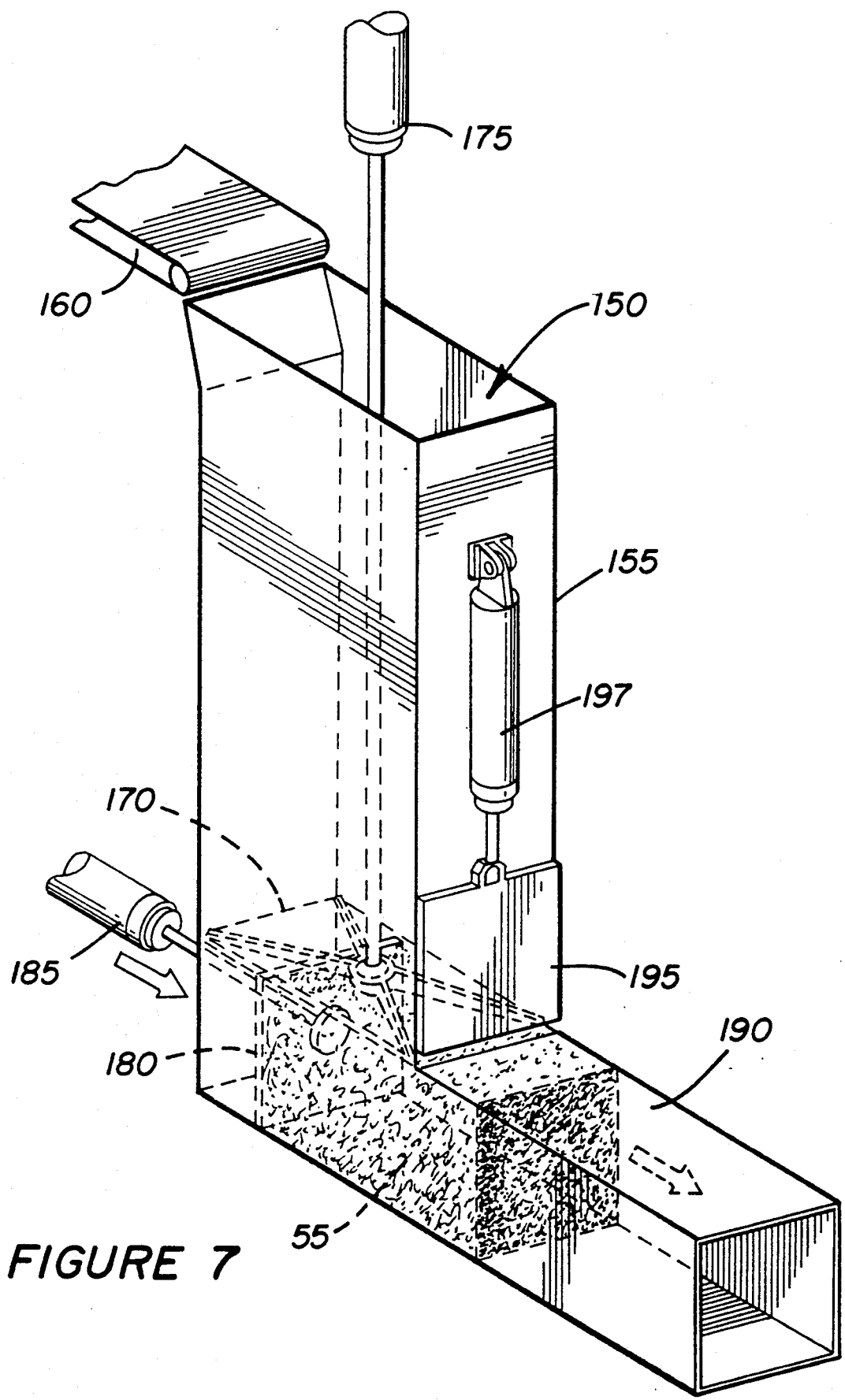
FIG. 7 is a perspective view of the press of FIG. 6 demonstrating the process for pressing material into a volume suitable for provision into the casing structure of the present invention.
Figure 8:
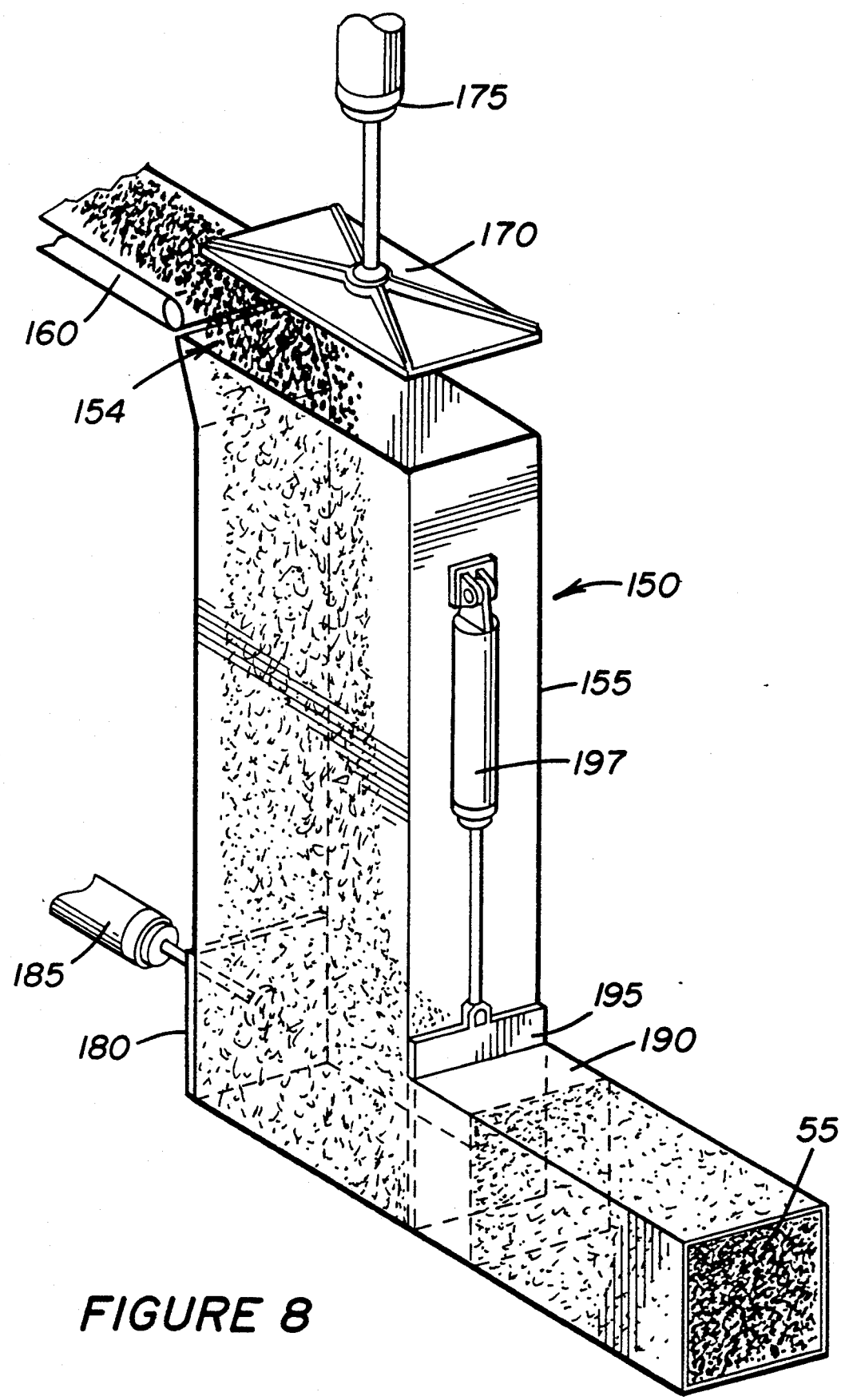
FIG. 8 is a perspective view of the press of FIG. 6 demonstrating the extrusion of a bale of material into a bale extrusion chute of the press and the provision of additional loose material into the press.
Figure 9:
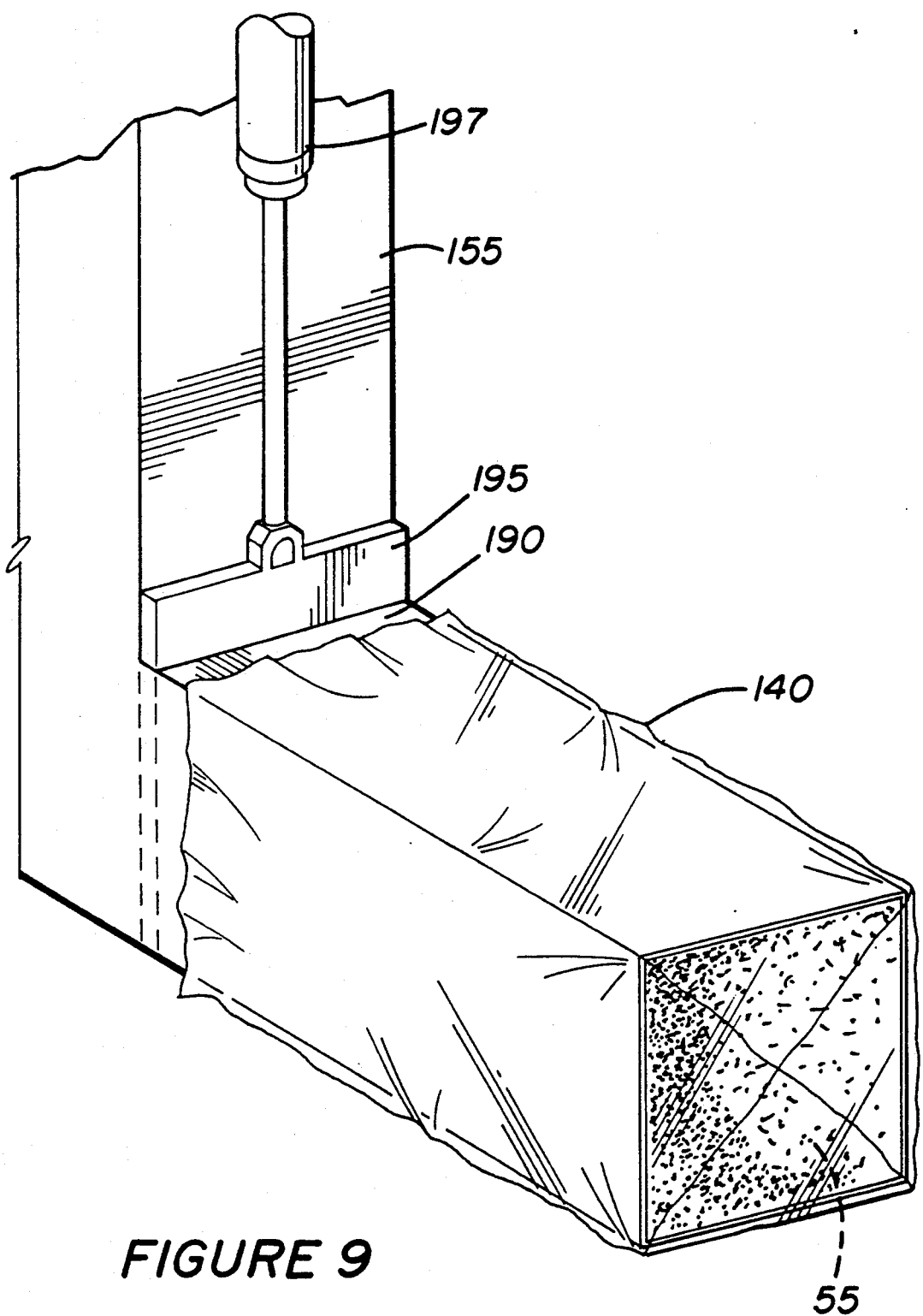
FIG. 9 is an enlarged, perspective view of the extrusion chute of the press of FIG. 6 showing the provision of a bag as a first step in assembling a casing about a bale.

As shown in FIG. 7, after loading conveyor 160 provides a predetermined amount of loose material 54 into compression chute 150, baling ram 170 is extended to compress the material into a specified volume, the volume being sufficient to allow bale 55 to fit into extrusion chute 190. After compression, baling ram 170 remains in the extended position as door 195 is opened and extrusion ram 180 forces compressed bale 55 into extrusion sleeve 190. As shown in FIG. 8, after compressed bale 55 of material has been provided into extrusion chute 190, door 195 is closed, rams 170 and 180 retracted, and additional loose material 54 may be provided by loading conveyor 160 into compression chute 155.

Figure 10:
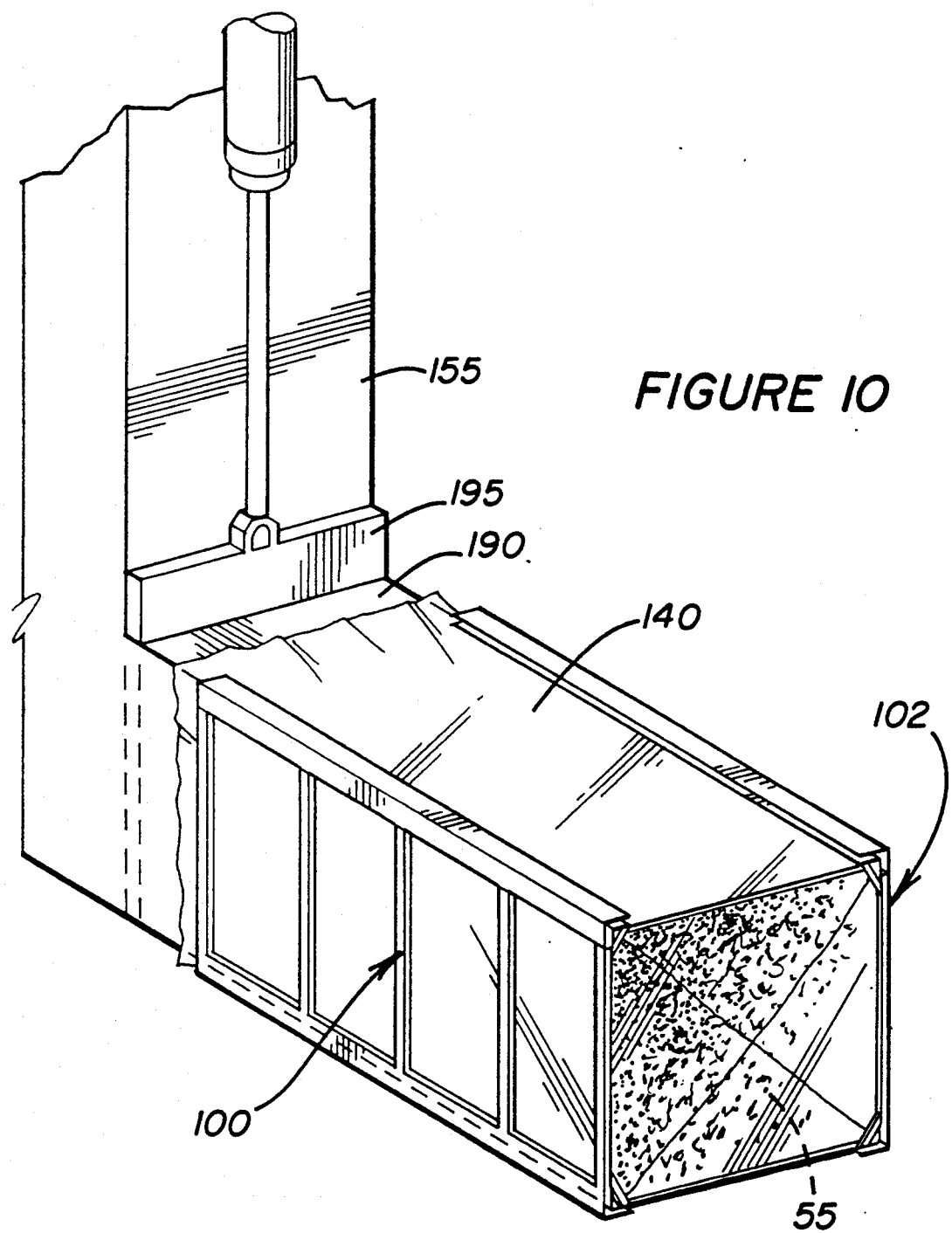
FIG. 10 is a enlarged, perspective view of the bale extrusion chute shown in FIG. 9 showing the slotted sideframes of FIG. 1 applied thereto.
Figure 11:
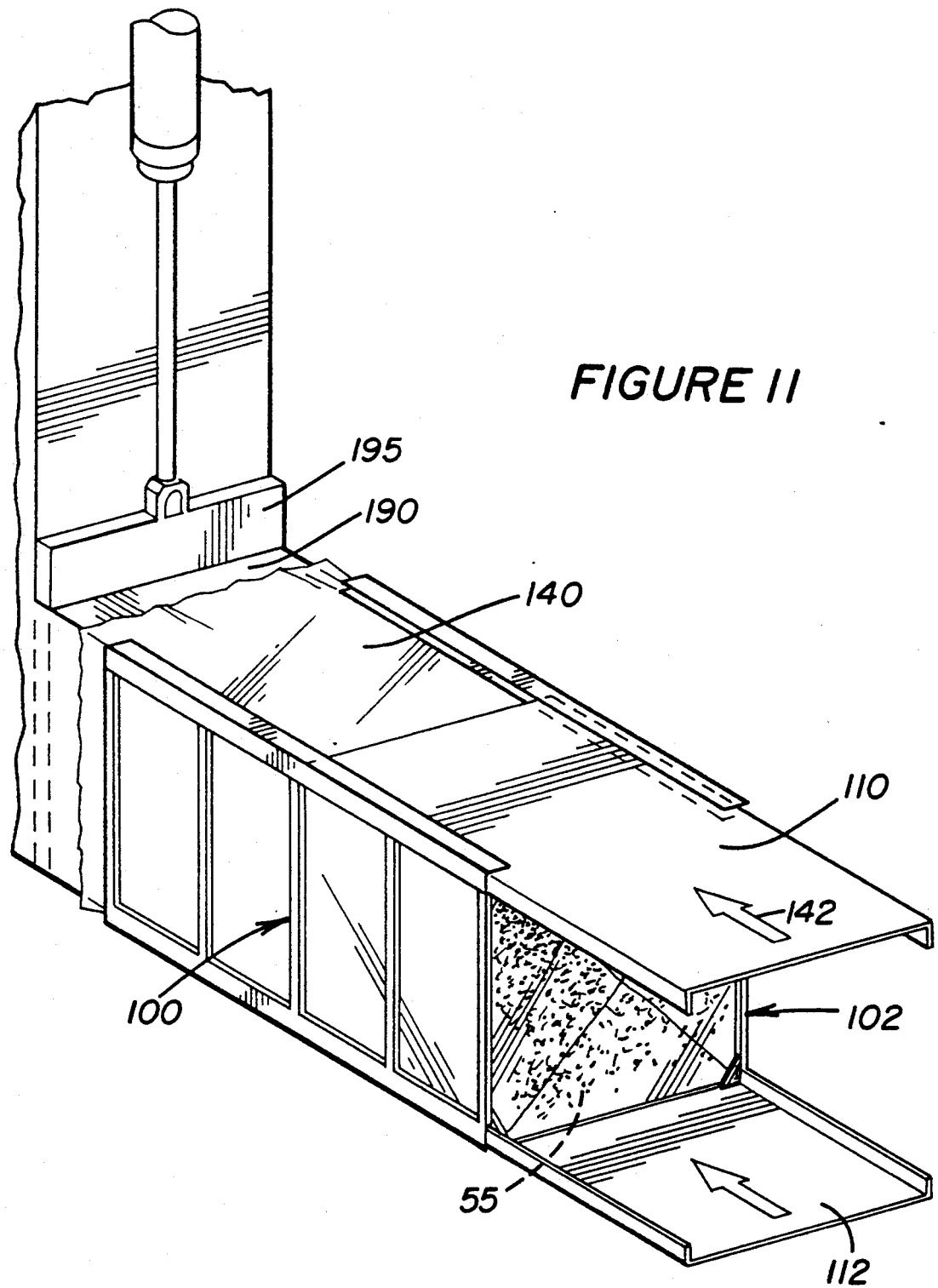
FIG. 11 is an enlarged, perspective view of the bale extrusion chute shown in FIG. 9 showing provision of interlocking members to the slotted sideframes.
Figure 12:
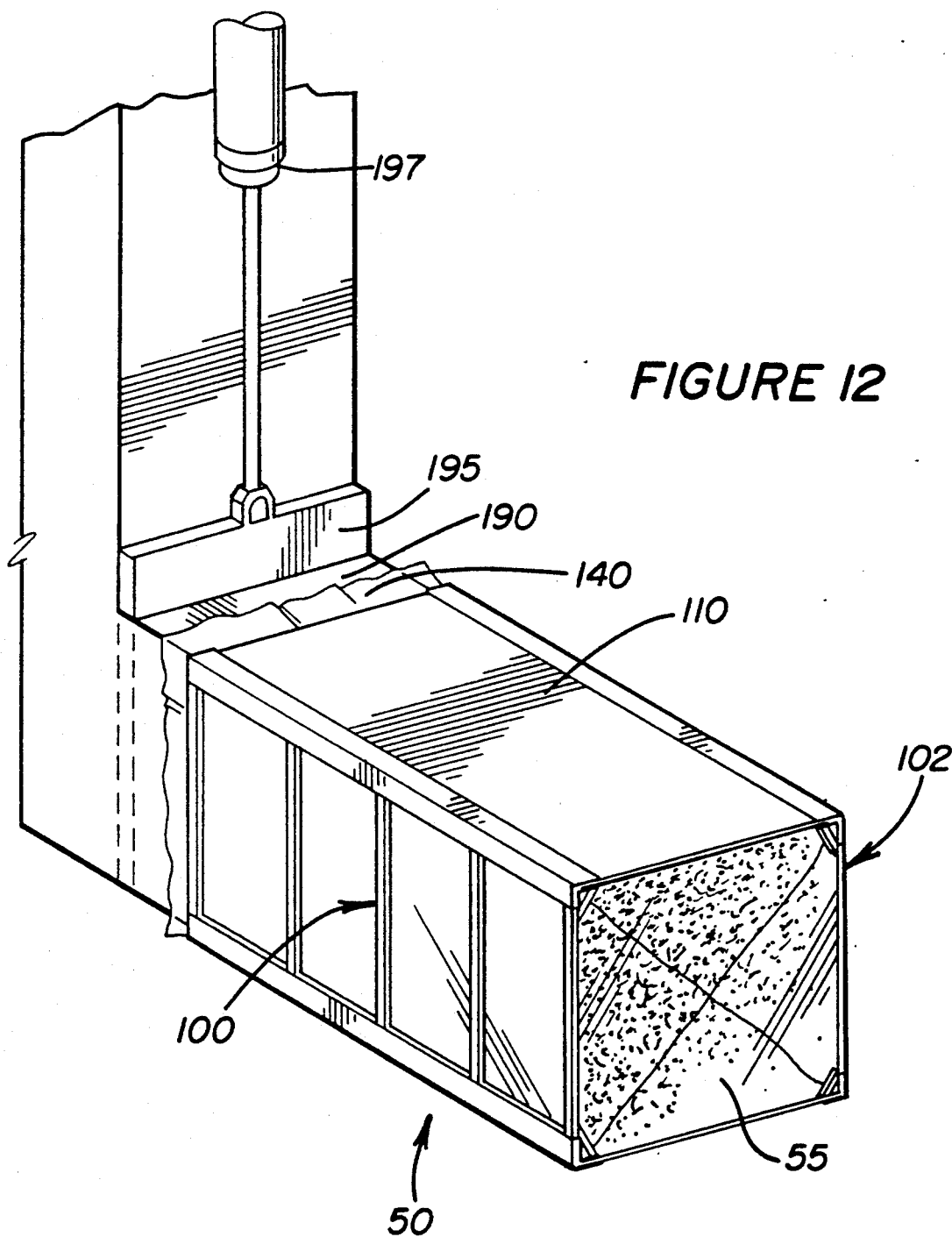
FIG. 12 is an enlarged, perspective view of the bale extrusion chute of FIG. 9 showing an assembled casing structure surrounding the extrusion chute.

Prior to, or concurrent With, the loading of additional loose material 54 into compression chute 155, and while compressed bale 55 remains in chute 190, bag 140 is placed over the exterior of extrusion chute 190. Bag 140 may be comprised of paper or, in the embodiment shown in FIG. 9, polythene. As shown in FIG. 10, after bag 140 is placed extrusion chute 190, sideframes 100 and 102 are placed on either side, respectively, of extrusion chute 190. It should be understood that since sideframes 100,102 are identical, the particular arrangement of the sideframes is of no consequence as long as trusses (117-120) are provided at the open end of extrusion chute 190 to allow members 100,102 to fit securely on chute 190. Thereafter, as shown in FIG. 11, interlocking members 110 and 112 are inserted into sideframes 100,102 along the direction of arrows 142, as discussed above with reference to FIG. 4. As shown in FIG. 12, assembled casing structure 50 is thus positioned adjacent extrusion chute 190 and in a position to receive bale 55. Bag 140, sideframes 100,102, and interlocking members 110,112 are generally applied to the extrusion chute 190 by a manual loading process. As will be recognized by those skilled in the art, this assembly process may be readily automated for increased efficiency in speed and operation.

Figure 13:
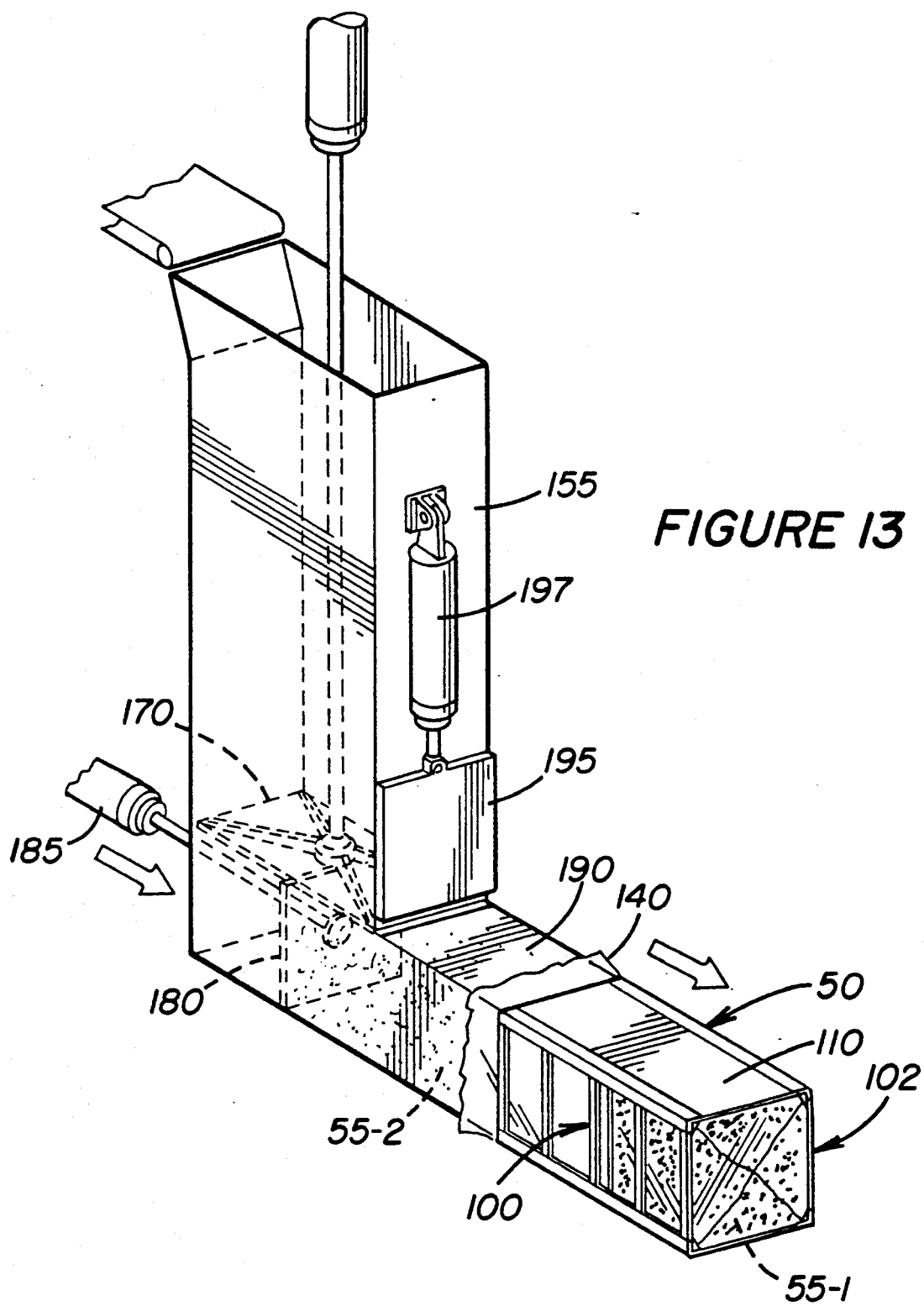
FIG. 13 is a perspective view of the baling press shown in FIG. 6 and the process by which a bale, located in the extrusion chute, is forced out of the chute and into the casing structure of the present invention.
Figure 14:
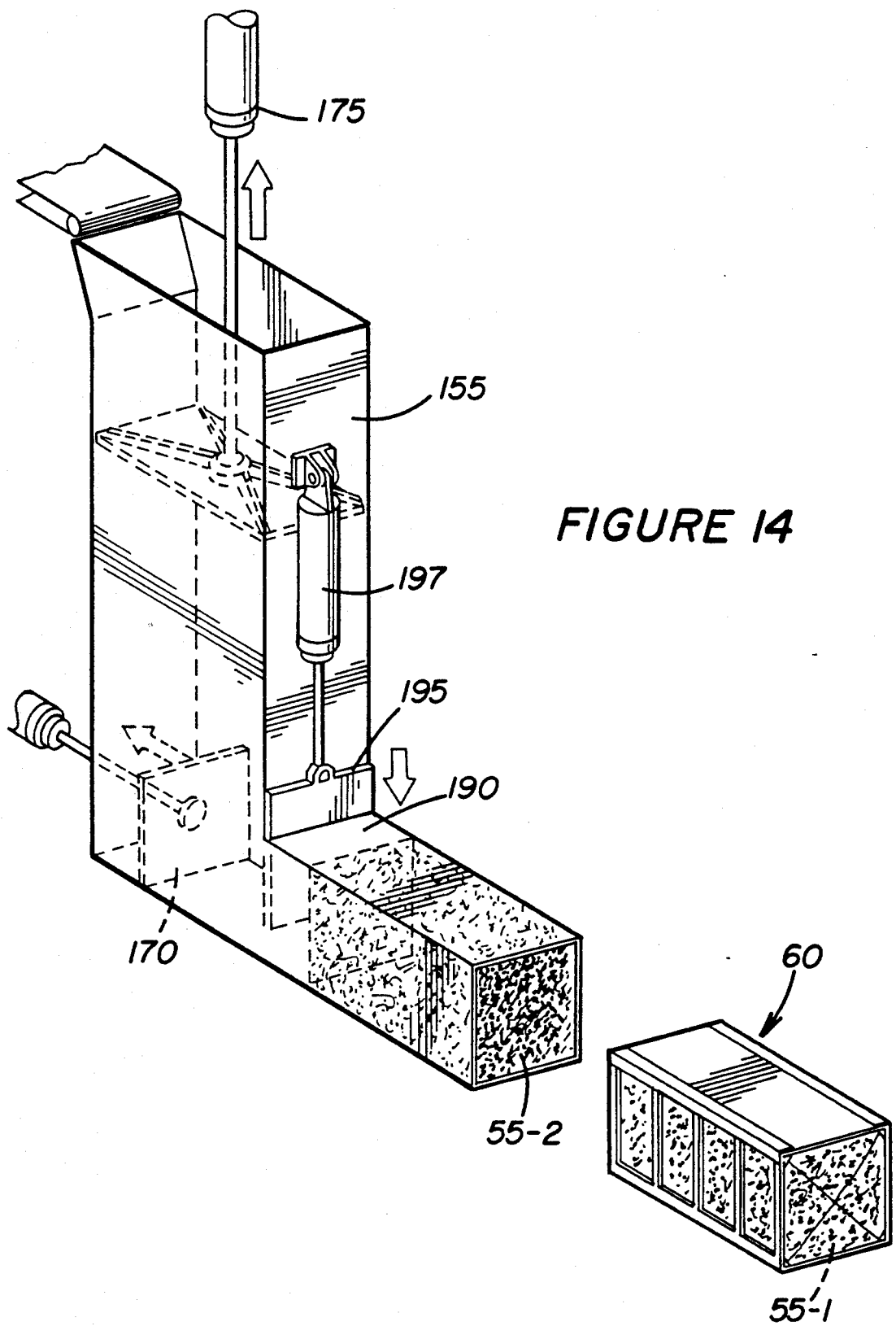
FIG. 14 is a perspective view of the baling press of FIG. 6 showing the completed baling process and the subsequent compacting action of the baling press in relation thereto.

FIG. 13 is similar to FIG. 7 with the exception that first bale 55-1 is present in extrusion chute 190 and second compressed bale 55-2 is present in compression chute 150. When bale 55-2 is forced into extrusion chute 190 by extrusion ram 180, the force provided by bale 55-2 forces first bale 55-1 into bag 140 and structure 50. Casing structure 50 is thereby pulled along with bale 55 until bale 55 exits extrusion chute 190 as shown in FIG. 14. The trailing edge of bag 140 is thereafter manually sealed, and a completely encased bale 60 is provided.

Press 150 is then in a condition to receive additional loose material 54 from conveyor 160.

As shown in FIG. 15 completely encased bales 60 are easily stackable in a six-high vertical stack. In FIG. 15A, it can be seen that interlocking members 112 and 110, and members 104, 106, are flush with respect to wooden pallets 145 disposed at the bottom of the six-high bale stack and between the third and fourth stacked bales. As shown in FIG. 15B, interlocking members 112 and 110, and L-shaped side members 104 and 103, of adjacently stacked bales 60 are also in a flush relationship in such a stacking configuration. Thus, the six-high stacked structure is more stable than previous casing structures due both to the rigid sideframes (100,102) and to the flush, full surface contact between the top and bottom surfaces of adjacent, stacked structures 60.

Figure 16:
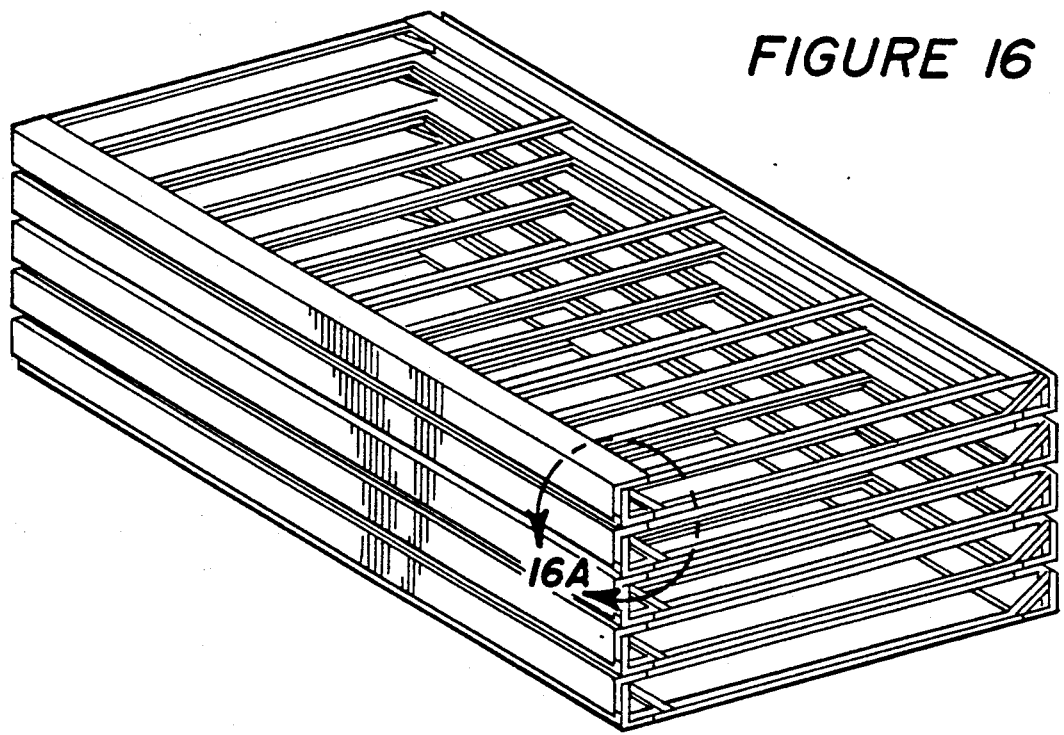
FIG. 16 is a perspective view of a series of stacked sideframe members.
Figure 16A:
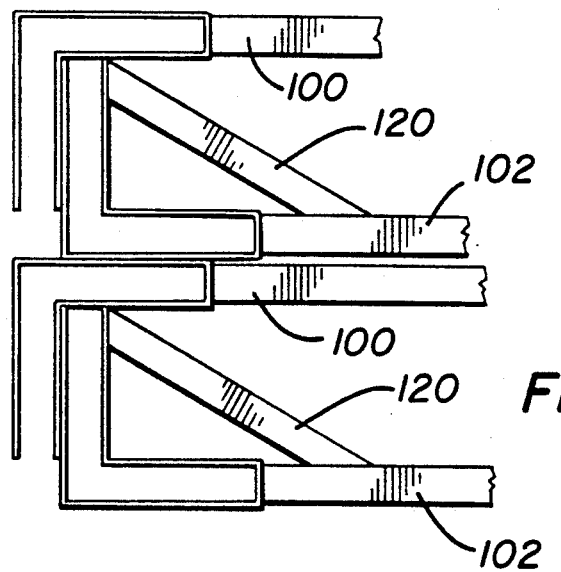
FIG. 16A is an enlarged, cross sectional view of area 16A of FIG. 16 showing the relationship of adjacent sideframe members in a stacked arrangement.

As shown in FIG. 16, sideframe members 100,102 are easily stackable in a horizontal configuration facilitating storage and requiring nominal storage space when not surrounding bale 55.

Casing structure 50, discussed above, not only provides significant advantages with respect to storing compacted bale 55 of material, but additionally provides for ease in automation with respect to handling the compressed bales and the provision of an automated process for removing the casing structures from the bales 55.

Figure 17:
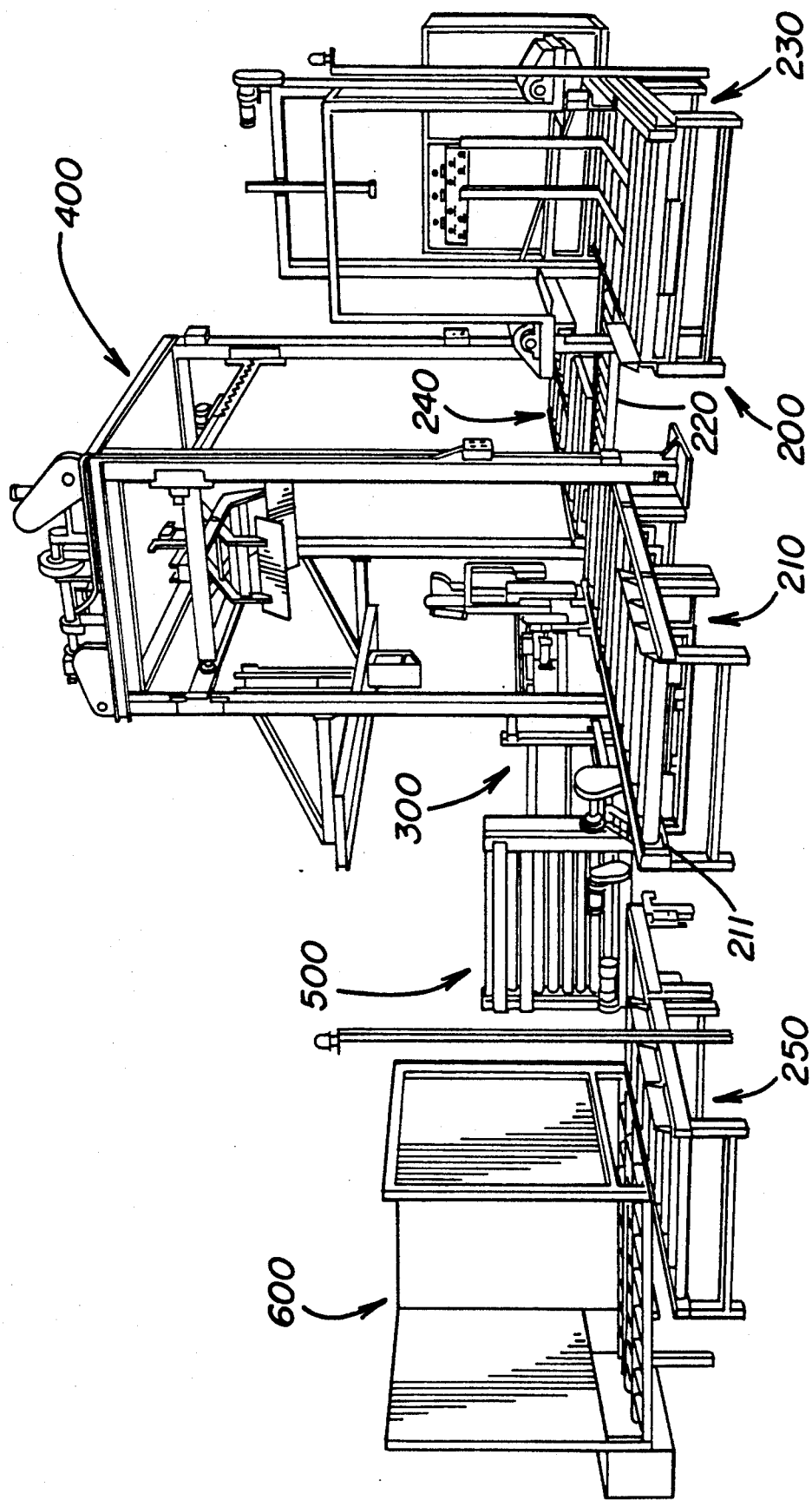
FIG. 17 is a perspective view of an automated encasing and de-casing apparatus in accordance with the present invention.
Figure 18:
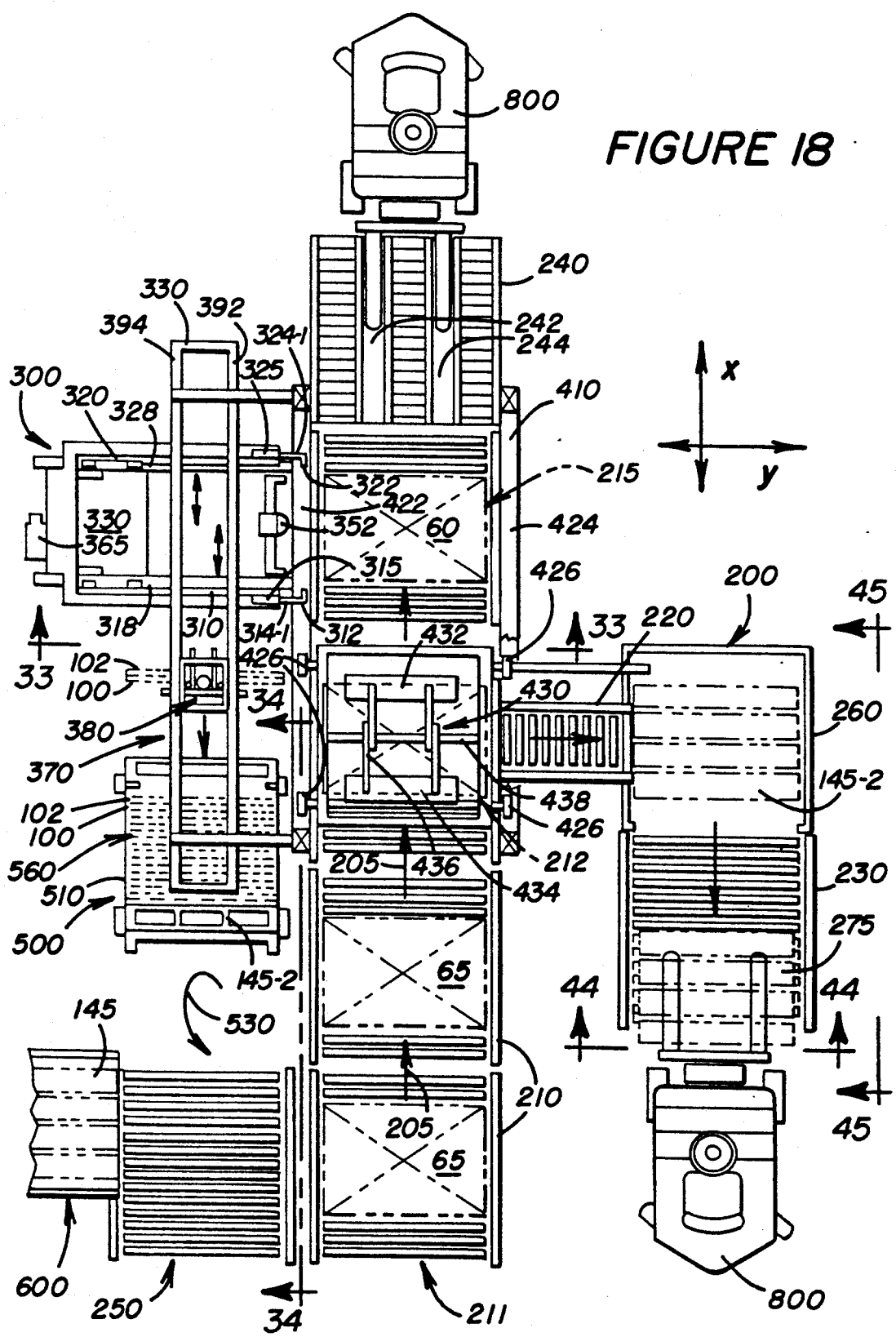
FIG. 18 is a plan view of an automated encasing and de-casing apparatus in accordance with the present invention.
Figure 19:
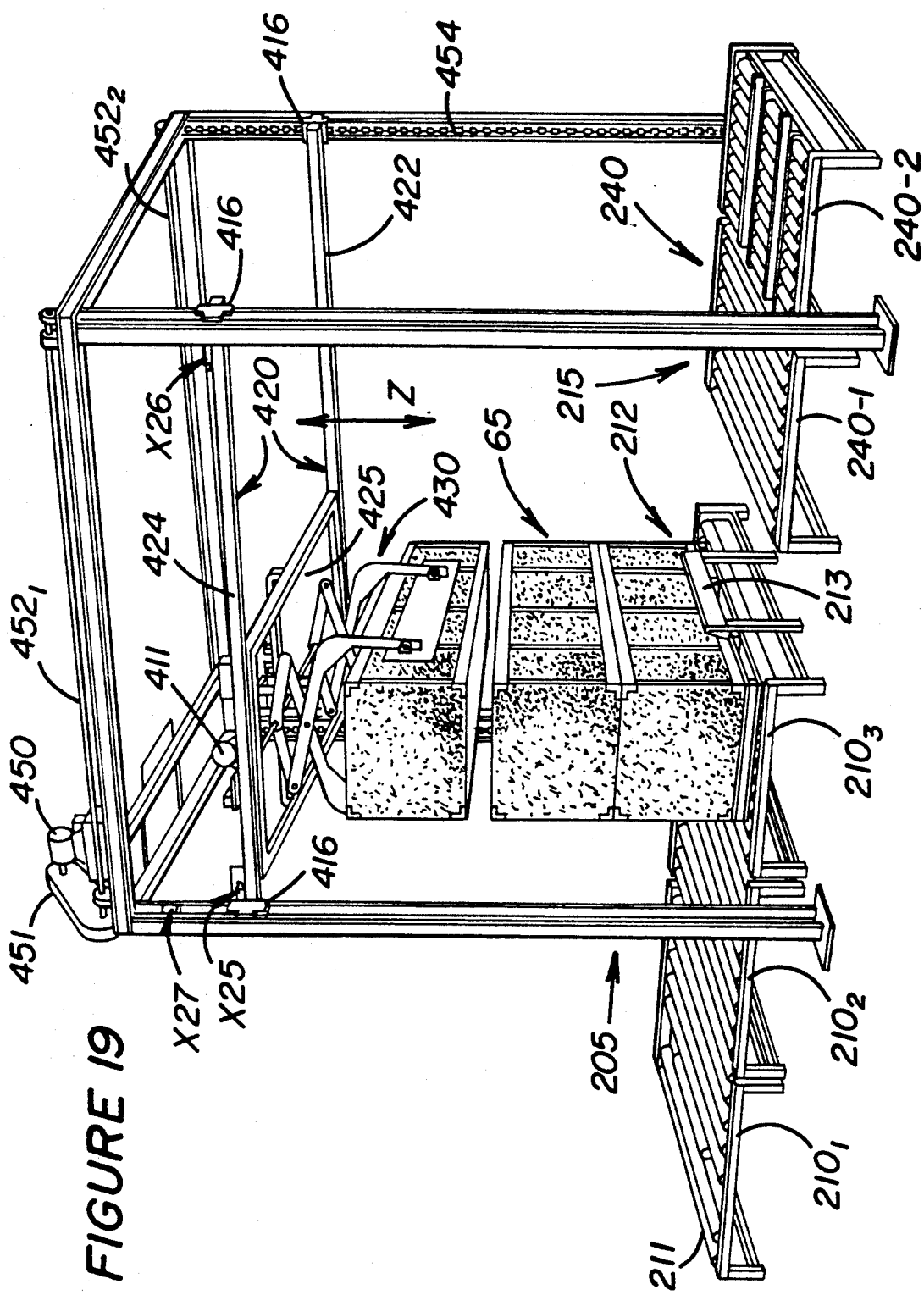
FIGS. 19-21 are perspective views of the automated encasing and de-casing apparatus in accordance with the present invention illustrating the vertical frame positioning subassembly of the apparatus of the present invention.

FIG. 17 is a perspective view and FIG. 18 a plan view of an automated apparatus for: (1) removing casing structure 50 from bale 55, (2) storing wooden pallets 145 used to stack a plurality encased bales 60, and (3) stacking sideframe members 100,102, utilized in individual casing structures. Generally, the apparatus comprises: a series of conveyors 210, 220, 230, 240 and 250, for positioning bales of material, transporting sideframes removed from encased bales, and transporting base pallets used to store and ship encased bales 60; bale positioning apparatus 400, capable of un-stacking a three-high stack 65 of encased bales 60; pallet stacking apparatus 200, for stacking a plurality of wooden base pallets used to transport a stack of encased bales to the de-casing apparatus, after encased bales have been removed therefrom; frame removal apparatus 300, for removing sideframes from individual encased bales 60; sideframe stacking apparatus 500, for stacking sideframe members removed from encased bales onto wooden base pallets thereby facilitating removal of the sideframe members from the apparatus; and sideframe transport apparatus 370, for transporting sideframes removed from bales 55. Also included in the de-casing apparatus of the present invention is an automatic control system, including a control panel, (FIG. 49) which automatically controls operation of conveyors, motors, and pneumatic and hydraulic cylinders of the apparatus through conventional control system hardware, used in accordance with the present invention; the control system will thus be described in terms of its end functions.

Figure 31:
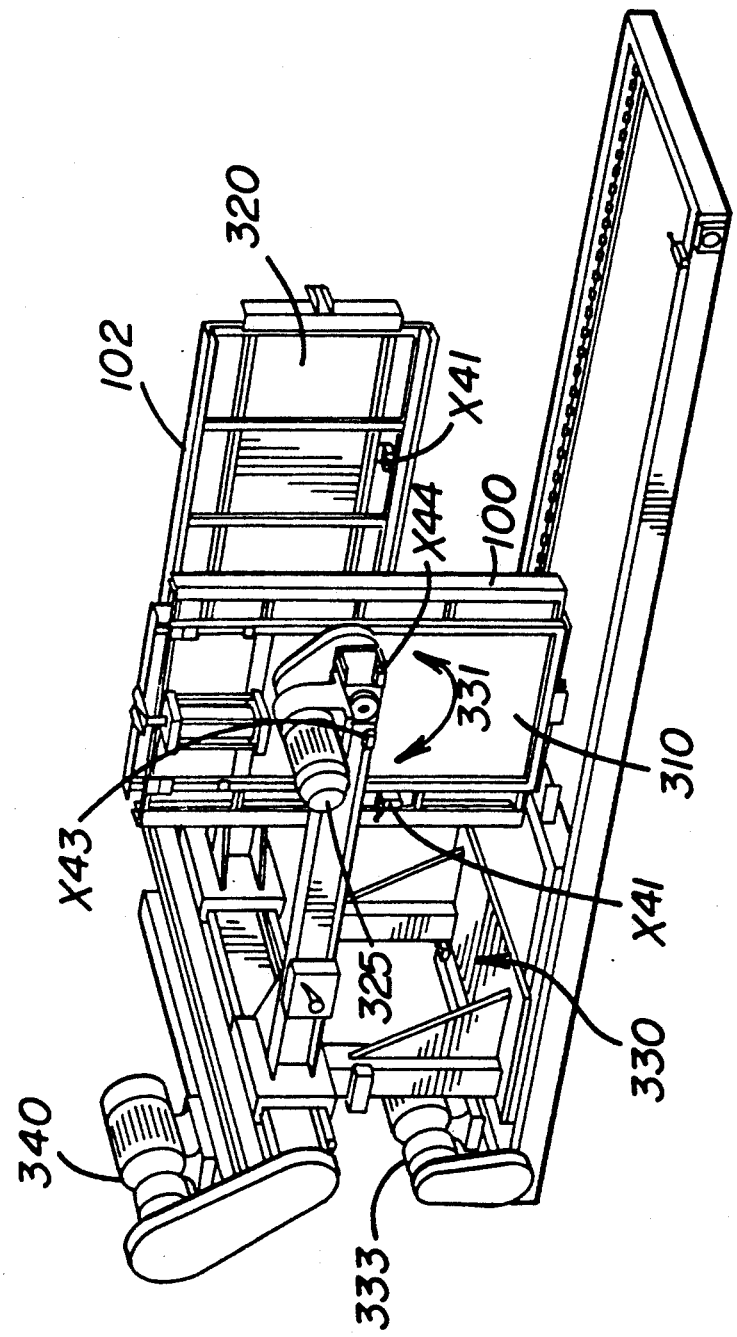
FIGS. 31 and 32 are perspective views of the de-casing apparatus of the present invention showing the rotation of the respective site for new member and the movement of the perspective sideframe member into an adjacent relationship.
Figure 32:
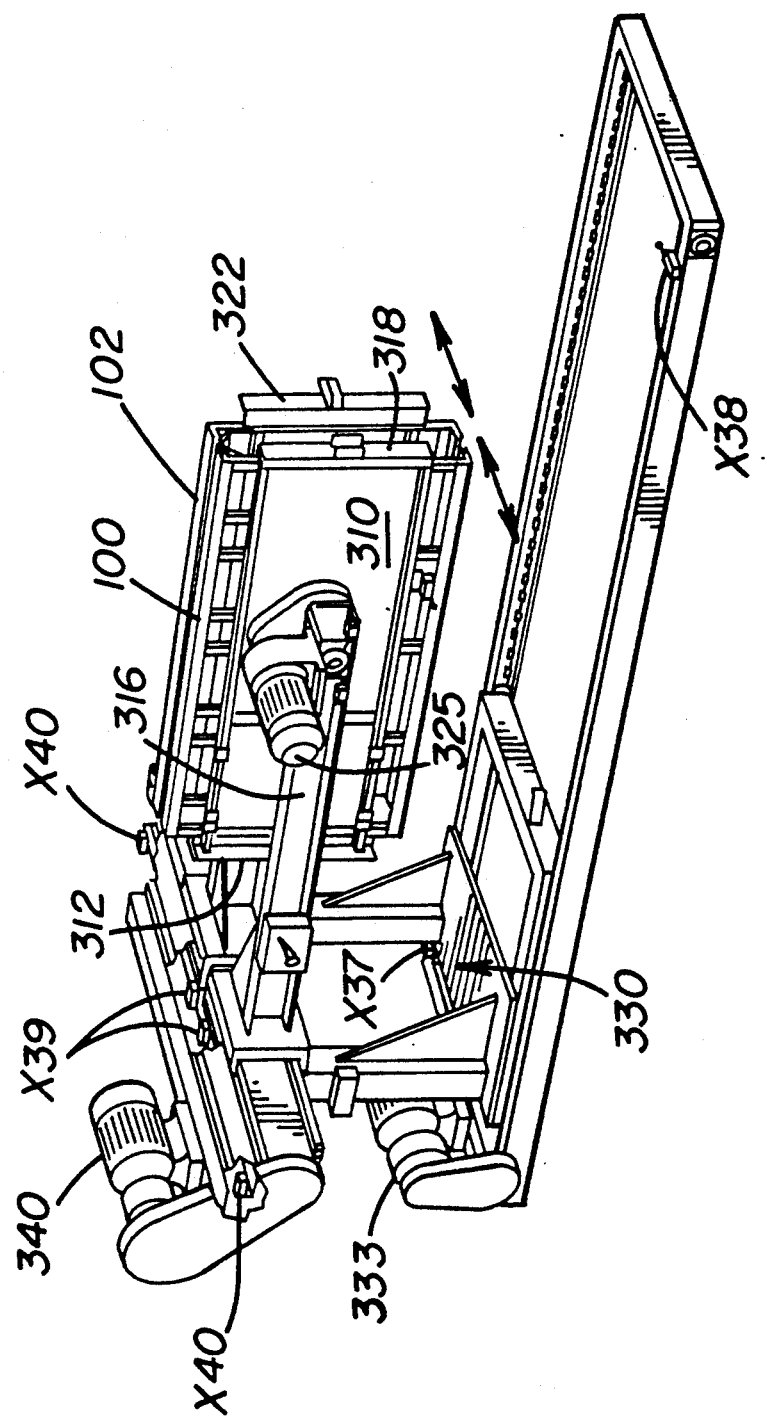
Figure 39:
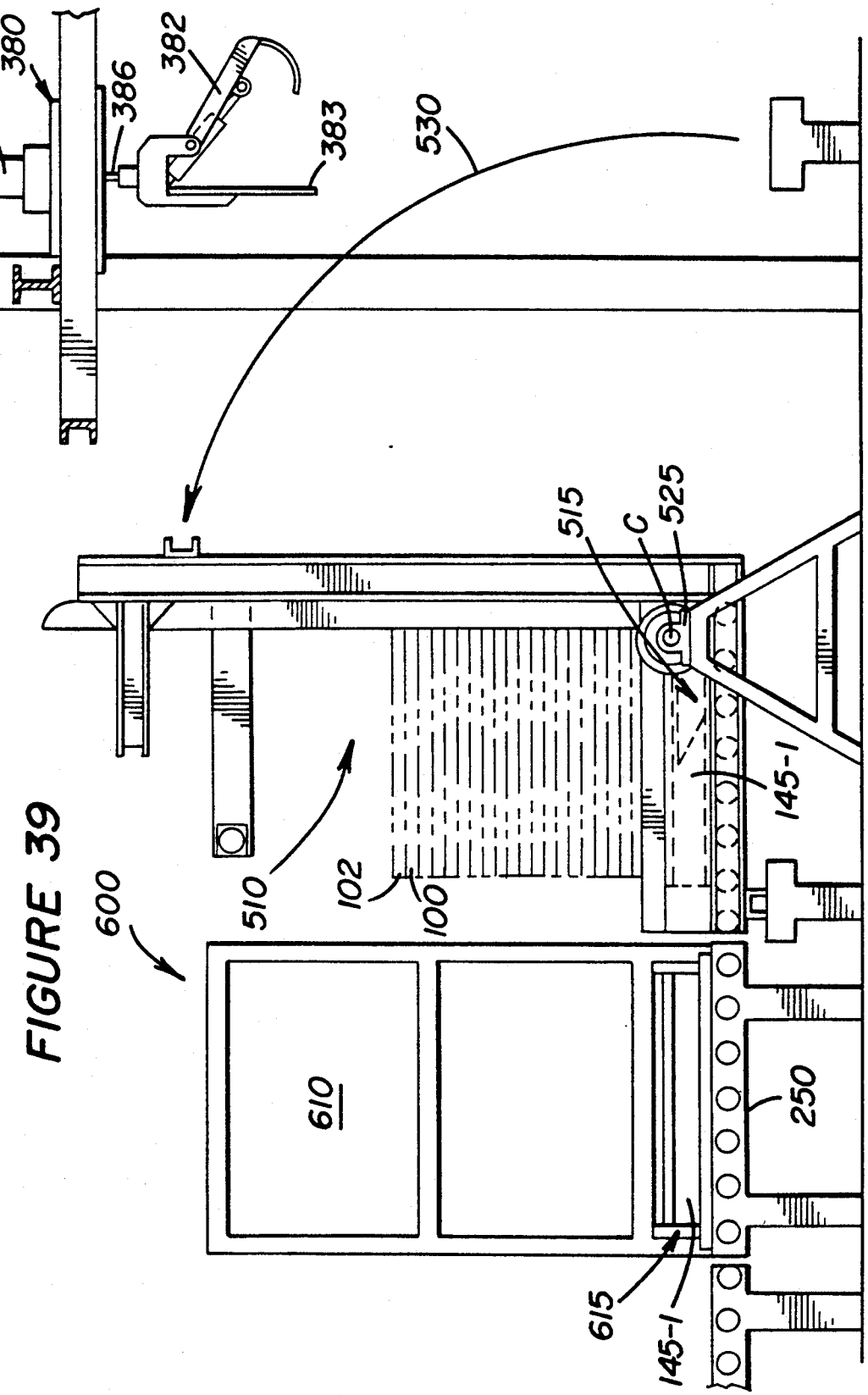
FIG. 39 is a side view along line 34—34 illustrating the stacking apparatus of the present invention in its rotated position.
Figure 40:
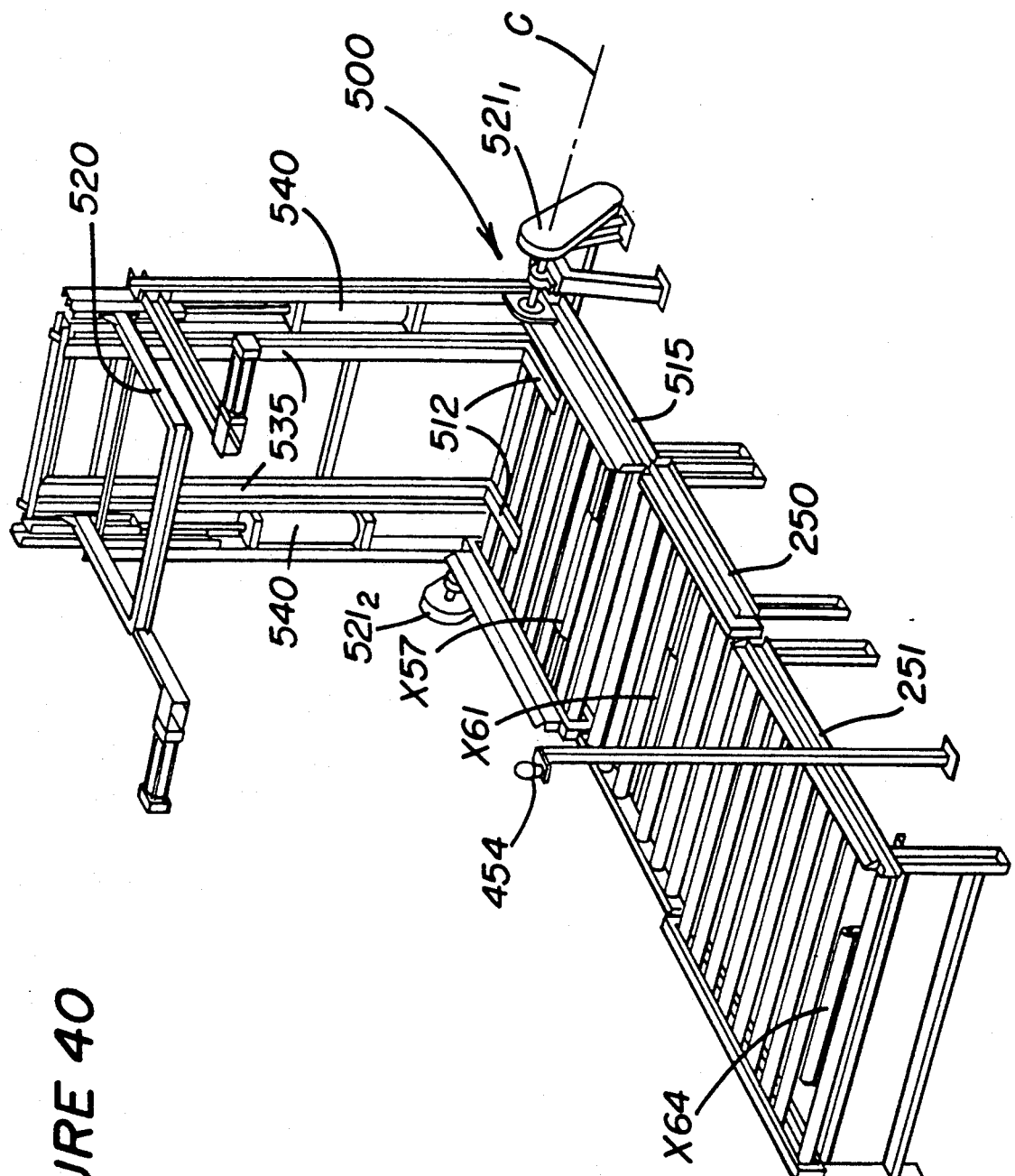
Figure 41:
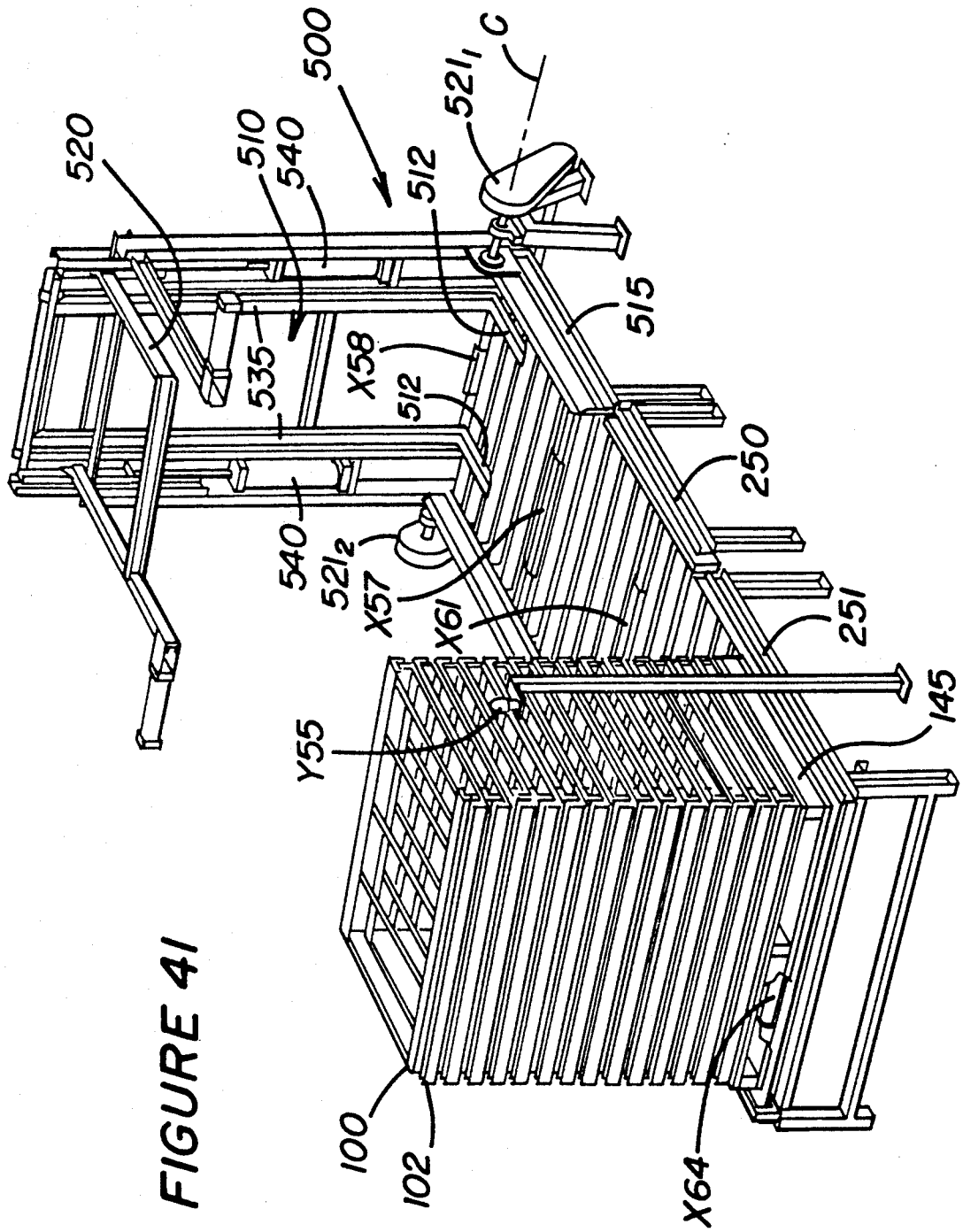
Figure 45:
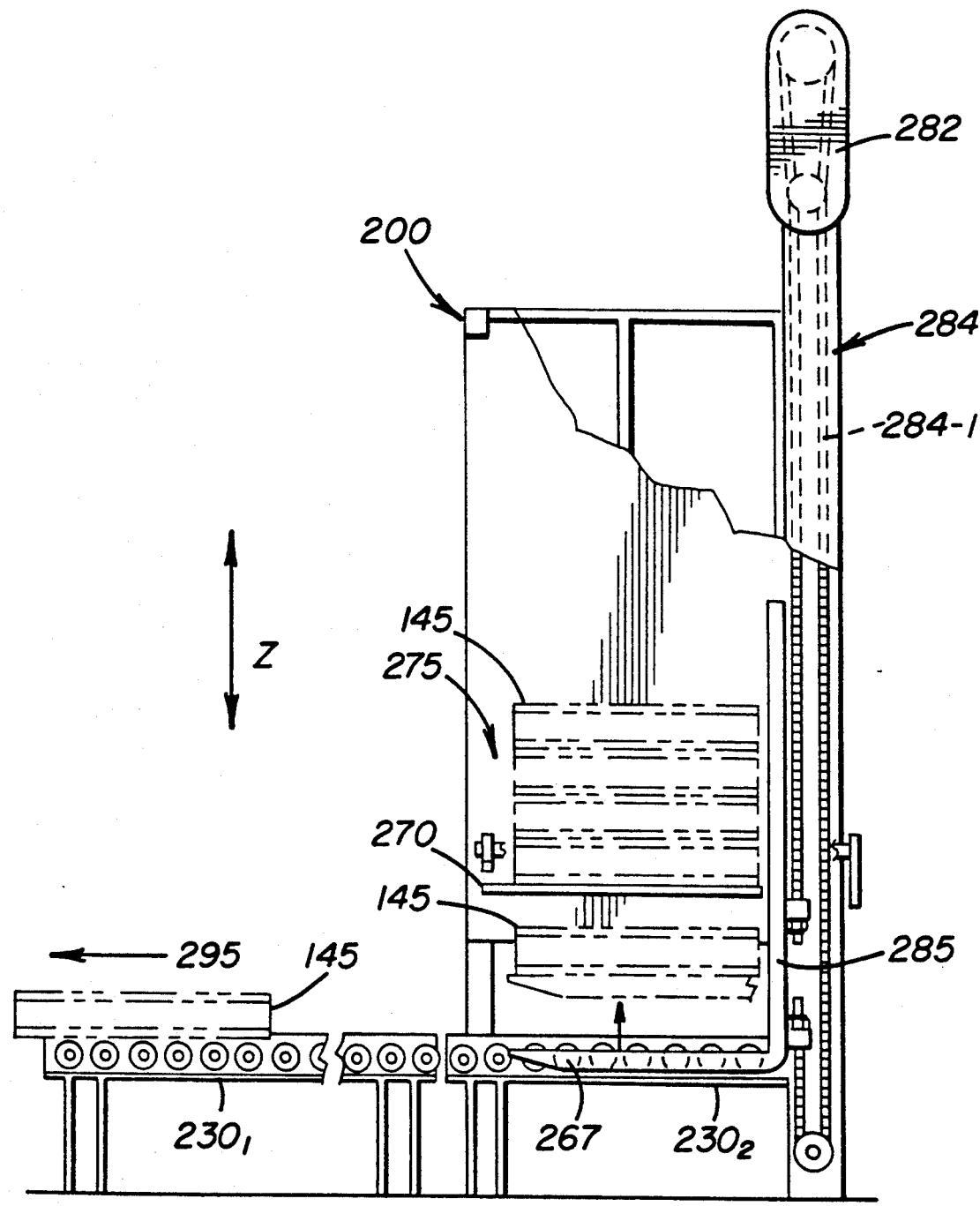
FIG. 45 is a side view of the pallet stacking apparatus of the present invention along line 45—45 in FIG. 18.
Figure 46:
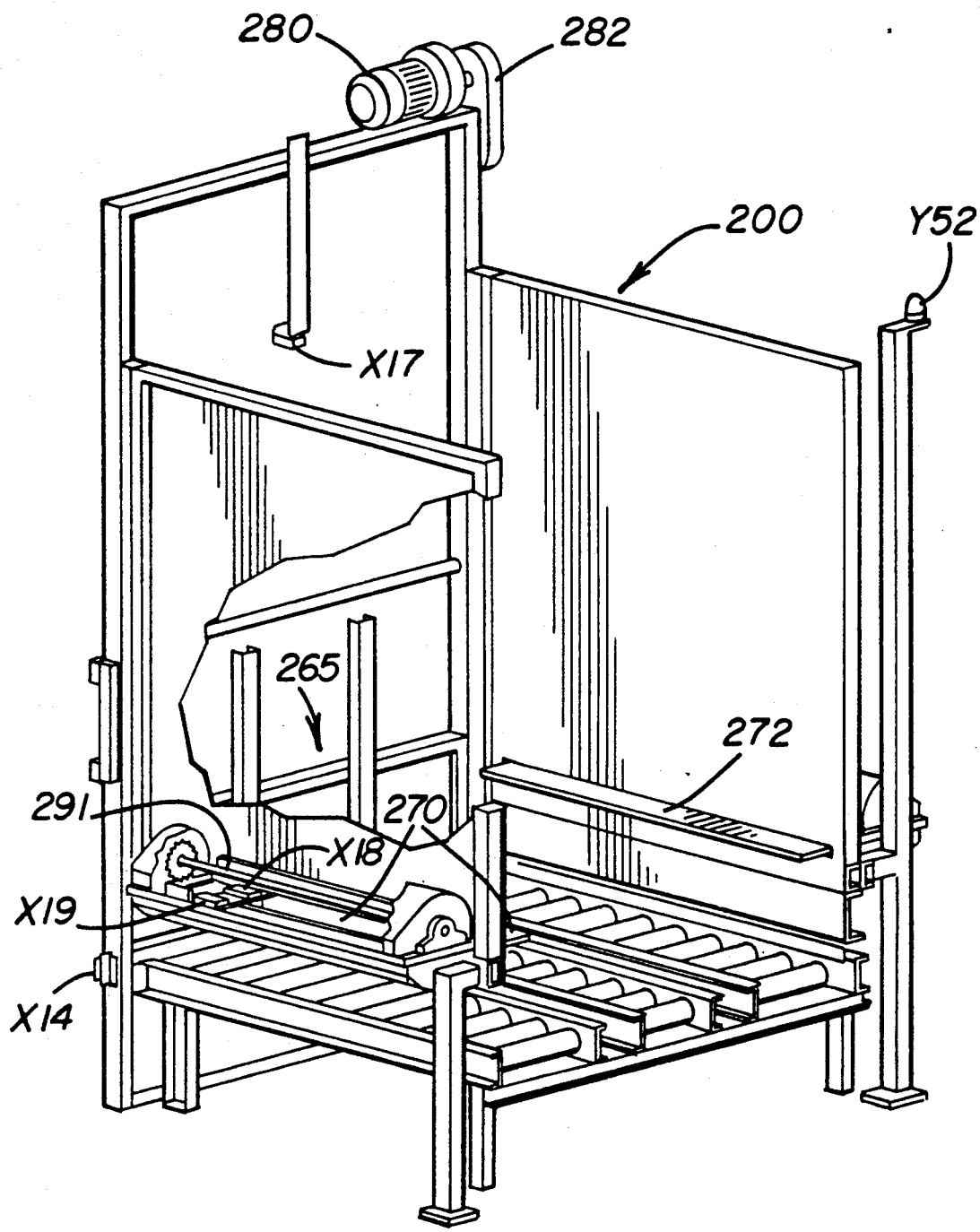
FIGS. 46-48 are perspective views of the pallet stacking apparatus of the present invention illustrating pallet stacking operations in accordance with the system of the present invention.
Figure 47:
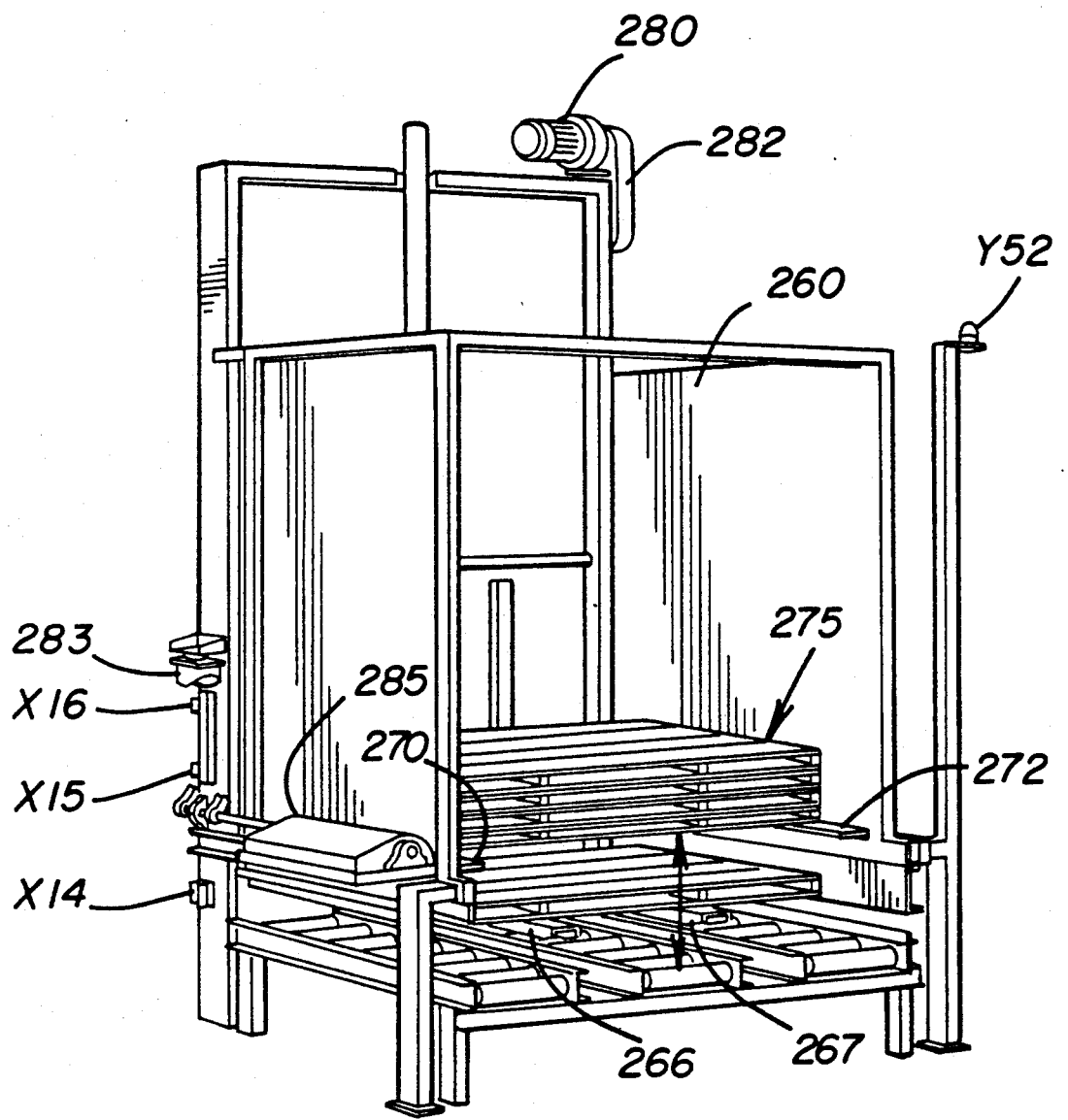
Figure 48:
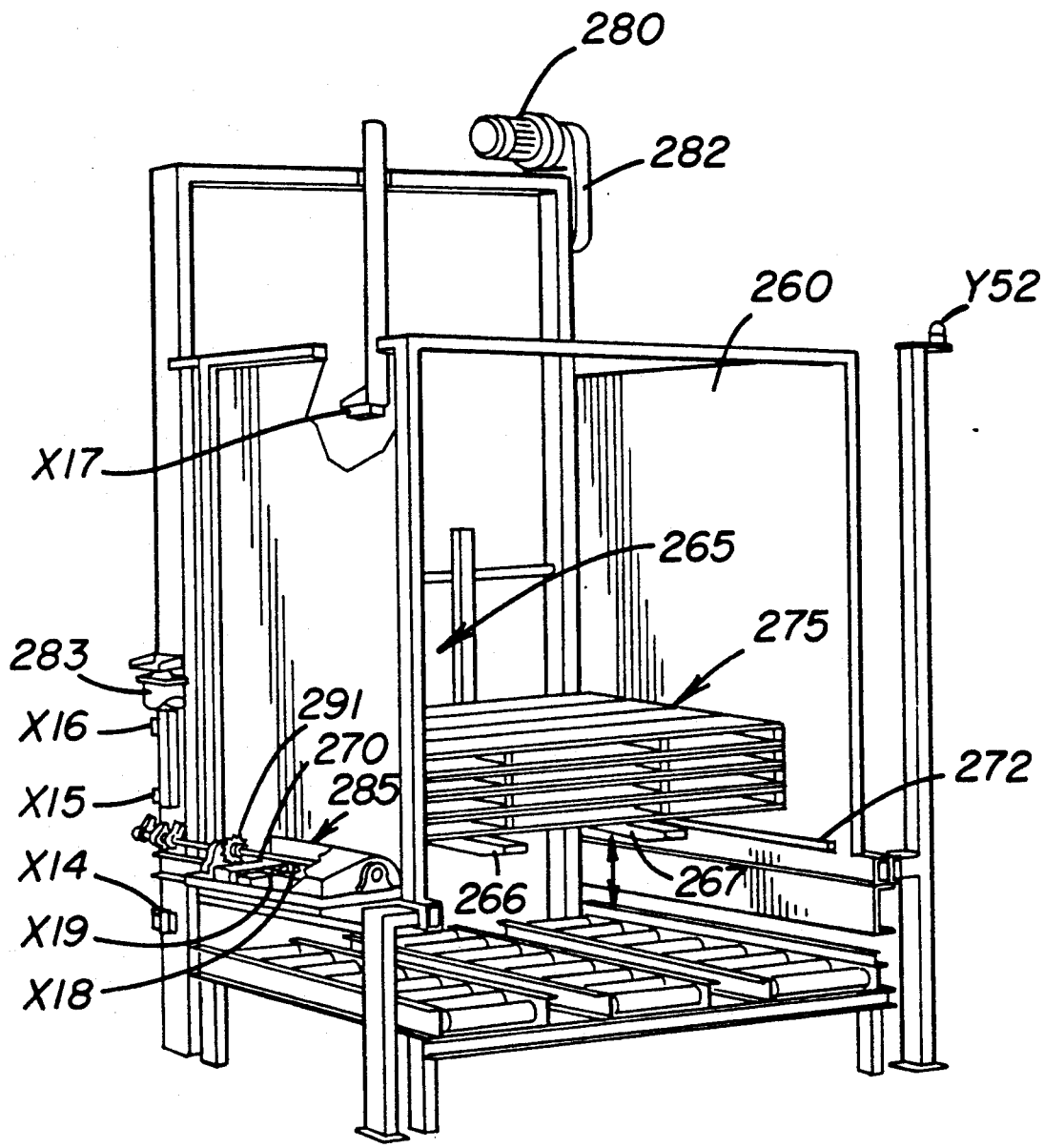
Figure 49:
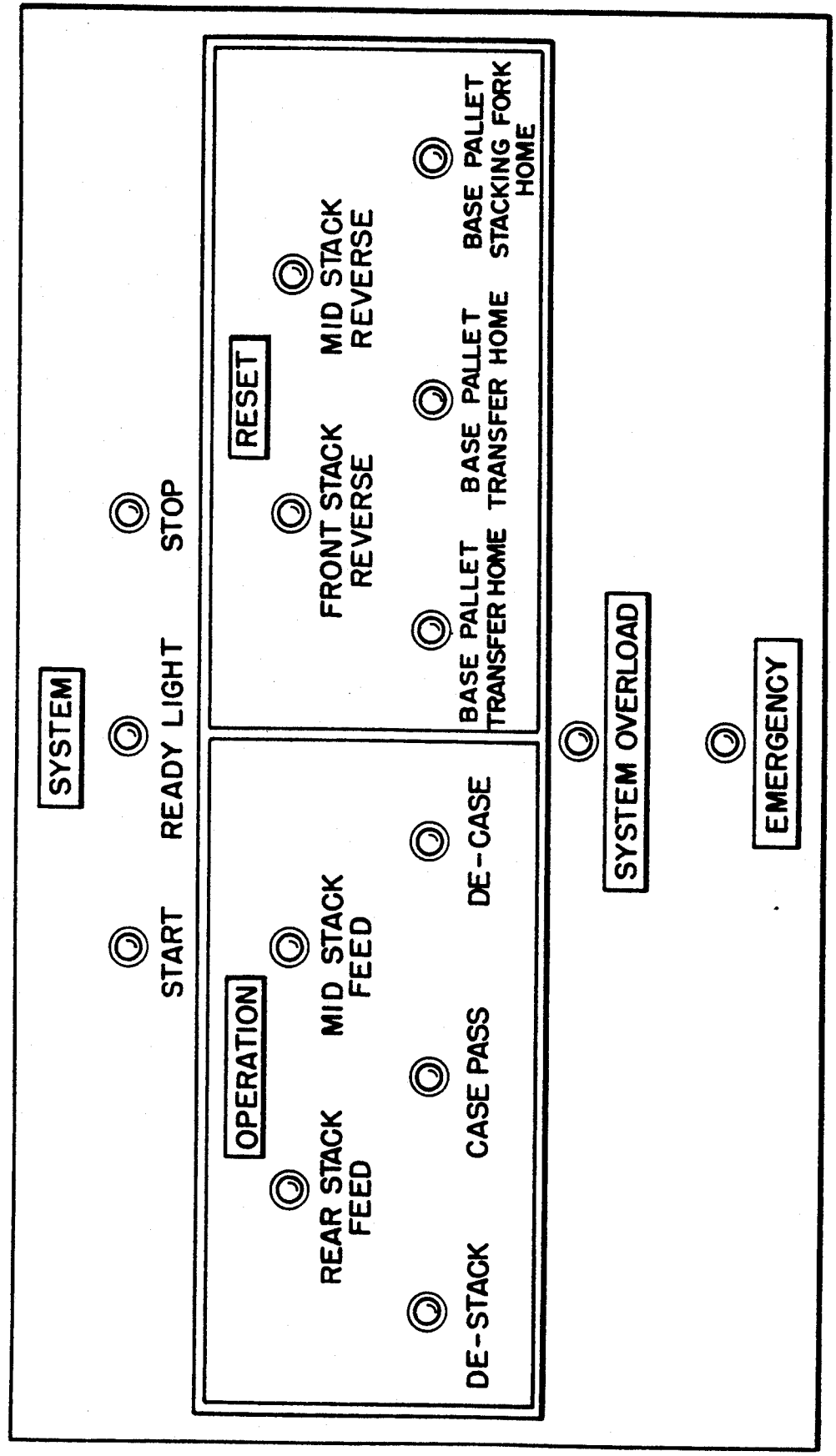
FIG. 49 shows the system control panel.

With general reference to FIGS. 17 and 18, and specific reference to figures as noted, operation of the de-casing apparatus generally proceeds as follows Encased bales 60, preferably in a three-high stacked arrangement 65, are provided by a forklift or other means to one end 211 of conveyor 210. Conveyor 210 transports the bales or bale stack toward bale positioning apparatus 400 in the direction of arrows 205 to an un-stacking region 212 of conveyor 210. Apparatus 400 includes a tong structure 430 (specifically discussed with reference to FIG. 22) which automatically grasps each individual bale 60 of material in region 212 and places it in de-casing region 215 (see FIG. 19). Apparatus 300 extends de-framing members 310,320 into de-casing region 215 and removes sideframe members 100, 102 of encased bale 60 (see FIGS. 24–30). Bale 55 is then transported down conveyor 240 for removal and disposition by forklift 800. Apparatus 300 rotates one of the sideframe members 180° and places the two members in interdigited engagement against each other for easy stacking (FIGS. 31–32). The interdigited sideframe members remain in a vertically-oriented position while transport apparatus 370 retrieves the interdigited members from apparatus 300 and transports them to sideframe stacking apparatus 500 (see FIGS. 33–35), where they are stacked in a vertical manner against a vertically-oriented, wooden base pallet 145 provided in bin 510. When a sufficient number of stacked, interdigited sideframes are present in bin 510, bin 510 rotates 90° along arrow 530 to move wooden pallet 145 to a horizontal position, thereby also moving stacked sideframe members 560 to a horizontal, stacked position (FIGS. 39–41). Stacked sideframe members 560, mounted on pallet 145, are transported by conveyor 230 for removal from the de-casing apparatus by a forklift or other means (FIG. 41). Apparatus 600 supplies an additional pallet to horizontally-oriented bin 510 of apparatus 500 (FIG. 42) and bin 510 rotates in the reverse direction of arrow 530 to provide the pallet to a vertical position for receiving additional interdigital sideframes. After the sideframe members of all bales in three-high stack 65 have been removed, the base pallet 145, on which the three-high stack 65 was provided, is transported along conveyor 220 to pallet stacking apparatus 200 (FIG. 45). Pallet stacking apparatus 200 stacks and retains a plurality of base pallets 145 (FIGS. 43–48). When a sufficient number of such pallets is gathered in bin 260, stacked pallets 275 are transported down conveyor 230 for removal by forklift 800 or other means.

The specific operation of the de-casing apparatus, and each of the component parts thereof, will be hereinafter discussed.

FIGS. 19–22 depict bale positioning apparatus 400, for manipulating a stacked arrangement 65 of encased bales 60, and positioning encased bales 60 into a "frame-removal" or "de-casing" region 215 adjacent frame removal apparatus 300. The operation of bale transport apparatus 400 and conveyor assemblies 210, 240, Will be hereinafter described.

Conveyor assembly 210 comprises three distinct position conveyor sections $210_1$–$210_2$–$210_3$, each including bale sensors to detect whether or not a stack 65 is present on conveyor assembly 210. Each conveyor section $210_1$–$210_3$ is coupled to an individual drive motor assembly (not shown) to power the individual conveyor rollers of sections $210_1$–$210_3$ to move each stack 65 into the system. Such sensors are generally provided at both the feed end and delivery end of each section $210_1$–$210_3$. An over-travel stop 213 is provided at one end of section $210_3$. Generally, a stack 65 of 3 encased bales 60 is transported to first end 211 of section $207_1$. In general, the automatic control system does not automatically feed stack 65 to section $210_2$ to ensure that section $210_1$ does not advance the stack 65 until stack 65 has been properly placed thereon. Once stack 65 has been properly placed in conveyor 210 a system operator will direct the automatic control system to advance stack 65 toward section $210_3$ in the direction of arrow 205. Such a signal may generally comprise pushing the "REAR STACK FEED" push button on the automatic control panel shown in FIG. 49.

Upon receiving such signal, the automatic control system checks to determine that: (1) bale stack 65 is present on conveyor section $210_1$; and (2) conveyor section $210_2$ is empty and stationary. If such conditions are true, section $210_1$ will activate to run in a forward direction, the direction of arrow 205, advancing stack 65 to section $210_2$. Once the sensor present the feed-in end (closest to section $210_1$) of conveyor section $210_2$ detects a bale stack 65 is positioned thereon, section $210_2$ will engage in the direction of arrow 205 to ensure stack 65 is securely positioned on conveyor section $210_2$. Again, section $210_2$ does not automatically feed stack 65 into section $210_3$. This allows for the retrieval of a stack 65 that may have been fed into the system by mistake.

Once positioned on conveyor section $210_2$, a manual input signal, such as the "MID-STACK FEED" push button (FIG. 49), input to the automatic control system checks to determine that: (1) conveyor section $210_2$ has a stack 65 positioned on it and is not running in the reverse direction (opposite arrow 205); (2) conveyor section $210_1$ is stationary; (3) conveyor section $210_3$ is stationary and free of a stack 65; (4) the base pallet transfer member 222 (see FIG. 43) is in its home position; and (5) tong structure 430 and vertical positioning carriage 420 are in the up position, not carrying an encased bale 60, or are at the raised position overlying conveyor assembly $210_3$. If the aforementioned conditions are true, conveyor assembly $210_2$ will forward stack 65 onto conveyor assembly $210_3$. Conveyor assembly $210_3$ will follow conveyor assembly $210_2$ into motion in the direction of arrow 205 when the positioning of stack 65 thereon is detected. When stack 65 encounters positioning sensor at the feedin end of conveyor assembly $210_3$, stack 65 will be moved a distance sufficient to ensure that stack 65 is set securely centered in un-stacking region 212. When the centered position is reached, conveyors $210_2$ and $210_3$ will stop. In case of overrun, a mechanical over-travel stop 213 is provided which prevents stack 65 from falling off conveyor assembly $210_3$. In one embodiment, the mechanical over-travel stop incorporates an emergency switch which shuts down the decasing system when hit by stack 65.

Encased bale positioning apparatus 400 generally comprises a four-poster frame structure 410 having mounted thereon vertical positioning carriage 420, horizontal positioning carriage 425, and tong structure 430. Vertical positioning carriage 420 is mounted to posts 415 of frame 410 on wheeled shoes 416, and is vertically positionable with respect to the Z-axis by means of motor 450 mounted on the top of frame structure 410 coupled by a link chain 451 to rods $452_1$, $452_2$, having sprockets (not shown) engaging linked chains 454, one per post, coupled to shoes 416 of vertical positioning carriage 420. Drive chains 454 are mounted in channels on each of four posts 415 of frame 410. Carriage 420 may thereby be raised and lowered with respect to the Z-axis to vertically position tong structure 430. Horizontal positioning carriage 425 is carried on crossbeams 422,424 of vertical positioning carriage 420 on rollers 426 positioned in channels (not shown) of cross beams 422,424. Carriage 425 may be positioned along the X-axis between de-casing region 215 and assembly $210_3$ on cross beams 422, 424 by a chain drive (not shown) mounted in beams 422,424 powered by motor 411 mounted on carriage 425. With vertical positioning carriage 420 and horizontal positioning carriage 425, tong structure 430 may be used for securing encased bales 60 from un-stacking region 212 encased and positioning encased bales 60 in de-casing region 215.

Figure 22B:
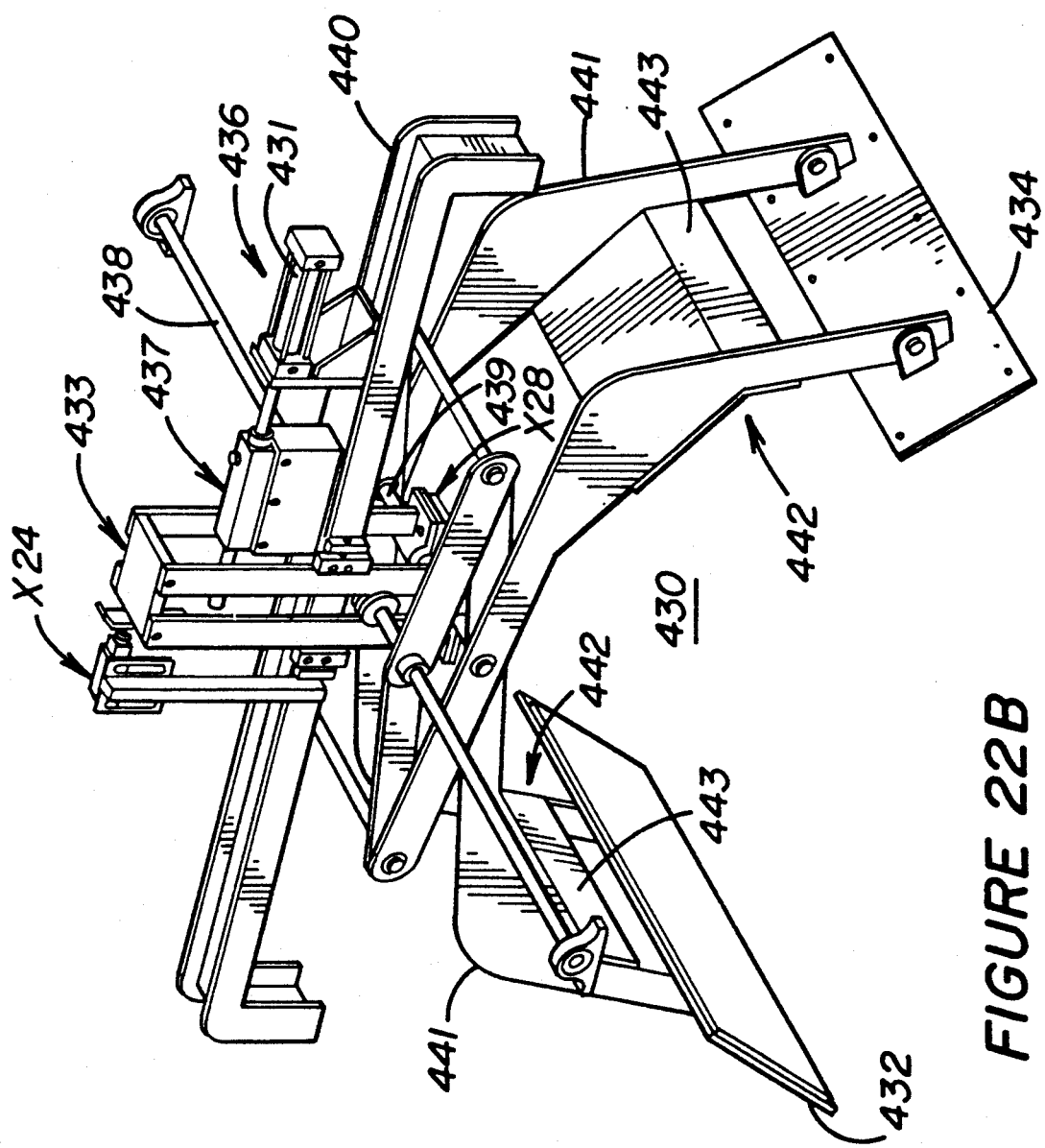

With reference to FIGS. 22A–22B, tong structure 430 is comprised of two padded metal slats 432,434 coupled to scissoring arrangement 436, which is driven to expand and contract slats 432,434 as discussed below. Pads 432,434 are held in a wide open position (FIG. 22B) against gravity by a lock pin 437, supporting bracket assembly 433, coupled to scissor pin 439. Look pin 437 is coupled to a pneumatic cylinder 431 mounted to cross beam 440, which allows pin 437 to be extended under bracket assembly 433; and retracted clear of bracket assembly 433. As will be generally understood, when pin 437 is extended so as to be positioned under bracket assembly 433, tong structure 430 is prevented from closing to its closed position in FIG. 22A, and is thereby held in its "normal" open position between the closed position (FIG. 22A) and the wide-open position (FIG. 22B). Each slat 432,434 is rotatably mounted on frame members 441 by hinges 435, and includes concave angled interior chamfering 442, having metal cross plates 443 mounted thereon. Chamfering 442 and plate 443 force members 442 to expand to the wide open position shown in FIG. 22B when tong structure 430 is lowered into contact with an encased bale 60. Sensors X24, X28 are provided to detect the position of tong structure 430 in the "Wide-open" position and the presence of a pallet therein, respectively.

Figure 20:
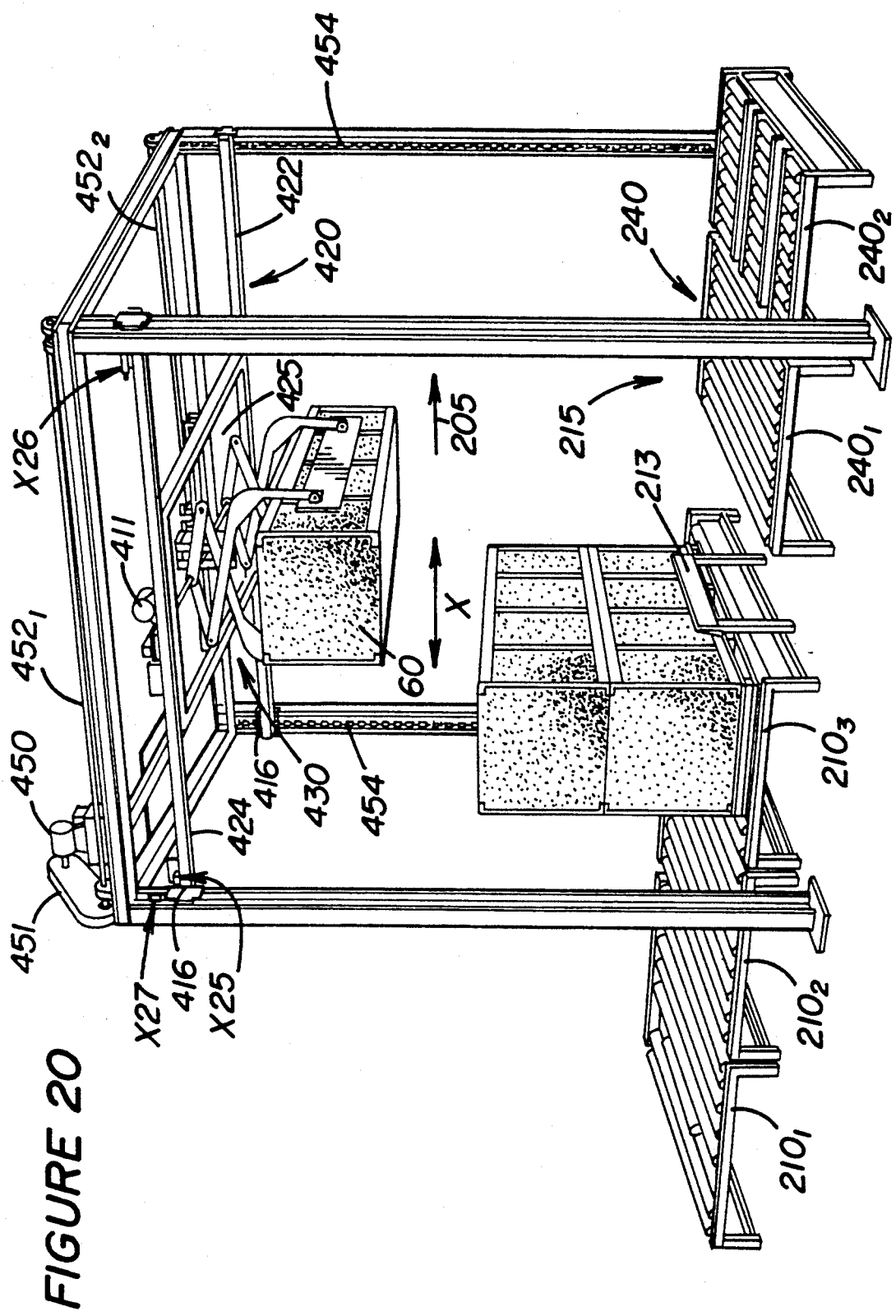
Figure 21:
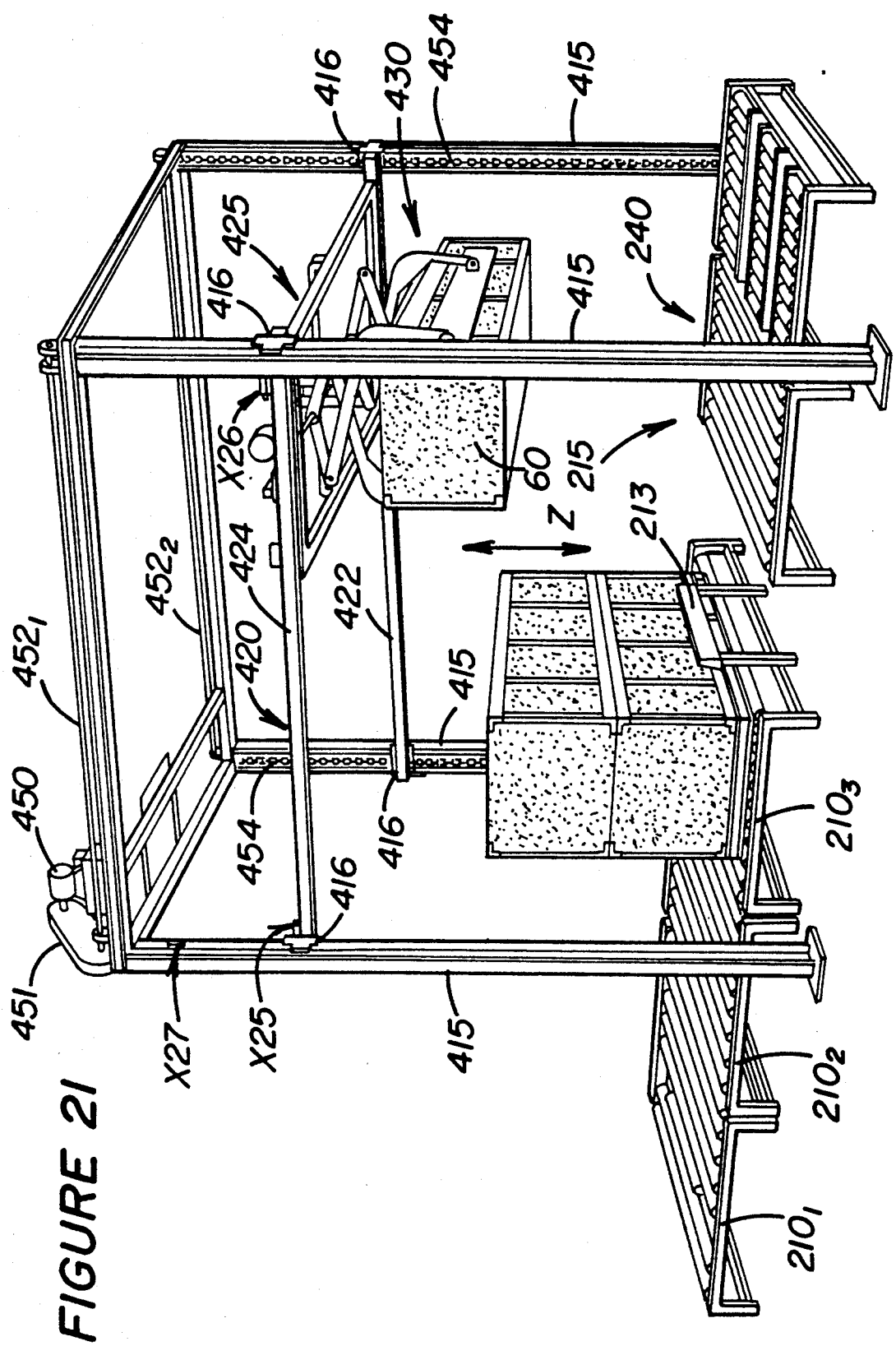

Positioning of an encased bale 60 into de-casing region 215 will be hereafter described with reference to FIGS. 19–22. In operation, sub-carriage 425 will be positioned over a three-high bale stack 65, (FIG. 19) and vertical positioning carriage 420 will be lowered such that tong structure 430, provided in its normal open position, and specifically cross plates 433, engage the uppermost encased bale 60 in stack 65. The un-stacking operation is initiated in response to, for example, the "DE-STACK" manual push button on control panel shown in FIG. 49. In response to such signal, the automatic control system checks that: (1) horizontal positioning carriage 425 is stationary over the un-stacking region . 212; (2) vertical positioning carriage 420 is stationary at a position wherein tongs 430 are clear of any encased bale 60; (3) at least one encased bale 60 is present on conveyor assembly $210_3$; (4) tongs 430 are not in the "wide open" position; (5) conveyor assembly $210_3$ is stationary; (6) clamp shoe 352 is in a retracted position (see FIG. 24); (7) grappling members 312, 322 are not in de-casing region 212; and (8) shoe 352 is positioned in its retracted position If the aforementioned conditions are true, vertical positioning carriage 420 is activated to descend along the Z-axis. When tong structure 430 engages the uppermost encased bale 60, structure 430 is forced to the wide open position (FIG. 22B) as chamfered edges 443 engage bale 60. Tong structure 430 is then raised, and pin 443 retracted clear of bracket assembly 433, causing metal slats 432,434 to contract under the force of gravity, thereby closing the slats in a scissor-like fashion around the uppermost encased bale 60. As vertical positioning carriage 420 ascends along the Z-axis with tong structure 430 closing under the force of gravity, members 432,434 grip the uppermost encased bale 60 and lift encased bale 60 from stack 65. Once vertical travel carriage 420 engages sensor X27 (FIG. 19), the ascending motion along the Z-axis is completed The automatic control system, sensing the position of the vertical travel carriage 420 in the "up" position, activates horizontal travel carriage 425 to run in the direction of arrow 205 along the X-axis so that the encased bale 60 is positioned over the de-casing region 215 (FIG. 20). When horizontal positioning carriage 425 engages sensor X26, horizontal travel carriage 425 stops.

Figure 24:
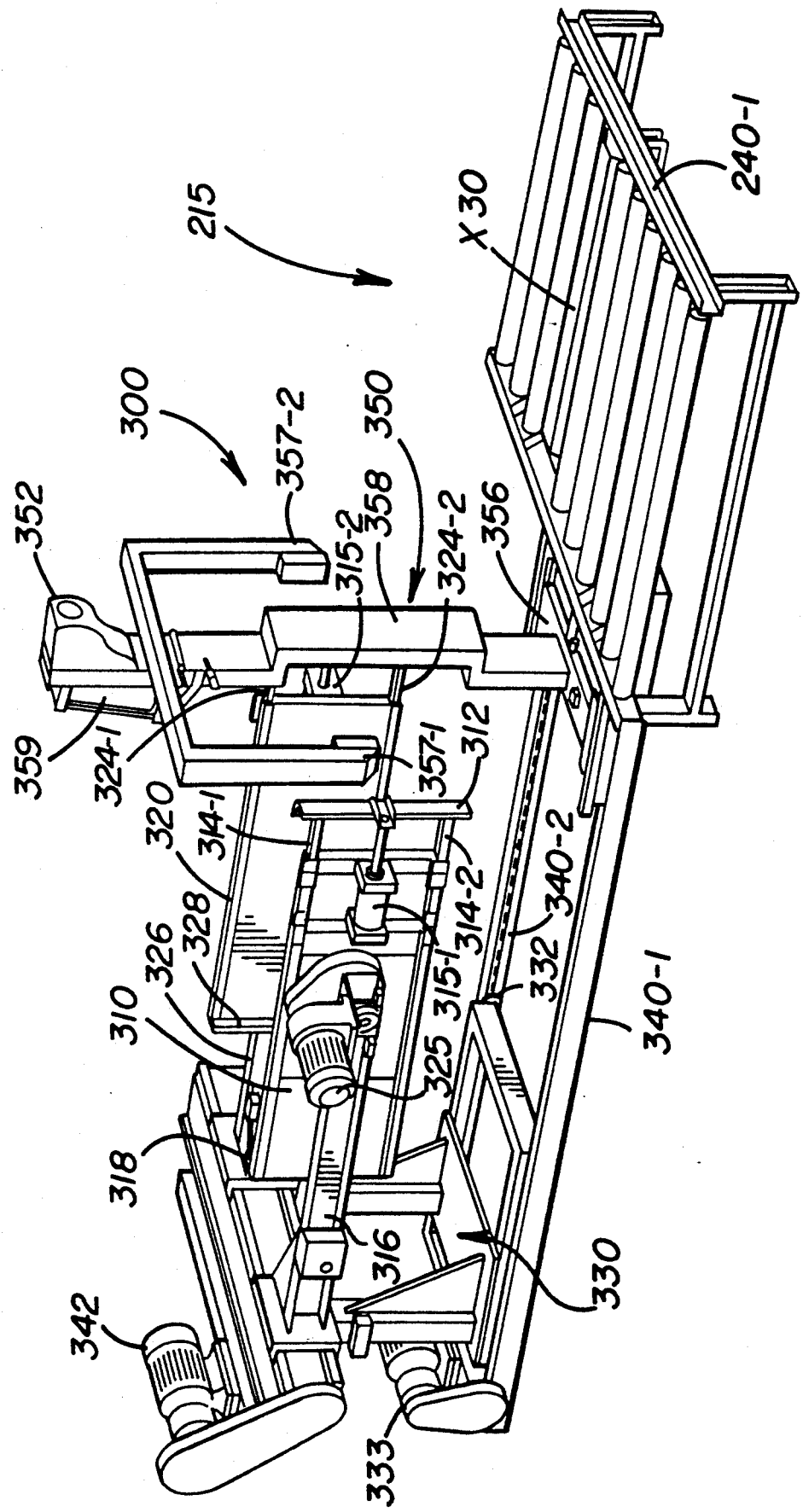
FIG. 24 is a partial, perspective view of the casing apparatus in its fully retracted position adjacent a de-casing conveyor.

Once encased bale 60 is in position over de-casing region 215, the automatic control system checks to ensure that: (1) conveyor 240 in the de-casing region 215 is clear of any baled materials; (2) shoe 352 and carriage 330 are in the "out" position (FIG. 24); (3) grappling members 312, 322 are retracted; and (4) shoe 352 is in its retracted position. If the aforementioned conditions are true, vertical positioning carriage 420 will then lower bale 60 with respect to the Z-axis to bring bale 60 to rest on the surface of conveyor 240 in region 215. Tong structure 430 is lowered such that slats 432,434 expand to the wide open position as chamfering 442 is pushed down on encased bale 60. Pneumatic cylinder 431 extends lockpin 437 under bracket assembly 433 such that when carriage 420 is raised, bale 60 is not picked up and carried by tong structure 430. As vertical positioning carriage 420 ascends, tong structure 430 will close inwardly; however, with its movement inhibited by the extension of lockpin 43, slats 432,434 will remain wide enough apart, in the "normal" open position, such that encased bale 60 will remain on conveyor 240 in de-casing region 215. Once vertical positioning carriage 420 reaches sensor X27, its ascension along the Z-axis will cease.

Once vertical positioning carriage 420 is in this, its "up" position, horizontal travel carriage 425 returns along the X-axis in the direction opposite arrow 205 to the position over de-stacking region 212. At this point, the automatic control system awaits the next call to unstack a case from bale stack 65.

Apparatus 400 will continue to position bales in this fashion, with subsequent encased bales 60 being positioned in de-casing region 215 after frame removal apparatus 300 has completed its operation and de-cased bale 55 is unloaded from de-casing region 215 down ramp assembly 240.

Under certain circumstances, horizontal travel carriage 420 and vertical travel carriage 425 may be interrupted and stopped below the raised position or between the de-stacking region and uncasing region. For the purposes of safety, the automatic control system allows the case positioning apparatus 400 to remain stationary in this frozen position until the "DE-STACKER RESTART" manual pushbutton is depressed.

When receiving the signal from the "d-stacker restart" manual pushbutton, the automatic control system will react depending on the following condition:

(1) the vertical travel carriage 420 is stationary and not at its "up" position and horizontal travel carriage 425 is stationary at the "un-stacking position", and look pin 437 is stationary, vertical travel carriage 420 is activated to ascend along the X-axis;

(2) if vertical travel carriage 420 is stationary and not at the "up" position, horizontal travel carriage 425 is stationary in the "uncasing" position, and lock pin 437 is stationary, vertical travel carriage 420 is activated to ascend along the Z-axis;

(3) if vertical travel carriage 420 is stationary and not at the "up" position, horizontal travel carriage 425 is stationary and is neither at the "unstacking" position nor at the "uncasing" position, vertical travel carriage 420 is activated to ascend along the Z-axis;

(4) if vertical travel carriage 420 is stationary at the "up" position, horizontal travel carriage 425 is stationary and is neither at the "unstacking" position nor at the "uncasing" position, and structure 430 is holding an encased bale 60, horizontal travel carriage is activated in the direction along arrow 205; and (5) if vertical carriage 420 is at its "up" position, horizontal travel carriage 425 is stationary and neither at the "unstacking" position nor at the "uncasing" position and structure 430 is not holding an encased bale 60, horizontal travel carriage 425 is activated in the direction opposite arrow 205.

After an encased bale is placed in de-casing region 215, frame removal or "de-casing" apparatus 300 begins operation. Frame removal apparatus 300 will be described with reference to FIGS. 23-33. Apparatus 300 removes sideframe members 100,102 from encased bale 60 after bale 60 has been placed in de-casing region 215 of conveyor 210 by positioning apparatus 400. Apparatus 300 and de-casing region 215 are arranged such that an encased bale 60 in region 215 will be directly adjacent frame removal apparatus 300 relative to the Y-axis.

With reference to FIG. 24, apparatus 300 includes a set of frame removal members 310,320, each frame removal member 310,320 for removing one of sideframes 100,102, respectively, from encased bale 60. Each frame removal member 310,320, includes L-shaped grappling finger 312,322, respectively, mounted by extension arms 314-1, 314-2, 324-1, 324-2 to frame removal members 310,320, respectively. Grappling fingers 312,322 may be extended and retracted from frame removal members 310,320 along the Y-axis. Such extension and retraction of grappling fingers 312,322 is powered by pneumatic cylinders 315,325, respectively, mounted on frame removal members 310,320. Each member 310,320 includes frame stops 318,328 such that when grappling fingers 312,322 are retracted, sideframe members 100,102 are gripped by frame removal members 310,320 and retained between grappling fingers 312,322, and frame stops 318,328.

Figure 33:
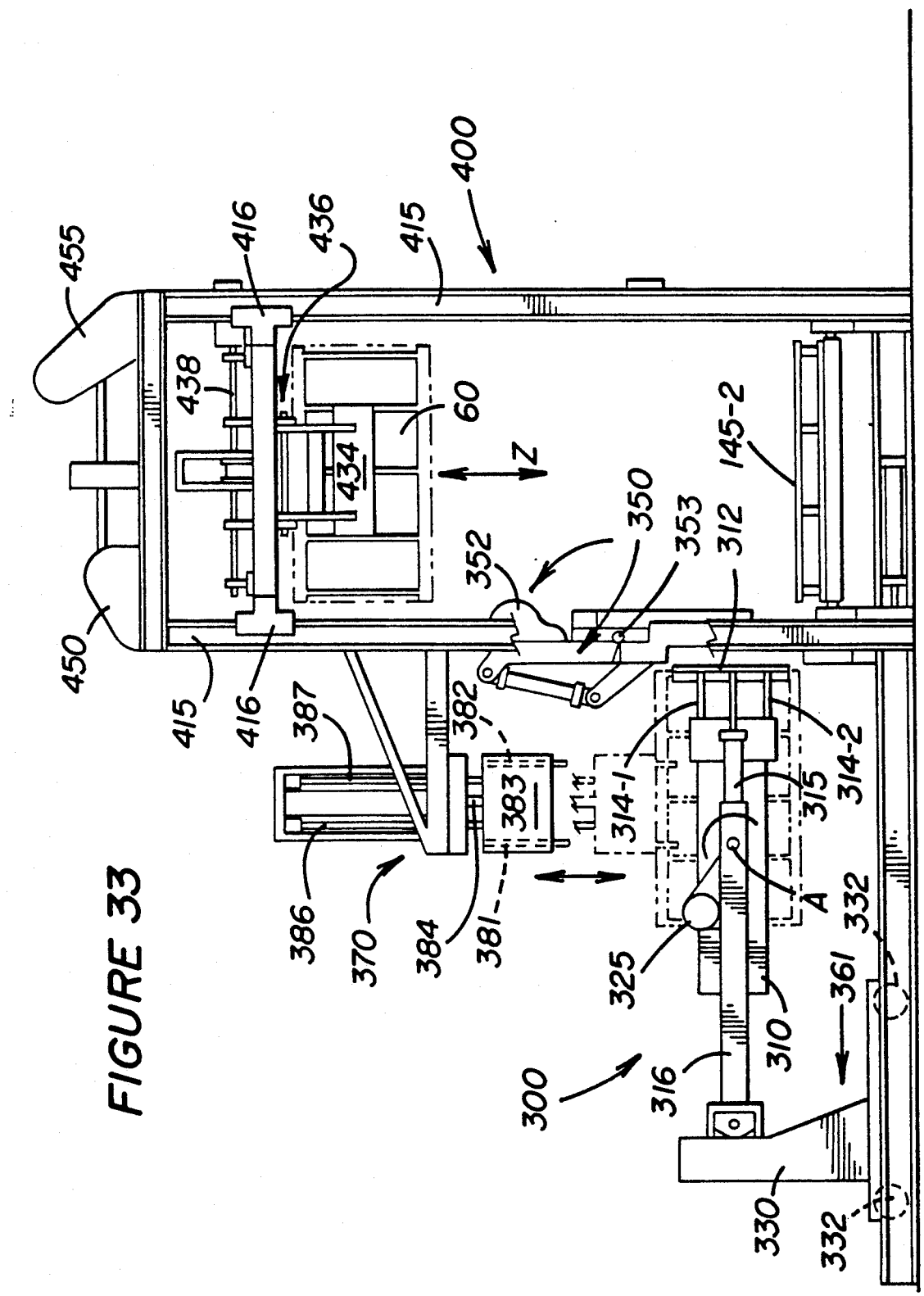
FIG. 33 is a side view of the sideframe stacking apparatus in accordance with the present invention along line 33—33 in FIG. 18.

Each frame removal member 310,320 is mounted by beams 316,326 to a carriage 330. Carriage 330 is mounted on wheels 332, positioned in track beams 340-1, 340-2, and driven by motor 333, to allow carriage 330 to be positioned along the Y-axis in the direction of arrow 360 to extend members 310,320 into de-casing region 215 (FIG. 23) or in the direction of arrow 361 to retract members 310,312 from de-casing region 215 (FIG. 33).

Figure 38:
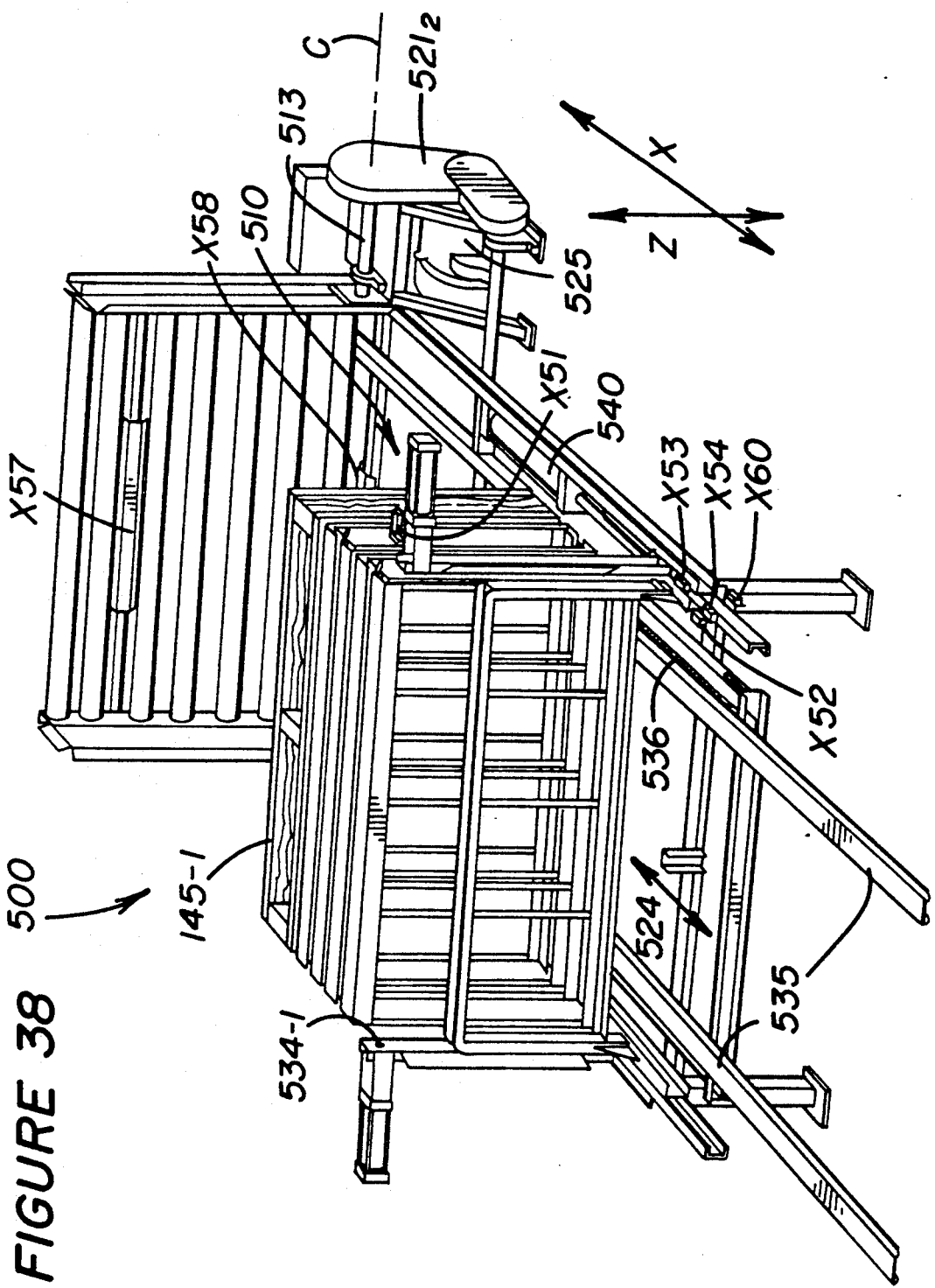

Casing member 310 is also provided with motor 325 for rotating a removed sideframe member 180° about pivot point "A" on member 310 (FIG. 31). As will be described in further detail below, the rotation of de-casing member 310 about pivot point "A" allows for sideframe to be rotated and positioned in an interdigited fashion with respect to an opposing sideframe 102 such that the frame members may be stacked in a fashion such as is shown in FIG. 38.

A plurality of sensors are provided on apparatus 300 for allowing the central control system to monitor the position of members 310,312 and sled 330. Sensor X38 (not shown) senses the sled 330 at its "extended" or "out" position (shown in FIG. 27) wherein members 310,312 are positioned on opposite sides of an encased bale 60. Sensor X37 senses the sled 330 in its "retracted" position (shown in FIG. 25). Sensor X44 detects whether member 310 is in its "normal" position, and sensor X43 detects whether member 310 is in its "rotated" position (FIG. 31,32). Each member, 310,320 is also movable along the X-axis, allowing members 310,320 to converge together and pull apart to engage and release, respectively, an encased bale 60, and position sideframe members 100,102 in an interdigited fashion. Sensor X39 is provided to detect the contracted position (FIG. 32), and sensor X40 detects the "open" position of members 310,320. Sensor X41 is provided on each removal member 310,320 to detect the position of the member with respect to encased bale 60. As noted above, grappling fingers 312,314 are retractable along the Y-axis to secure a slotted sideframe 100,102 in members 310,320. Sensor X42 is provided on frame stops 318,328 to detect the presence of a sideframe 100,102 being pushed against frame stops 318,328 by grappling member 312,322.

Figure 25:
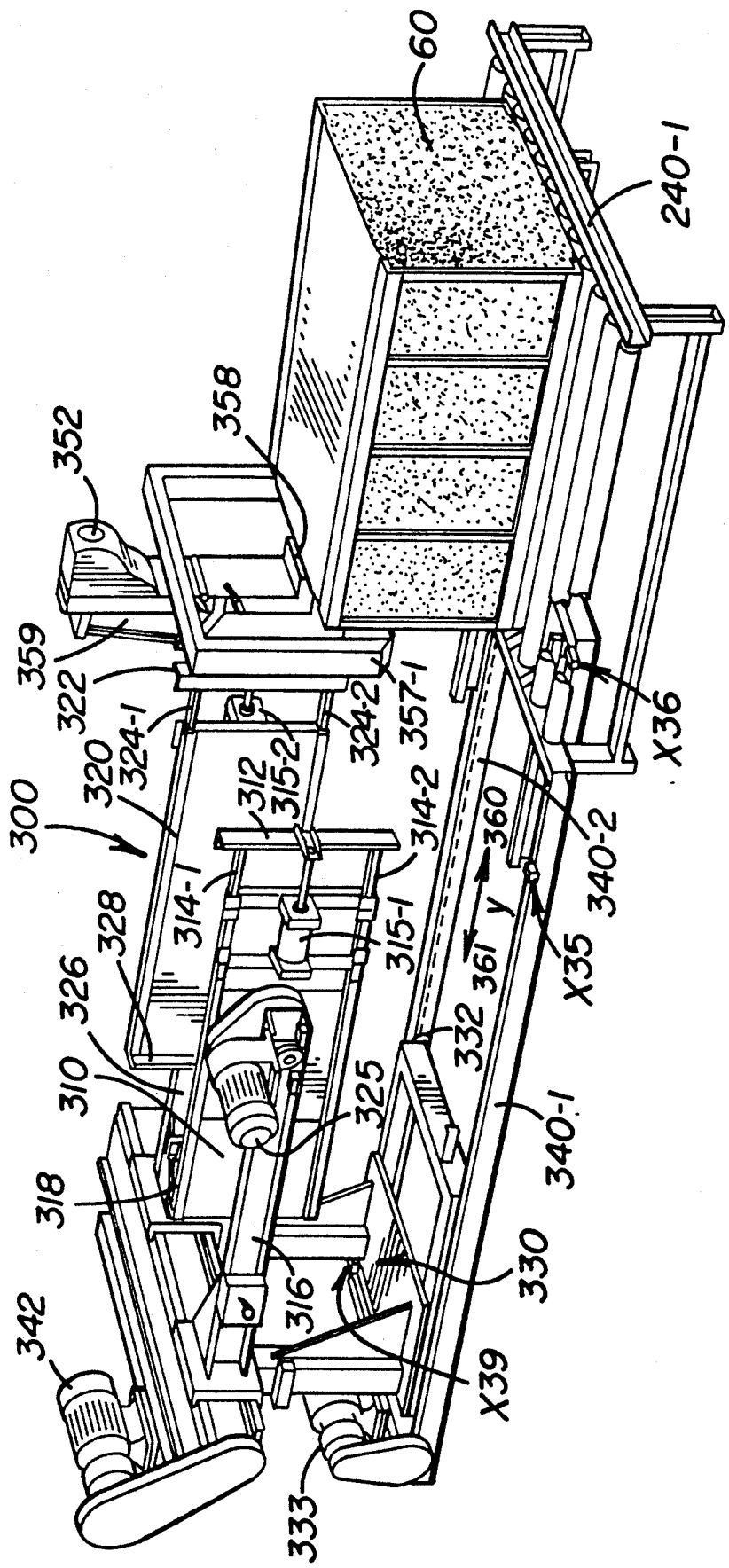
FIG. 25 is a partial, perspective view of the de-casing apparatus of the present..invention showing the case holding portion of the casing apparatus in its forward position.
Figure 26:
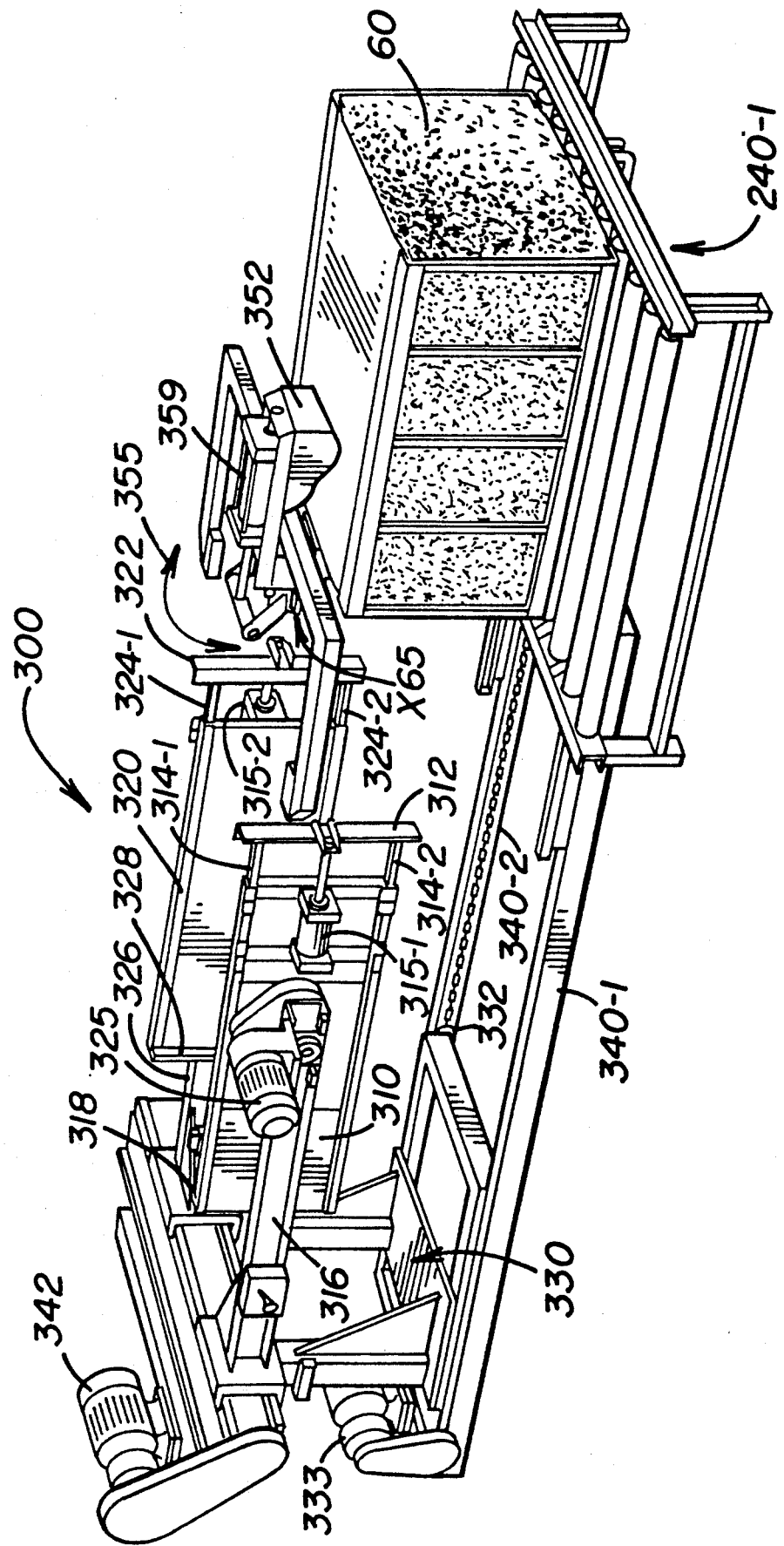
FIG. 26 is a partial, perspective view of the de-casing apparatus of the present invention showing the case holding subassembly of the casing apparatus in its "case holding" position.

Apparatus 300 further includes bale holder assembly 350, including weighted metal shoe 352 mounted on rotatable positioning arm 354. Arm 354 pivots in the direction of arrow 355 about hinge 353 to clamp encased bale 60 and interlocking members 110,112 in de-casing region 215 prior to removal of sideframe members 100,102 (FIG. 26). Assembly 350 is mounted to a carriage 356 which is extended and retracted by pneumatic cylinder (not shown) coupled thereto. Sensors X36 and X35 (FIG. 25) are provided to detect sled 356 and assembly 350 in their "forward" position wherein sled 356 is adjacent to casing region 215, (FIG. 25) and its "out" position When it is retracted from the de-casing region 215 (FIG. 24). When sled 356 moves forward, side arms 357-1,357-2 and vertical frame 358 tend to push against the encased bale 60, positioned in mounting region 215, to align encased bale 60 in a position for de-casing. A pneumatic cylinder 359 provides power and control of rotation of metal shoe 35 about hinge 353. Sensor X65 (FIG. 26) is provided to detect whether shoe 352 is in its rotated, case holding position.

Figure 30:
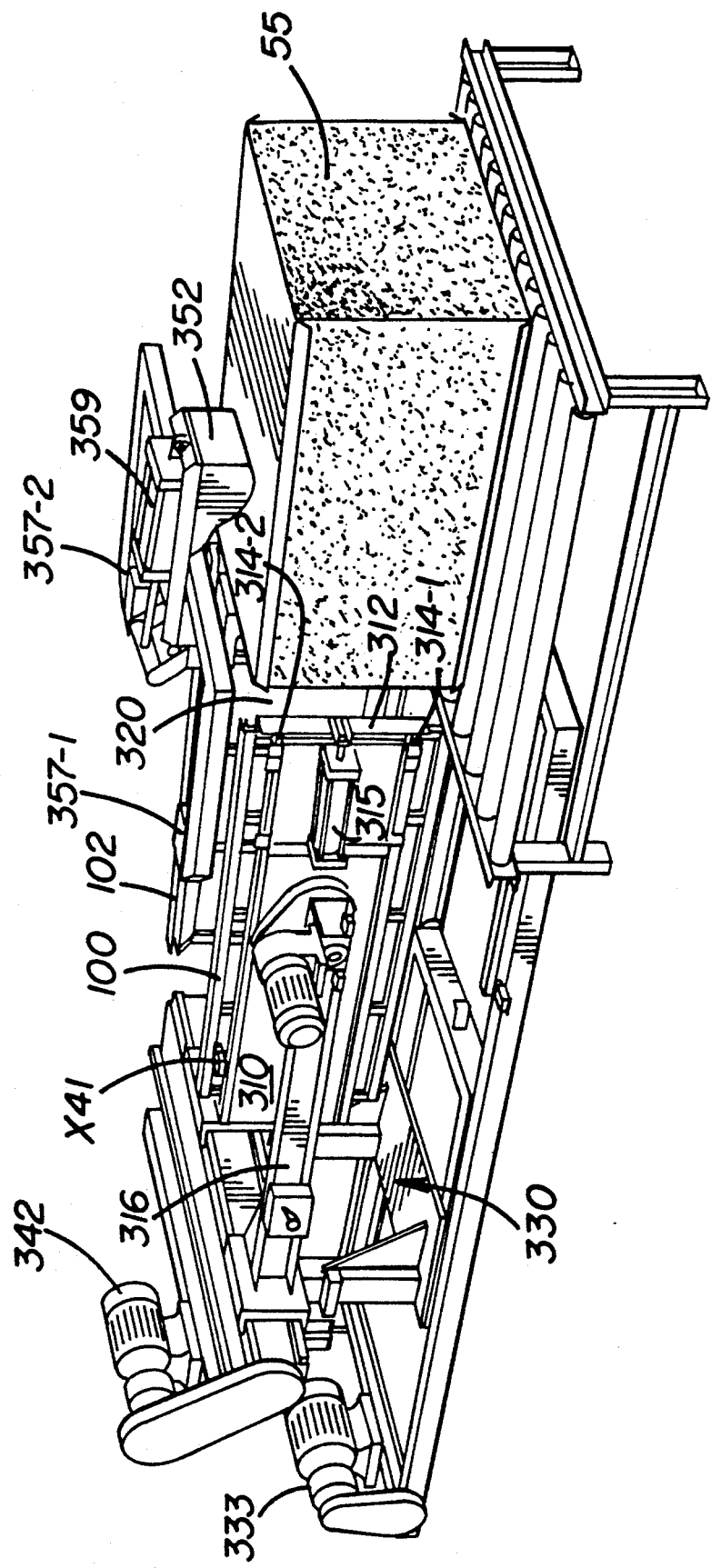
FIG. 30 is a partial, perspective view showing the dec-casing apparatus of the present invention holding slotted sideframes which have been removed from a bale of material.
Figure 30A:
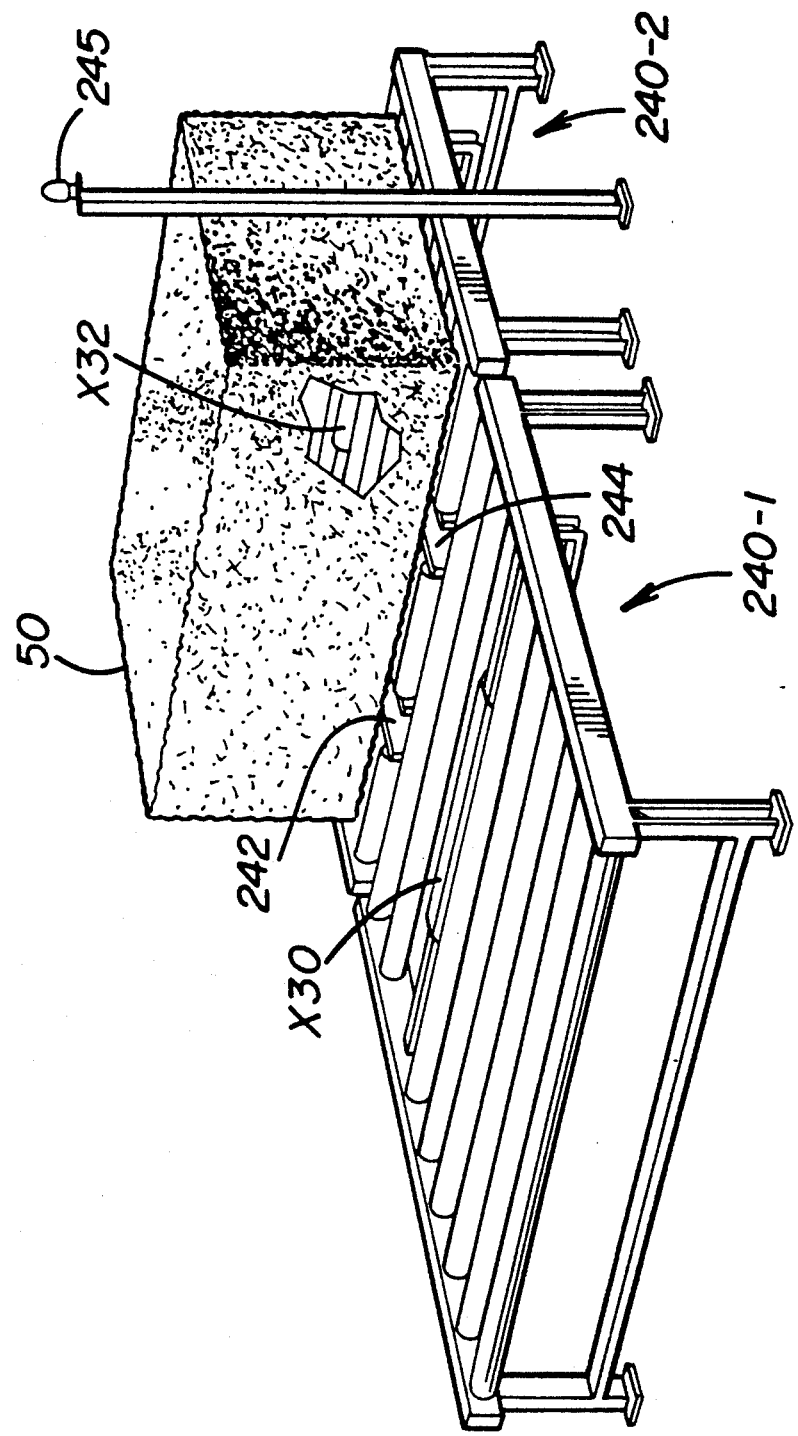
FIG. 30A is a perspective view of a bale from which a casing member has been removed being positioned on a discharge conveyor of the de-casing system of the present invention.

Conveyor 240 is divided into two sections, conveyor assemblies 240-1 and 240-2 (see FIGS. 18 and 30A). As shown in FIG. 30A, conveyor assembly 240-1 is provided with sensor X30 to detect the presence of an encased bale 60 thereon. The automatic control system maintains an encased bale 60 in de-casing region 215 on conveyor assembly 240-1 until the "CASE PASS" push button or the "DE-CASE" manual push button is pressed on the control panel.

Upon receiving a de-case signal from the "DE-CASE" push button, the automatic control system checks to determine whether or not the following conditions are true: (1) sensor X30 detects a case in de-casing region 215; (2) conveyor assembly 240-1 is stationary; (3) sled 356 is at the "out" position and shoe 352 is in the non-rotated, "release" position; (4) sled 330 is at the retracted position; and (6) vertical positioning carriage 420 is at its "up" position.

If the aforementioned conditions are true, sled 356 is activated to position itself along the Y-axis in a direction toward conveyor assembly 240-1. As shown in FIG. 25, as vertical frame 358 and side arms 357 are moved forward, they will encounter the encased bale 60 in de-casing region 215 and align it with respect to shoe 352. When sled 356 engages sensor X36, it will continue to move sufficiently to ensure that the sensing of sensor X36 is secured. At such point, sled 356 stops and shoe 352 is activated along the direction of arrow 355 such that shoe 352 engages the upper interlocking member 110 of the encased bale 60. Shoe 352 will remain in the "case hold" position throughout the frame removal operation and the rotation of shoe 352 in this position is held continuously activated throughout the de-casing operation.

The automatic control system then checks to determine whether or not the following conditions are true: (1) sled 330 is at the "out" position; (2) members 310,320 are in the "open" position wherein such members are a sufficient distance apart from each other to surround encased bale 60 positioned on conveyor assembly 240-1; (3) member 310 is at its "normal," non-rotated position; (4) members 310 and 320 are free of any sideframe members; and (5) frame transporting apparatus 370 is not holding any sideframe members, or is at a "deposit" position (discussed further below).

Figure 27:
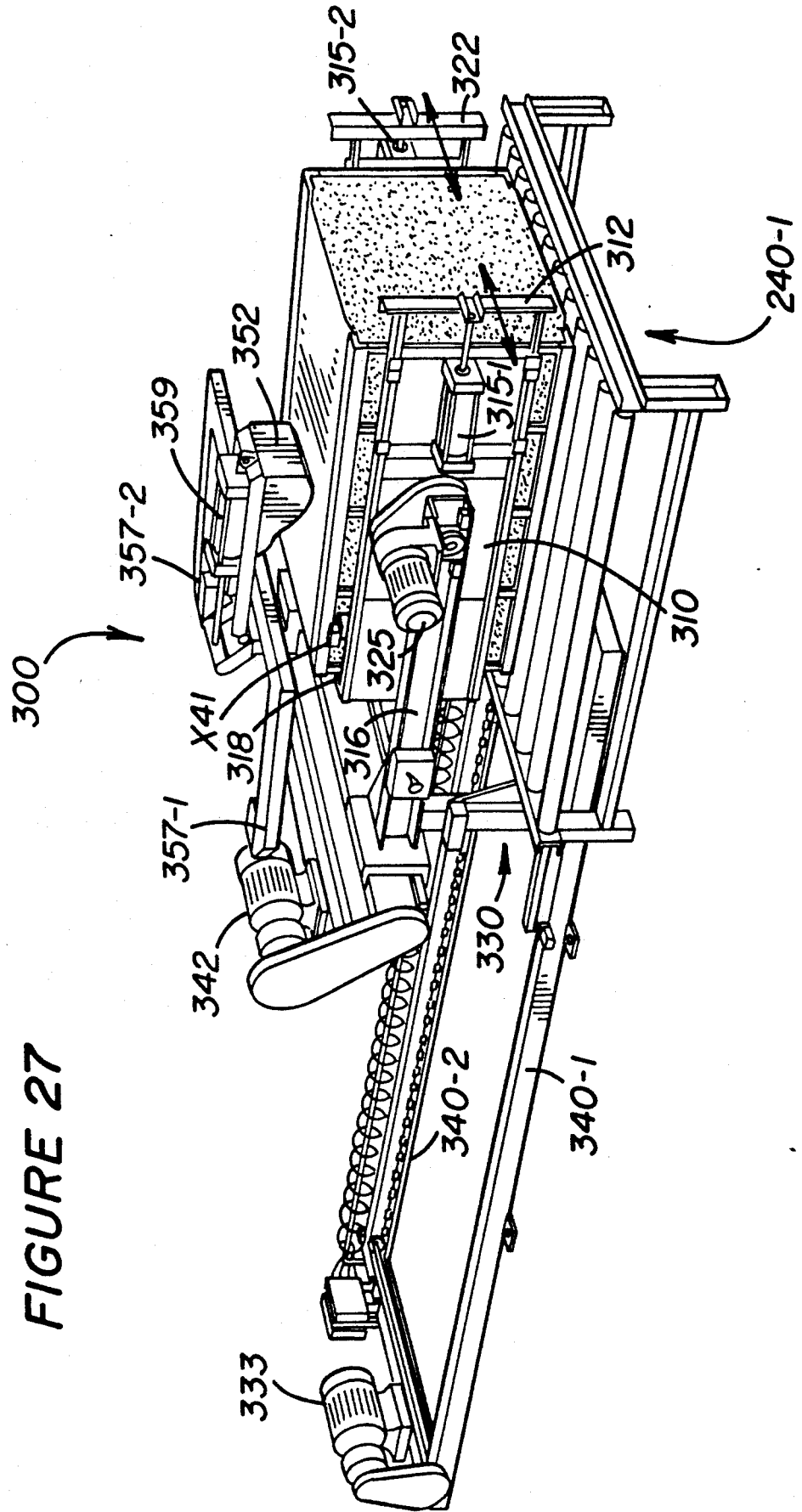
FIGS. 27 and 28 are perspective views of the decasing apparatus of the present invention showing the case removal arm operating to remove sideframe member from an encased bale.
Figure 28:
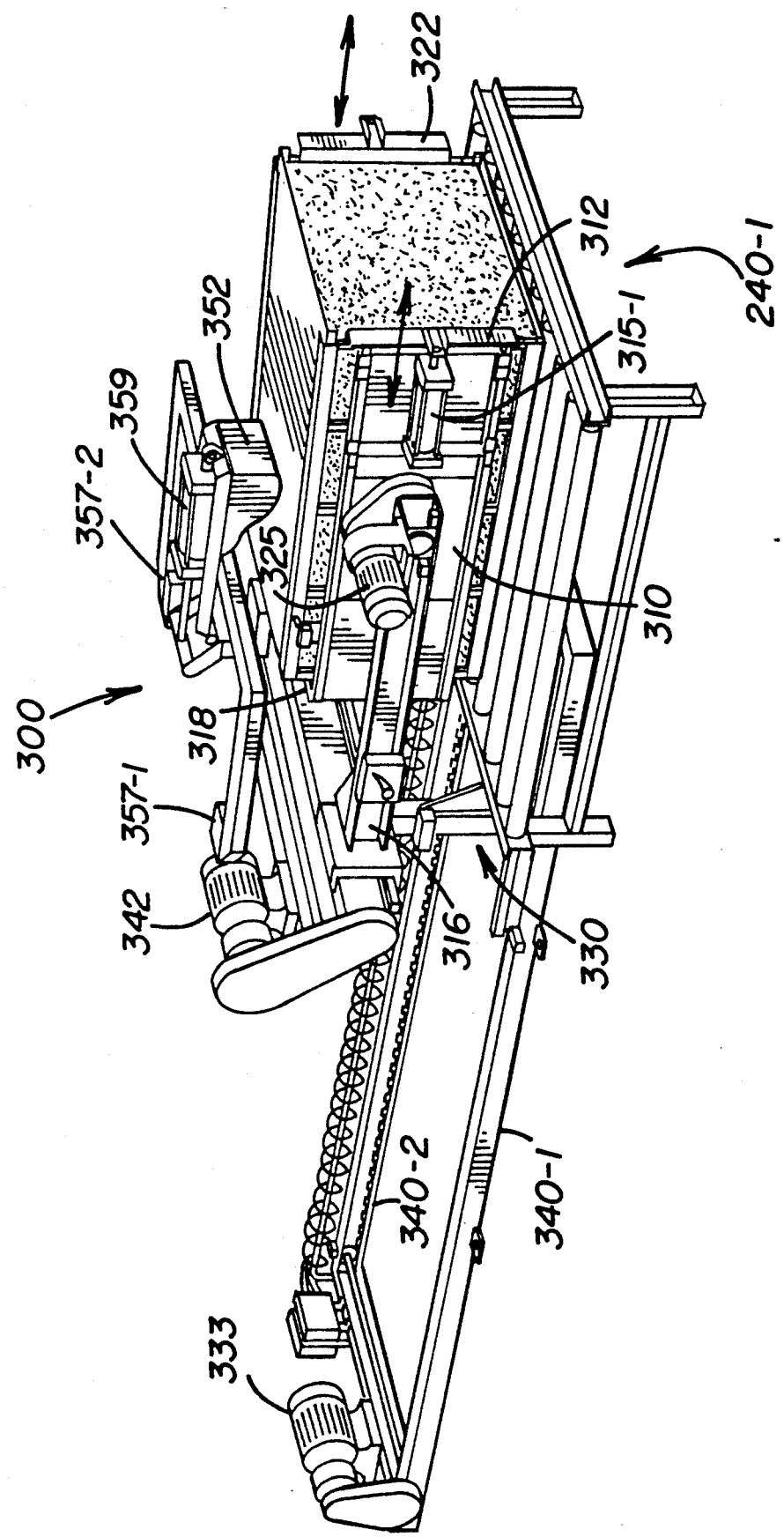
Figure 29:
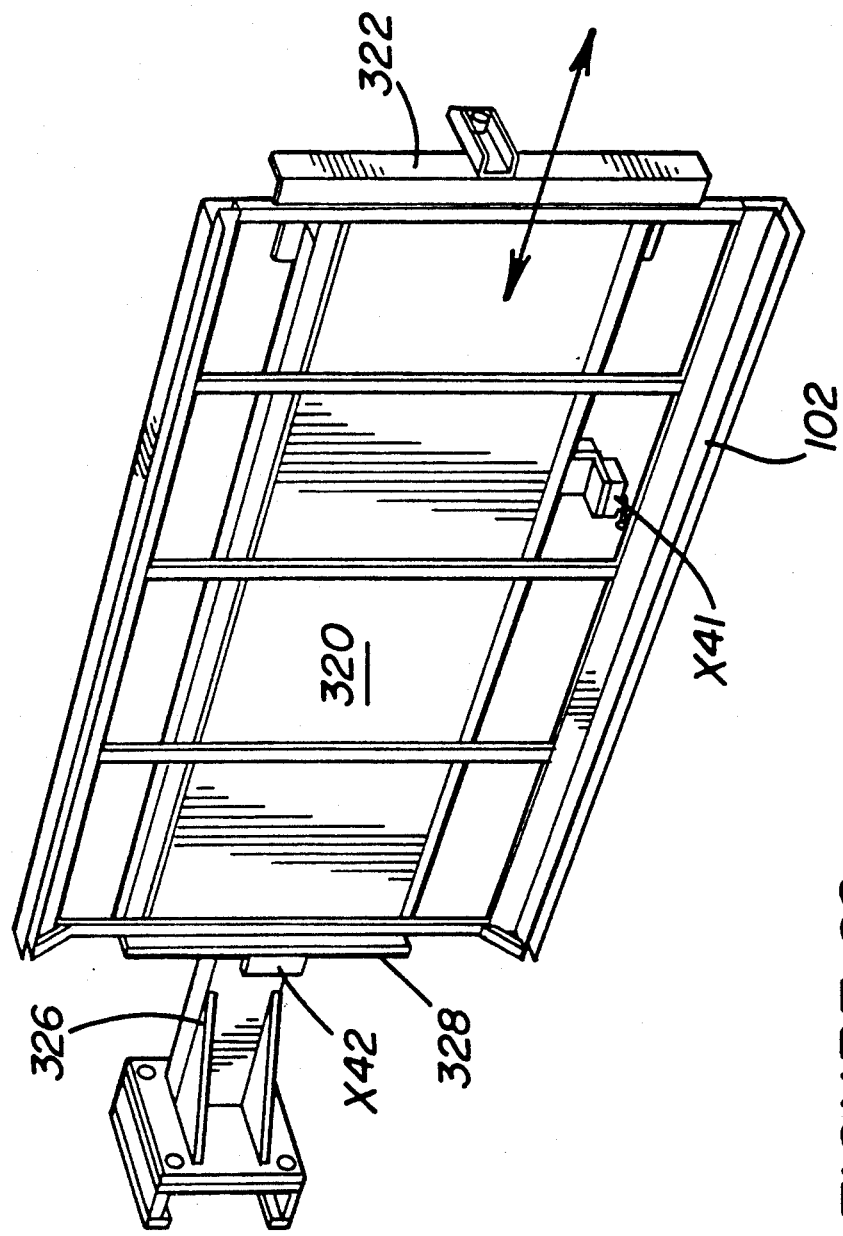
FIG. 29 is a partial, perspective view of a frame removal member of the de-casing apparatus of the present invention.

If the aforementioned conditions are true, sled 330 is activated along the Y-axis in a direction of arrow 366 toward conveyor assembly 240-1. As sled 330 moves forward, each grappling finger 312,314 is extended away from members 310,320, respectively, to their "open" position. When sled 330 reaches sensor X38 at the "forward" position, it will continue to move a sufficient amount to ensure that the accuracy of detection for sensor X38 is secured. At this point, as shown in FIG. 27, sideframe members 310,320 are adjacent encased bale 60 and grappling fingers 312,314 are extended beyond the edge of encased bale 60. Members 310,320 are in a position to close around bale 60.

Once sled 330 has reached the "forward" position, the automatic control system will check whether or not the following conditions are true: (1) members 310,320 are not holding onto any slotted sideframes; (2) an encased bales 60 is present on conveyor assembly 240-1; (3) sled 356 is at its forward position with shoe 352 in its "rotated" position; and (4) an "abort" of the frame removal operation has not occurred (see below). If the aforementioned conditions are true, members 310,320 are caused to converge along the X-axis, bringing them into contact with encased bale 60. When sensors X41 engage slotted frames 100,102, members 310,320 continue to converge sufficiently to ensure that the detection of sensors X41 are accurate (See FIG. 27.) Grappling fingers 312,314 are retracted towards members 310,320, respectively, which results in each slotted sideframe 100,102 on encased bale 60 being pulled toward frame stops 318,328. Sensors X42 (FIG. 29), provided at stops 318,328, detects the positioning of slotted sideframes 100,102, thereby ensuring members 310,320 are securely gripping slotted sideframes 100,102 (see FIGS. 28 and 29).

Once slotted sideframes 100,102 are secured, carriage 330 is moved in the direction of arrow 361 along the Y-axis towards its retracted position. In so moving, members 310,320 pull frames 100,102, respectively, from encased bale 60 while leaving interlocking members 110,112 in place. Interlocking members 110,112 will be prevented from moving by vertical frame 358 which abuts encased bale 60. Carriage 330 moves until it engages sensor X37 and continues to move until the detection of sensor X37 is secure.

Metal shoe 352 is thereafter rotated in the reverse direction of arrow 355 to move it into its "case release" position, releasing the now de-cased bale 55. Carriage 356 is then retracted in the reverse direction along the Y-axis until it engages sensor X35 and continues to move sufficiently until the detection of sensor X35 is secured.

The arrival of sled 300 at its retracted position, holding a pair of slotted sideframes 100,102, triggers member 310 to rotate 180° in the direction of arrow 33 (see FIG. 31). When member 310 has completed its 180° rotation, it is said to be in its "rotated" position.

Motor 342 is provided on carriage 330 to control movement of beams 316,318 along the Y-axis to converge and diverge with respect to each other. When member 310 has reached its rotated position with a sideframe 100 enclosed therein, members 310,320 converge. Dual sensors X39 detect the completed convergence of beams 316,326, and beams 316,326 continue to move to ensure that the detection of sensors X39 are secured. Slotted sideframes 100,102 are now held in an interdigited, close fashion with respect to each other. Such sideframes are now in a position to be manipulated by frame transport apparatus 370 discussed below.

As will be discussed below, apparatus 370 includes frame picker 380, which will descend to remove the interdigited pair of sideframes 100,102 held by apparatus 300 and place them in a stacked arrangement in frame stacking apparatus 500. Once the frame picker 380 engages interdigited sideframes 100,102, members 310,320 are activated to release the frames and return to their "open" position, engaging dual sensors X40, and continuing to move sufficiently to ensure that detection of sensors X40 is secured. Once at the open position, member 310 will rotate in a direction opposite of arrow 331 to place member 310 in its "normal" position. Apparatus 300 will now be in its position for receiving the next de-case instruction.

On certain occasions, sideframes 100,102 on encased bale 60 may be too tightly arranged about bale material 55 for the grappling fingers 312,322 to pull them toward frame stops 318,328. In such cases, the "de-case" manual push button may be used to assist in removing frames 100,102 from bale 55. If the "de-case" manual push button provides a continuous signal to the central control system, carriage 330 will be activated to reverse along the Y-axis to assist member 312,322 in loosening the members 100,102, respectively, from the bale 55, if the following conditions are true: (1) shoe 325 is in a "case hold" position; (2) members 310,320 have converged onto encased bale 60 and grappling fingers 312,314 are continuously operated in the retract mode; and (3) sideframes 100,102 have not been pulled onto frame stops 318,328.

The forced movement of carriage 330 may result in shoe 352 being pulled back from its "forward" position. To prevent this, carriage 356 is simultaneously activated in the forward direction as long as the following conditions are true: (1) shoe 352 is activated in its "case hold" position and sensor X65 is engaged; and (-2) sensor X36 does not sense the sled 356 at its "forward" position.

In certain cases, the frame removal operation may be aborted. For example, an abort may occur when: (1) members 310,320 are converging onto encased bale 60 and engage sensor X39 before sensor X41 detects encased bale 60; (2) grappling fingers 312,322 are retracted and, after a predetermined amount of time, sensor X42 does not sense slotted sideframes 100,102 at frame stops 318, 328; (3) grappling fingers 312,322 are activated to retract and, for any reason, sensors X41 or X42 subsequently lose detection of frames 100,102 continuously over some period of time; or (4) shoe 352 has been activated to its "case hold" position but, after a lapse of a predetermined amount of time, sensor X65 does not detect the case holder in such position. Each set of the above conditions will result in sled 356 and carriage 330 returning to their "retracted" positions.

Under the following circumstances, sled 356 may be interrupted and stop between its retracted position and its "forward" position. If the following conditions are true, sled 356 will be activated to move it to its "retracted" position: (1) sled 330 is stationary at its "retracted" position and grappling fingers 312,322 are not activated to retract; and (2) vertical positioning carriage 420 is at its "up" position. Further, under certain circumstances, the continuous activation of shoe 352 may be disrupted before the frame removal operation is completed. The central control system detects the situation by checking whether or not the following conditions are true: (1) sensors X41 or X42 sense the presence of a frame member 100,102; (2) carriage 330 is stationary at the "forward" position; (3) there is no indication of members 310,320 having converged onto encased bale 60; and (4) sensor X30 detects a case on conveyor assembly 240-1. If the above conditions are true, shoe 352 is reactivated in the direction of arrow 355 and grappling fingers 312,322 are retracted.

Still further, sled 330 may be interrupted between its "retracted" position and its "forward" position. The central control system checks to determine whether or not the following conditions are true: (1) members 310,320 are not holding any slotted sideframe 100,102; (2) member 310 is in its "normal," non-rotated position; and (3) members 310,320 are in their "open," diverged position. If the above conditions are true, sled 330 is activated in the reverse direction along the Y-axis to move back to its retracted position. Grappling fingers 312,322 are also activated away from members 310,320, respectively, to their "open" position In addition, continuous activation of grappling fingers 312,322 may be disrupted while members 310,320 respectively, are holding a pair of frames 100,102 with carriage 330 at its retracted position and members 310,320 at the "open" position or "close" position. If the above conditions are true, members 312,322 are activated to retract against members 310,320, respectively, to maintain the "closed" position. Finally, members 310,320 may be interrupted and stopped between the "closed," converged position and the open, non-converged position with carriage 330 at its retracted position. If members 310,320 are not holding any frame 100,102, beams 316,326 are reactivated to "open" to prepare for the next frame removal. However, if members 310,320 are holding a pair of frames 100,102, respectively, and member 310 is in its "rotated" position, beams 316,326 will be activated to converge to a "closed" position.

A bale 55 which has been deposited onto conveyor assembly 240-1 may not be suitable for, or may not be required to, have its sideframe members 100,102 removed. In such situations, depressing the "case pass" manual push button on the control panel will cause the control system to check whether or not the following conditions are true: (1) a bale 55 is on conveyor 240-1 and is stationary; (2) sled 356 is stationary at its "retracted" position; and (3) sled 330 is stationary at its "retracted" position. If the above conditions are true, conveyor 240-1 is activated to position bale 55 onto assembly 240-2 until sensor X32 accurately senses the bale having been discharged.

When sideframes 100,102 have been removed from a bale 55, as described above, or when an encased bale 60 has been passed through the system, such bale is ready to be discharged to the discharge conveyor 240-2. The central control system will then check whether or not the following conditions are true: (1) sled 330, holding a pair of sideframes 100,102, is at its "retracted" position; (2) sled 356 is at its "retracted" position; and (3) conveyor 240-1 is stationary with a bale 55 thereon. If the aforementioned conditions are true, conveyor 240-1 is activated to position bale 55 onto conveyor assembly 240-2 until sensor X32 detects the bale having been discharged. As shown in FIGS. 18 and 30A, conveyor assembly 240-2 includes two recesses 242,244 for allowing a forklift to place its forks underneath bale 55 to lift bale 55 from conveyor assembly 240-2. Sensor X32 is provided on conveyor assembly 240-2 to detect a bale 55 which has been discharged. Light 245 is provided to call a forklift when a bale 55 has been provided on conveyor assembly 240-2. In one embodiment, assembly 240-2 may be linked to a further conveyor system for further processing of bale 55.

Sideframes 100,102 which have been removed from bale 55 and which are held vertically by de-casing apparatus 300, are thereafter automatically removed and horizontally stacked to facilitate their removal, storage and re-use.

Frame transporting apparatus 370 is provided to remove the interdigited sideframe members from de-casing apparatus 300 and transport the members to frame stacking apparatus 500. Transport apparatus 370 will be described with reference to FIGS. 23, 33-36, and 39.

Frame transport apparatus 370 is comprised of frame picking assembly 380 mounted on overhead track structure 390. Track structure 390 is mounted to bale positioning apparatus 400 and includes two guide tracks 392 and 394. A motor (not shown), gear shaft 393, and chain drive arrangement 395, are provided for positioning carriage 375, on which frame picking assembly 380 is mounted, with respect to the X-axis. Carriage 375 moves assembly 380 between a position directly over members 310,320, a "picking" position when carriage 330 is in its "retracted" position, and a "deposit" position when carriage 330 is over stacking apparatus 500. Sensor X45 is provided to detect carriage 375 at its "picking" position; sensor X46 is for detecting carriage 375 in its "deposit" position.

Frame picking assembly 380 includes first and second hooks 381,382 and backing plate 383 with hooks 381,382 arranged to be movable against back plate 383 between an open and closed position, powered by pneumatic cylinder 384 coupled to cross beam 385. This allows frame picker 380 to engage and securely hold interdigited frame members 100,102 for transport as discussed below.

Frame picking assembly 380 may be raised and lowered along the Z-axis by large pneumatic cylinder 377. Two rods 386 and 387, mounted to carriage 375, stabilize picker 380. Pneumatic cylinder 377 positions a frame picker 380 at one of three levels with respect to the Z-axis. At its lowest level, generally referred to as the "picking" level, frame picker 380 is low enough to engage slotted sideframes 100,102 in apparatus 300 (FIG. 35A). Sensor X49 is provided to detect picker 380 at this level. At its highest level, generally referred to as its "up" or "transport" level, sensor X47 is provided to detect the high positioning of apparatus 380. At an intermediate level, generally referred to as the "deposit" level, picker 380 is vertically positioned to place sideframes 100,102 in stacking apparatus 500, as will be discussed in further detail below. Sensor X48 is provided to detect this level of transport.

As will be described below, frame transport apparatus 370 delivers interdigital sideframes 100,102 to a sideframe stacking apparatus 500, which will be described with reference to FIGS. 34-42. Sideframe stacking apparatus 500 provides an automated means for stacking interdigited sideframe members in a vertical relationship as shown, for example, in FIG. 41.

Figure 34:
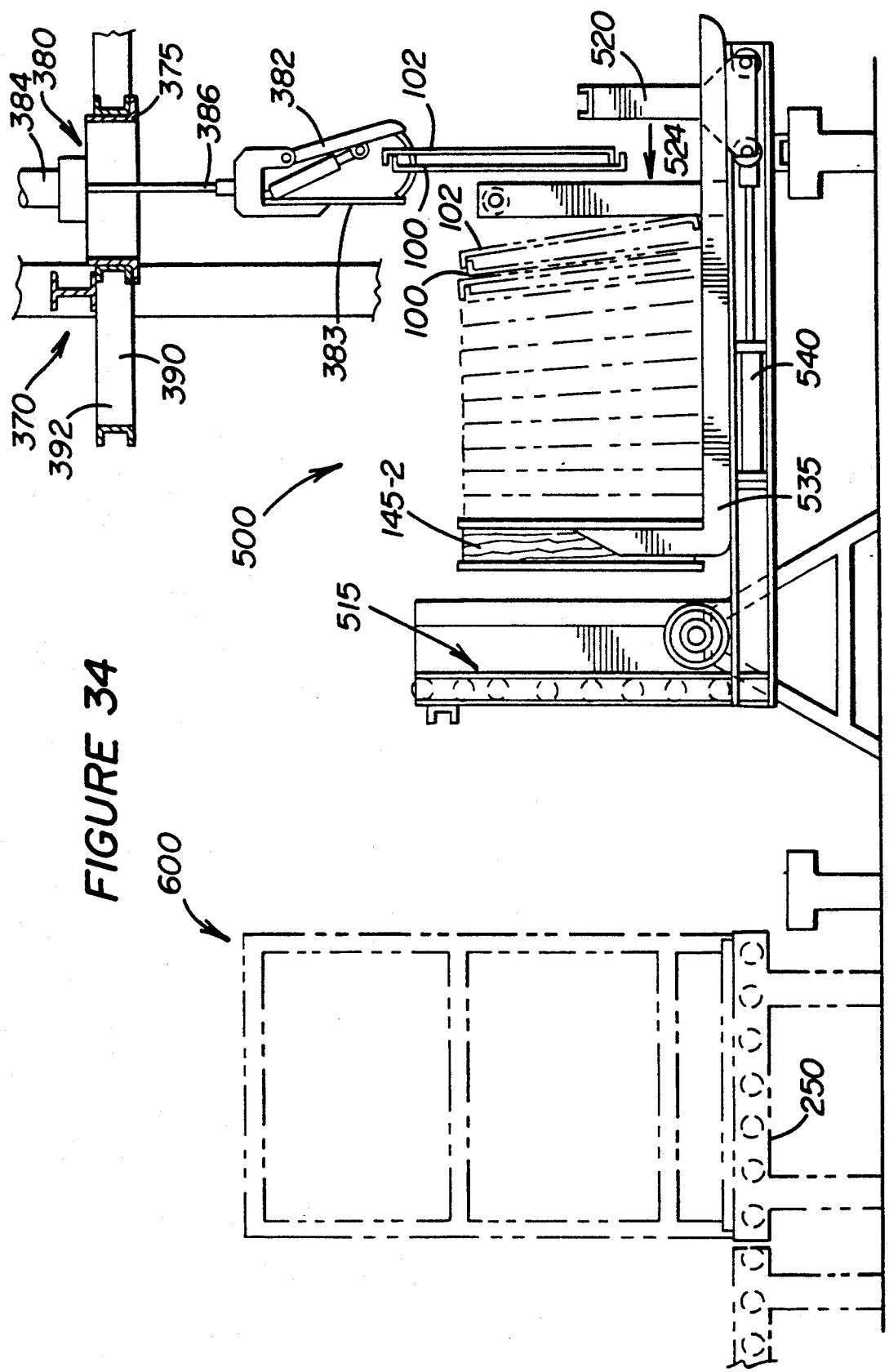
FIG. 34 is a side view of the sideframe stacking apparatus of the present invention along line 34—34 in FIG. 18.
Figure 36:
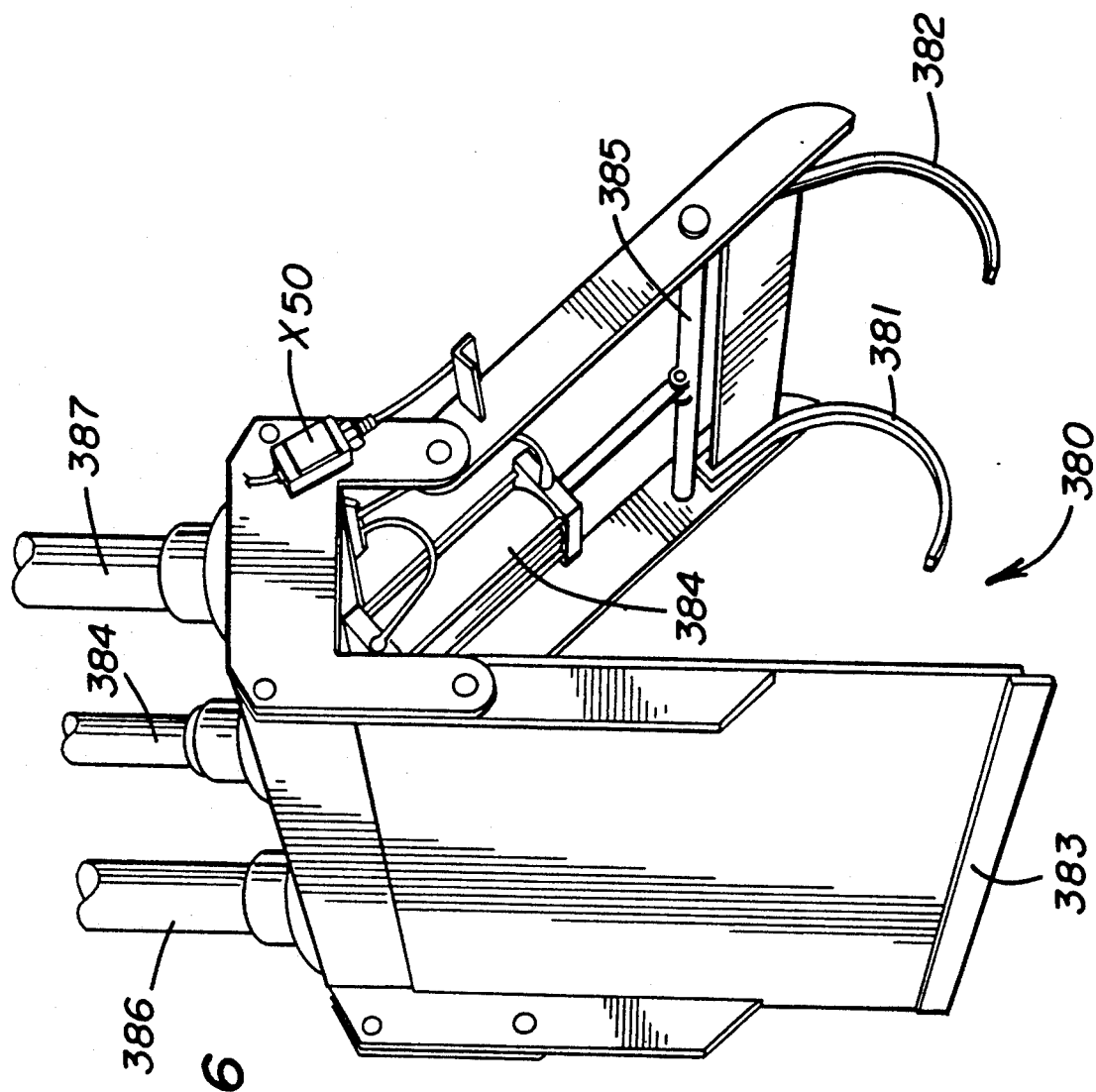
FIG. 36 is a perspective view of the frame picking assembly of the case stacking apparatus of the present invention.
Figure 37:
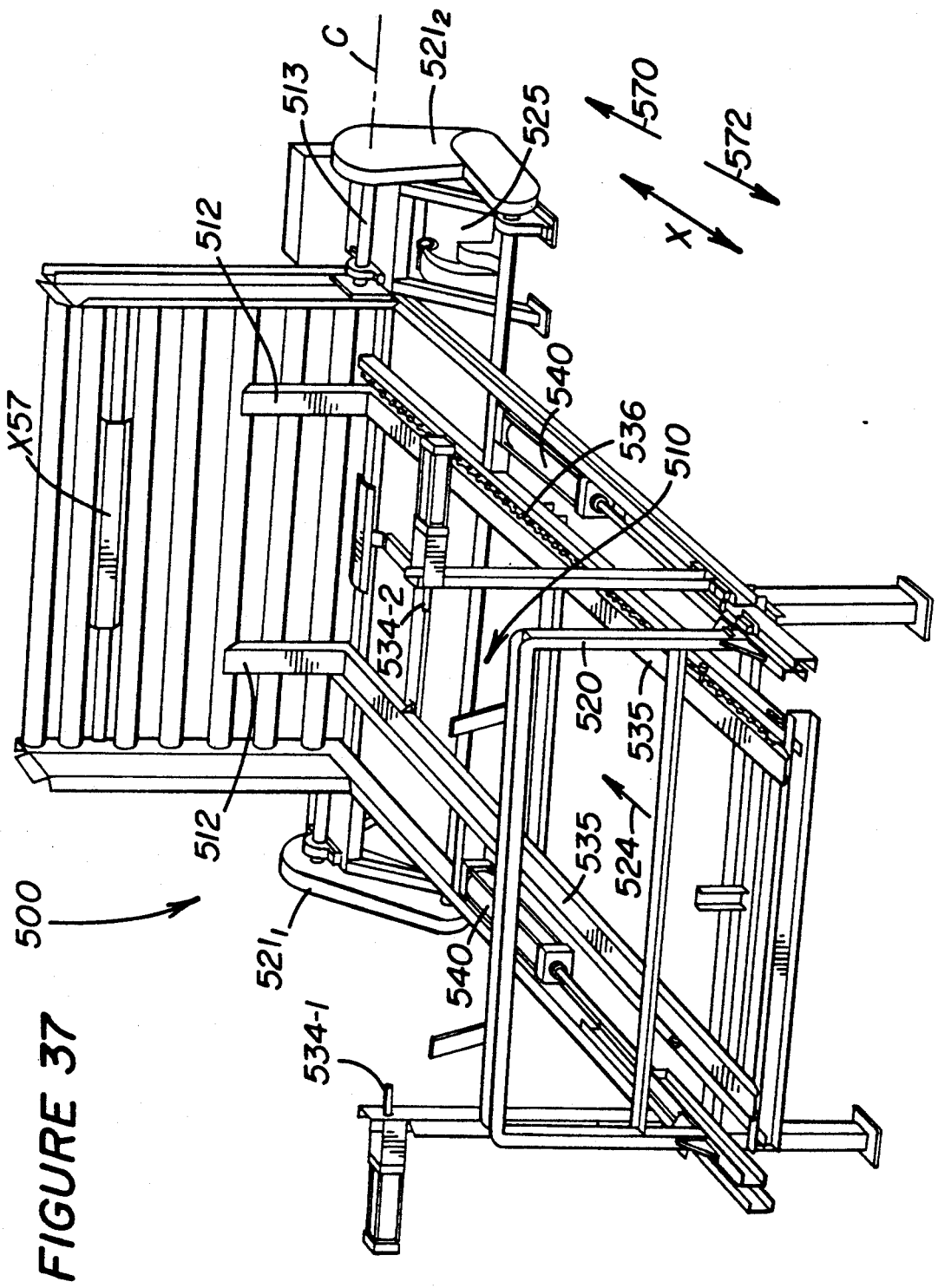
FIG. 37 and 38 are perspective views of the case stacking apparatus of the basing system of the present invention.

With reference to FIG. 37, frame stacking apparatus 500 generally comprises a L-shaped stacking bin 510 which is rotatable 90 about an axis C, to allow the vertically-oriented sideframe members to be stacked horizontally, as will be described below. Bin 510 includes a frame stacking ram 520, frame holding pins 534-1, 534-2, sliding bed 535, and discharge conveyor 515. Bed 535 includes forks 512 for securing vertically-oriented shipping pallet 145 thereon. Subsequent to rotation of the bin 510, bed 512 with base pallet 145-2 thereon will lower onto conveyor region 515. Bed 535, with pallet 145 positioned thereon, will provide a receptacle in which sideframe members 100,102 may be vertically stacked, as discussed below. Stacking ram 520 is pneumatically operated by cylinder 540 in the direction of arrow 524 to force the vertically-oriented, interdigited sideframe members 100,102 in bin 510 against the position of pallet 145 on bed 535 (FIGS. 34, 38). Ram 520 forces each set of interdigited frame members 100,102 in bin 510 in the direction of arrow 524. Three sensors, X52, X53, and X54, detect the position of ram 520 at its "out" position (abutting stacked sideframes), "intermediate" position, and "retracted" position. Sideframe holding pins 534-1, 534-2 retract and extend to allow sideframe members 100,102 to be forced by ram 520 against pallet 145. Sensor X51 is provided to detect the retracted position of pins 534. Sliding bed 535 is positionable along the X-axis by means of a motor (not shown) coupled to chain assembly 536 between a "out" position, wherein forks 512 are adjacent ram 520, and a "in" position where forks 512 are adjacent conveyor 515. Sensor X55 and X56 are provided to detect bed 535 at its "out" and "in" positions, respectively. Sensor X58 is provided to detect a pallet 145 on forks 512.

Bin 510 is rotatable about axis C through means of an axle assembly 513 powered by motor 525 coupled to chain assemblies $521_1$, $521_2$ FIGS. 34-38 depict bin 510 in its "down" position; sensor X60 is provided to detect bin 510 in its "down" position. FIGS. 39-42 depict bin 510 in its "standing" position; sensor X59 is provided to detect the positioning of bin 510 in this position. When bin 510 is in its "standing" position, pallet 145 will be placed onto conveyor 515; placement of pallet 145 on conveyor 515 will be detected by sensor X57.

The operation of sideframe stacking function of the de-casing apparatus of the present invention will be described with reference to FIGS. 33-42. Carriage 375 generally maintains itself at a "picking" position over apparatus 300 with frame picking assemble 380 at its highest level with respect to the Z-axis. At this position, hooks 381,382 are maintained in a "open" position by continuous activation of pneumatic cylinder 384 in the direction away from metal backing plate 383.

Once frame removal members 310,320 have positioned sideframes 100,102 in an interdigited fashion in apparatus 300, the automatic control system will determine whether or not the following conditions are true: (1) grappling fingers 312,322 are being retracted toward members 310,320, respectively; (2) sensor X42 detects a pair of sideframes pushed against frame stops 318,328; (3) sensor X41 detects a pair of slotted sideframes 100,102 in members 310,320, respectively; (4) sensor X37 detects carriage 330 at a "retracted" position and sensor X39 detects members 310,320 at a "converged" position (such that sideframes 100,102 are provided in an interdigited relationship); and (5) carriage 375 is at its "picking" position with assembly 380 at its "up" level, and hooks 381,382 are being continuously activated in direction opposite from backing plate 383 in an "open" position. If the aforementioned conditions are true, assembly 380 is activated in a downward direction with respect to the Z-axis. When assembly 380 arrives at the "picking" level, it engages sensor X49 and continues to move down to ensure that X49's section is secure. Frame picking assembly 380 is now positioned at its lowest level, with hooks 381,382 "open" or apart from metal backing plate 383 such that the interdigited frame members are surrounded by, on one side, hooks 381,382 and on the other side by backing plate 383. Pneumatic cylinder 384 then operates to close hooks 381,382 against metal backing plate 383 (FIG. 35A). Frame picking assembly 380 is now in position to take sideframes 100,102 from apparatus 300. As described briefly above, the automatic control system, once detecting frame picking assembly 380 in this position, activates members 310,320 in divergent directions, thereby releasing the pair of slotted sideframes 100,102 to picking assembly 380. Once sensor X39 does not detect beams 316,326 in a "closed" position, assembly 380 is activated upward with respect to the Z-axis to move it to its highest or "up" level (FIG. 35B). When assembly 380 arrives at its "up" level, sensor X47 detects this positioning and assembly 380 continues to move sufficiently to ensure the detection of the sensor X47 is secured.

At this point, the automatic control system checks to discern whether or not the following conditions are true: (1) horizontal carriage 375 is at its "picking" position (over de-casing apparatus 300) and assembly 380 is at its "up" level with hooks 381,382 being activated in the direction towards backing plate 383, with sensor X50 not detecting an "open" position; (2) member 310 is not rotating; (3) sensor X60 detects apparatus 500 in a position wherein it is available for receiving additional sideframes (e.g., a "down" position); (4) sensor X58 senses a base pallet 145 on the sliding bed of apparatus 500; (5) sensor X56 does not sense sliding bed 5 at an "in" position; (6) sensor X51 does not detect slotted sideframe holding pins 534-1, 534-2 in a "release" position; and (7) sensor X54 detects slotted sideframe ram 520 in its "retracted" position.

If the aforementioned conditions are true, carriage 375 is activated to move from its "picking" position to its "deposit" position, placing slotted sideframes 100,102 over stacking apparatus 500. Once carriage 375 reaches the "deposit" position, it will engage sensor X48 and continue to move sufficiently to ensure that the detection of sensor X48 is secured. During the entire operation, fingers 381,382 are continuously activated in the direction to engage backing plate 383 to maintain assembly 380 in a "closed" position. Assembly 380 is then lowered to its "intermediate" vertical level; upon reaching this level, it will engage sensor X53 and continue to move sufficiently to ensure the detection of sensor X53 is secured. Stacking arm 520 is now in a position to restrain the pair of slotted sideframes from falling backwards when released by frame picker assembly 380.

Subsequently, hooks 381 and 382 are activated to "open" assembly 380 and the pair of slotted sideframes 100,102 is released into apparatus 500. Frames 100,102 are restrained from falling back into apparatus 500 by stacking ram 520.

Assembly 380 is then activated and raised to its "up" vertical level and returned by horizontal positioning carriage 375 to its "picking" position over apparatus 300. During this sequence, it will engage sensor X47 to ensure that it has raised to its requisite vertical level, and when horizontal travel toward the "picking" position resumes, carriage 375 will engage sensor X45 and continue to move sufficiently to ensure that the detection of sensor X45 is secured. Hooks 381,382 will remain in the open position apart from backing plate 383 during this "idle" level.

As noted above, frame pushing ram 520 is activated to be in its "intermediate" position and pins 524 are retracted to allow a pair of slotted sideframes to be pushed by ram 520 against the pallet 145 or the existing stack of slotted sideframes on bed 535. As soon as assembly 580 has left its "delivery" position and is on return to idling, frame pushing ram 520 is activated to move along the X-axis toward conveyor 515 in the direction of arrow 524, thus pushing the most recently deposited pair of slotted sideframes 100,102 adjacent either pallet 145 or those sideframes currently stacked in bed 535. Ram 520 continues to move towards its "in" position until it engages sensor X52, whereby it will continue to move to sufficiently ensure the detection of sensor X52 is secure.

Frame holding pins 534 are then released, thereby holding the vertically stacked sideframes now present in bed 535. Pins 534 will remain in this position at all times other than when a pair of stack sided frames 100,102 is delivered to bed 535. The vertically stacked sideframes 100,102 in bed 535 are expected to slant in a direction towards pallet 145 on forks 512 (FIG. 34). If the frames slant in a reverse direction (e.g., toward pins 534), such pins 534-1, 534-2 will restrain the movement of the vertically oriented sideframes. Ram 520 will then be activated in the reverse direction away from pallet 145 to move it to its "retracted" position. Sensor X54 will detect this movement and ram 520 will move until the detection of the "retracted" position is secure. Bed 535 will be pushed by stacking ram 520 towards conveyor 515 with the addition of each new set of vertically oriented sideframes. Eventually, ram 520 will push bed 535 onto sensor X56. When this occurs, bin 510 is full and the stack of slotted frames will be discharged from apparatus 500.

When bed 535 is full, the automatic control system will check to determine whether or not the following conditions are true: (1) bin 510 is in its "down" position; (2) a base pallet 145 is present on forks 512; (3) sensor X56 detects the presence of a full bed 535; (4) holding pins 534 are in their "extended" position; (5) ram 520 is in its "retracted" position; (6) bin 510 is not rotating from its "standing" position to its "down" position; (7) bed 535 is not activated to its "out" position; (8) base pallet feeding assembly (discussed below) is at its "home" position; (9) assembly 380 is at its "picking" position and not being activated to retrieve any additional sets of slotted sideframes; and (10) no base pallet 145 is present on discharge conveyor 250.

If the aforementioned conditions are true, bin 510 is activated to rotate in the direction of arrow 532 about axis "C" to position bin 510 in its "standing" position. As bin 510 rotates, the stack of slotted sideframes is turned upright on base pallet 145. Each set of sideframes 100,102 is re-oriented from a vertical to a horizontal position. Bed 535, including forks 512 slides downwards towards discharge conveyor 515, resulting in base pallet 145 engaging sensor X57. When bin 510 arrives at its "standing" position, its position will be detected by sensor X59. Pins 534 will be retracted and the control system will check to determine whether the following conditions are true: (1) base pallet feeding assembly is at its "home" position (see below); (2) bin 510 is at its "standing" position; (3) discharge conveyor 250 is stationary with no stack of sideframes positioned thereon; (4) base pallet 145 is on forks 512; (5) bed 535 is at its "in" position; (6) base pallet 145 is positioned on discharge conveyor 515; (7) discharge conveyor 250 is clear; and (8) pins 534 are in their retracted, "release" position.

If the aforementioned conditions are true, discharge conveyor 515 is activated to move the sideframe stack on pallet 145 to discharge conveyor 250. Conveyor assemblies 250 and 252 activate simultaneously such that pallet 145 is moved form conveyor assembly 250 through to discharge conveyor 252. The sideframe stack on pallet 145 engages sensor X54 and the electronic control system will signal light Y54 to call the attention of the system operator to allow the stack of sideframes to be taken away by forklift or other means.

Figure 42A:
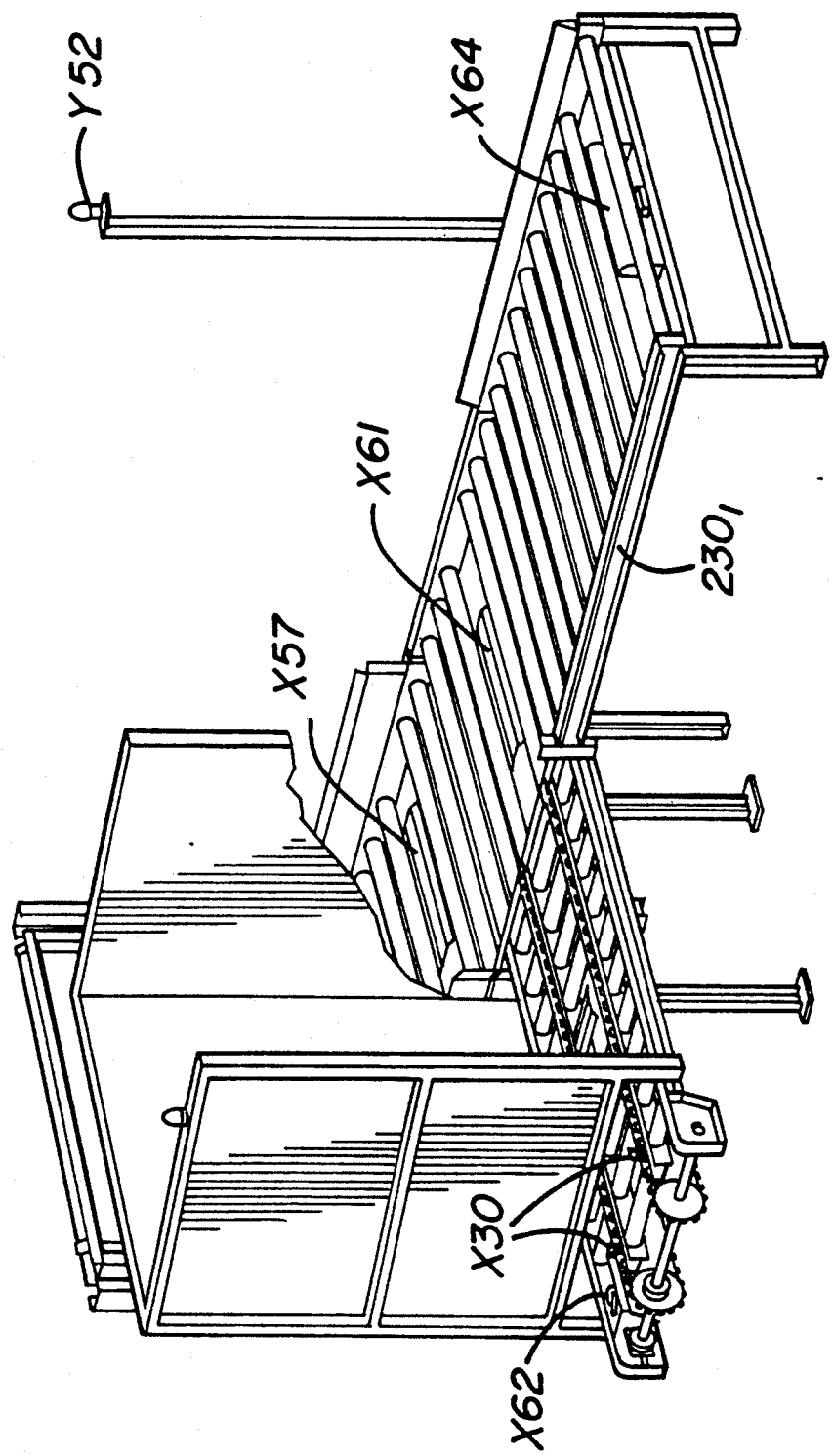

Once the stack of sideframes on pallet 145 has been removed from conveyor 250, apparatus 500 is ready to return to its "down" position to retrieve additional sideframes 100,102. Pallet feed apparatus 600 is provided to supply an additional base pallet 145 to conveyor region 515 after the removal of each stack of interdigited frame members. With reference to FIGS. 39 and 42, pallet feed apparatus 600 includes a bin 610, comprising a 3-walled steel box, serving as a reservoir for a stack of wooden pallets. Each pallet 145 will eventually be used as a base pallet for a stack of sideframes. A portion 615 of bin 610 is open on either side of bin 610 to allow a wooden pallet 145 to move in the direction of arrow 620 (FIG. 42) and onto conveyor 250. Sensor X63 is provided at the base of bin 610 to detect a base pallet therein. A base pallet feeding assembly 630 includes a motor (not shown) coupled to gear assembly 632, driving chains 634 in grooves 635 which carry a base pallet 145 from conveyor 636 to conveyor 250. As shown in FIG. 42A, mounted in driving chains 634 is a pallet feed assembly X30 comprising two mounted roller wheels pallet feed assembly X30 pushes pallet 145-2 onto conveyor 250. Roller wheels allow for assembly X30 to easily move under the pallet stack (not shown) generally present in bin 610.

When a stack of sideframes removed from stacking bin 510 has been placed onto discharge conveyor 252, the automatic control system will determine whether or not the following conditions are true: (1) bin 510 is at its "standing" Position; (2) bed 535 is at its "in" position and with no base pallet 145 present thereon; (3) there is no stack of slotted sideframe members on conveyor 515; (4) there is no stack of sideframes on conveyor 250; (5) pallet feed assembly X30 is at its "home" position; (6) a base pallet 145 is present in bin 6 ; and (7) a stack of slotted frames is not being discharged from bin 510.

If the aforementioned conditions are true, pallet feed assembly 630 is activated to move a pallet in the direction of arrow 620 to position a base pallet 145 onto conveyor 250. As noted above, pallet feed assembly X30 is coupled to chains 634 to ensure that base pallet 145 is positioned squarely on conveyor 250. After positioning base pallet on conveyor 250, feeder assembly X30 returns pallet feed assembly X30 to its "home" position wherein it engages sensor X62 to detect and ensure that the assembly is at its "home" position. A stack of wooden base pallets 145 (not shown) is stacked in bin 610 and are gravity fed onto feed assembly 630. Conveyor 250 and conveyor 515 are then activated to move the base pallet positioned on conveyor 250 in the direction towards forks 512 and bin 510. The two conveyors 250,515 remain activated until both sensor X57 and sensor X58 detect the presence of a base pallet 145 on conveyor 515.

The automatic control system then checks to determine whether or not the following conditions are true: (1) a base pallet has been fed by pallet feeder assembly 630; (2) a stack of slotted frames is not being discharged from conveyor 252; (3) both sensors X57 and X58 detect the base pallet 145 at forks 512; and (4) frame picker assembly 380 is at its "picking" position If the aforementioned conditions are true, bin 510 is activated in the direction reverse of arrow 530 to rotate about axis "C" by 90° to return to its "down" position. When bin 510 engages sensor X60, the rotation about axis "C" is secure. Bed 535 is then activated in the direction of arrow 572 to move it from its "in" position to its "out" position. It engages sensor X55 and continues to move sufficiently to ensure that the detection of sensor X55 is secured. Bin 510 is now ready to receive the next batch of slotted sideframes 100,102 from assembly 380. If the bin 610 is empty, a reservoir empty light may be activated to alert system operators to find additional base pallets thereto. As will be generally understood, the succession of new base pallets 145 is continually fed to apparatus 500 as each new stack of sideframes is removed from conveyor 252.

The de-casing apparatus of the present invention also includes a base pallet stacking apparatus 200 which automatically stores the wooden pallets 145 used for supporting and transporting the three-high pallet stacks 65 of encased bales 60. Apparatus 200 will be described with reference to FIGS. 17, 18, and 43-48.

Apparatus 200 includes a three-sided steel box 260, pallet stacking fork structure 265, pallet holding assembly 285, pallet transfer conveyor 220, and pallet discharge conveyors 230. Steel box 260, with assembly 285, holds a stack of base pallets 145 that is added to each time the final encased bale 60 from successive bale stacks is provided to de-casing apparatus 300. Sensor X17 is provided to detect the presence of a full stack 275 of base pallets in bin 260. Pallet holding assembly 285 includes a single pneumatic cylinder 283 (partially shown) coupled to connecting rod 290, which operates gear assemblies 291,292 which mesh with portions of members 270,272, respectively, to extend and retract members 270,272, as required. Members 270,272 retract when a base pallet 145 is positioned under bin 260 to allow fork structure 265 to raise pallet 145 along the Z-axis above members 270,272. Members 270,272 return to their extended position as fork structure 265 lowers, allowing the base pallet 145 to rest on the members 270,272. Sensors X18 and X19 are provided to detect members 270,272 in their extended and retracted positions, respectively. Fork assembly 265 includes first and second forks 266,267 mounted to carriage 268. Carriage 268 is coupled to chains 284-1, 284-2, which raise and lower forks 266,267 as required. Two retaining members 270 and 272, driven extend and retract to allow a particular pallet 145 to be raised (FIG. 44) by fork structure 265 into steel box 260. Fork assembly 265 is raised and lowered with respect to Z-axis by motor 286, coupled by chain assembly 282, to chain-pulley arrangement 284. Fork structure 265 is movable between a "down" position, detected by sensor X14, an intermediate position, detected by sensor X15, and an "up" position, detected by sensor X16.

Pallet transfer conveyor 220 includes a pallet transfer ram 222 for pushing each base pallet 145 onto fork assembly 265. Ram 222 is mounted on conveyor 220 and is powered by a motor (not shown) coupled to chains 223. Sensor X12 is provided to detect pallet transfer ram 222 in its "home" position shown in FIG. 43. Sensor X2 detects transfer ram 222 at its "forward" position.

Discharge conveyor $230_2$ is also provided with a sensor X13 for detecting a stack of base pallets on conveyor $230_2$ which are ready to be discharged. Sensor X20 is provided to detect a stack of base pallets at the discharge end of discharge conveyor $230_1$ and generates a call light Y52 to signal to the system operator to call for removal of a particular stack from the discharge conveyor $230_1$.

Figure 43:
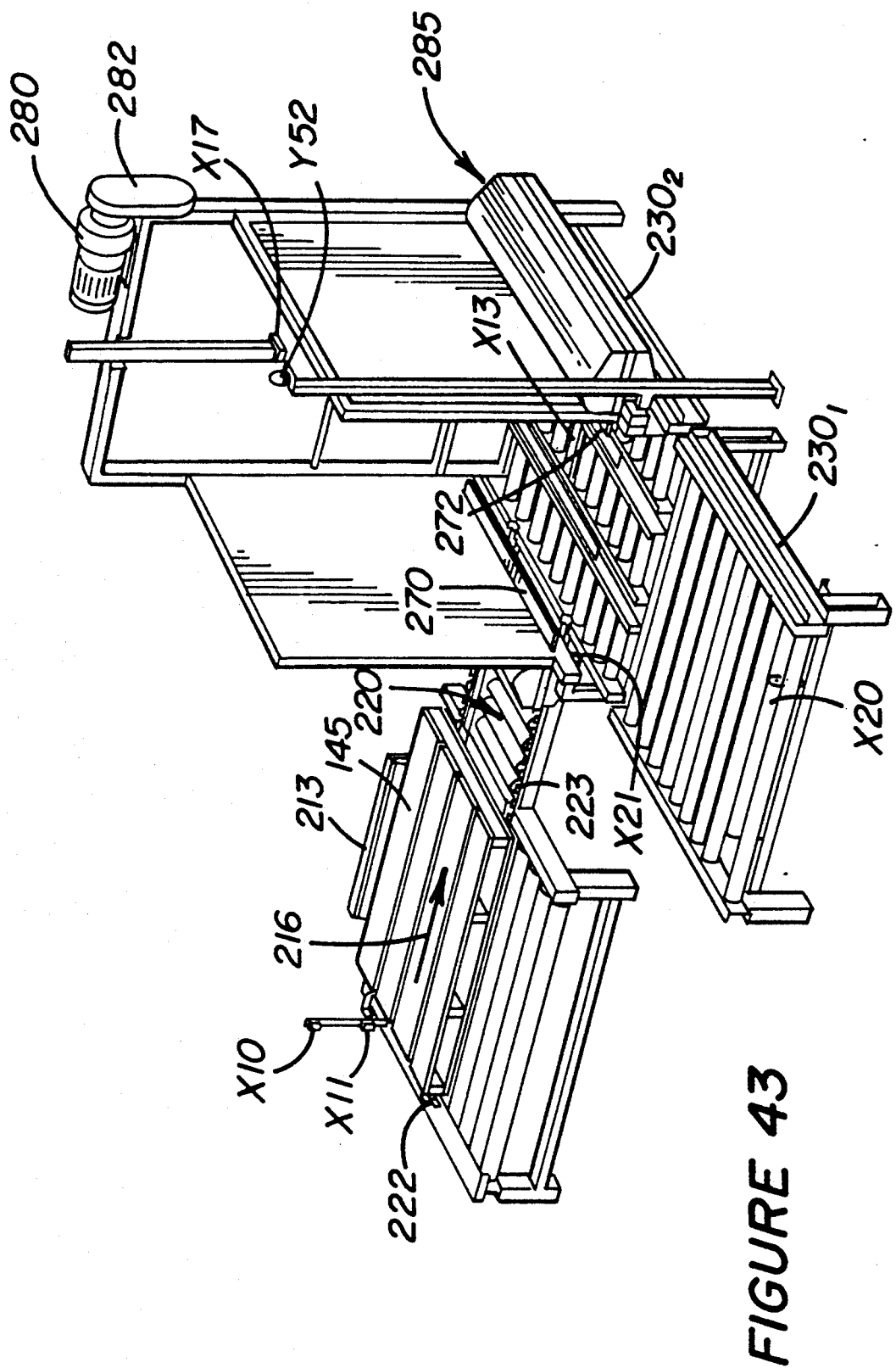
FIG. 43 is a perspective view of the base pallet stacking apparatus of the bale casing and de-casing system of the present invention.
Figure 44:
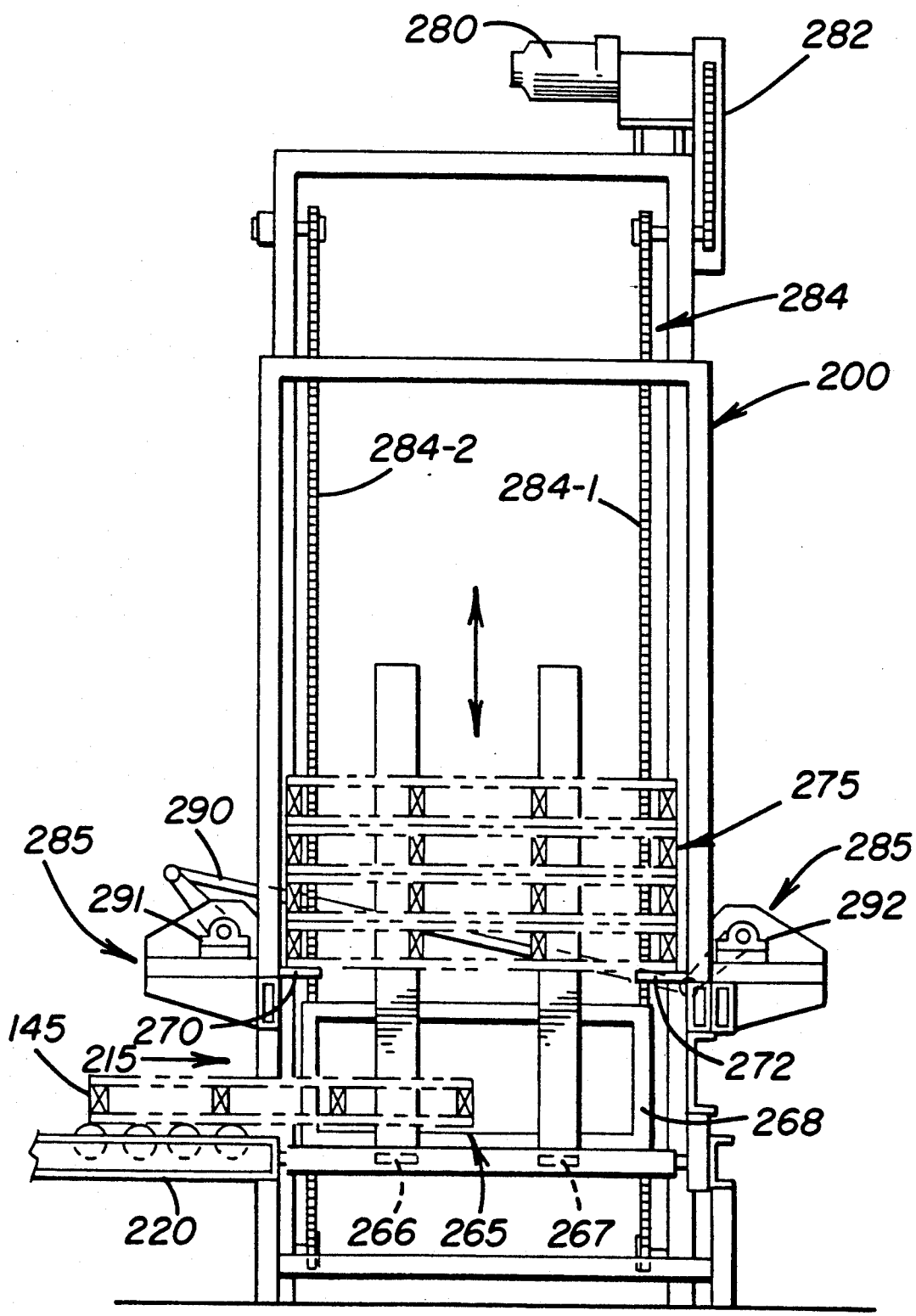
FIG. 44 is a side view along line 44—44 in FIG. 18 of the pallet stacking apparatus of the present invention.

In operation, when the last encased bale 60 in a stack 65 of encased bales has been removed from a base pallet 145 in un-stacking region 212, the following conditions will generally be true: (1) sensors X10 and X11 will not detect an encased bale; (2) sensor X4, provided on conveyor assembly $210_3$, will detect a base pallet 145 sitting thereon. With the above conditions true, sensor control system will check to determine whether or not the following conditions are true: (1) pallet transfer ram 222 is stationary at its "home" or "retracted" position (FIG. 43); (2) conveyor $210_3$ is stationary; (3) fork assembly 265 is stationary at its "down" position; and (4) discharge conveyors 230 is stationary, and no stack 65 of base pallets is positioned thereon ready for discharge. If the aforementioned conditions are true, transfer ram 222 is activated in the direction of arrow 215 to sweep the base pallet 145 from casing region 212 toward pallet stacking apparatus 200. Base pallet transfer ram 222 will engage sensor X21 and continue to move sufficiently to ensure the detection of sensor X21 is secured; at such point transfer ram 222 will stop with the base pallet 145 under box 260.

The automatic control system, in detecting ram 222 at a stationary forward position, will then check to determine whether or not conveyor $210_3$ is stationary and empty. If so, transfer ram 222 is activated in the reverse direction to that of arrow 215 and, upon hitting sensor X12, transfer ram 222 will stop. The sensor control system, in detecting a base pallet successfully transferred from conveyor $210_3$ to conveyor $230_2$, will activate fork assembly 265 to ascend along the Z-axis to the "intermediate" position, lifting the base pallet along with it. When the fork assembly 265 engages sensor X15, fork assembly 265 stops. At this point, the pallet is lifted to a level just below the pallet stack holder 260 (see FIGS. 45 and 47). The central control system, in sensing that the stacking fork assembly 265 is at its "intermediate" position, activates pallet holder members 270,272 in the reverse direction, retracting them, thereby dropping any pallets stacked on holders 270,272 onto fork assembly 265. When members 270,272 engage sensor X19, retraction movement will be stopped. The automatic control system, in sensing that the fork assembly 265 is at its "intermediate" level, and the pallet holding members 270,272 in their "retracted" position, will activate fork assembly 265 to further ascend along the Z-axis to move the pallets stacked thereon, thereby lifting the stack of base pallets to a level where the lowest base pallet in stack 275 is positioned above members 270,272. When fork assembly 265 engages sensor X16, and sensing of sensor X16 is secured, fork assembly 265 will stop. The automatic control system, in detecting the fork assembly 265 stationary above members 270,272 and, assuming sensor X17 has not detected a "full" stack, will activate members 270,272 to extend to their "holding" position. Upon members 270,272 engaging sensor X18, such members will be prepared to receive the stacked pallets deposited by fork assembly 265.

The automatic control system will then check to determine whether or not the following conditions are true: (1) stacking fork assembly 265 is at its "up" position; (2) sensor X17 does not detect a full stack of base pallets carried by fork assembly 265; (3) pallet stack holding members 270,272 are extended; (4) discharge conveyor $230_{1-2}$ is stationary and sensor X13 does not sense a stack of base pallets to be discharged; and (5) transfer ram 222 is not moving in the direction of arrow 215. If the aforementioned conditions are true, pallet stacking fork assembly 265 is activated to descend along the Z-axis to move it to its ™ down ™ position. As fork assembly 265 passes between members 270 272, the stacked base pallets 275 are deposited on members 270,272. When fork assembly 265 engages sensor X14, the control system will determine that the fork assembly 265 is at its down position and will stop movement thereof.

Stacking fork assembly will also be activated to descend along the Z-axis under the following set of conditions: (1) pallet stacking fork assembly 265 is stationary at its "up" position; (2) stack 275 of base pallets being carried by fork assembly 265 is of sufficient height to engage sensor X17; (3) holding members 270,272 are stationary in their retracted position; (4) discharge conveyor $230_{1-2}$ is stationary, sensor X13 does not detect a stack of base pallets to be discharged, and sensor X20 does not detect a stack of base pallets that has been discharged but not yet taken away; and (5) pallet transfer ram 222 is not moving in the forward direction. Under the above conditions, since members 270,272 are in the retracted position, the stack of pallets on fork assembly 265 will be lowered onto conveyor $230_2$. Once sensor X13 detects the presence of a stack on conveyor $230_2$ and the control system determines that the pallet was not put there by transfer ram 222, and if sensor X20 does not detect a stack of base pallets to be taken away, the automatic control system will activate discharge conveyors $230_{1-2}$ to discharge the pallets in the direction of arrow 295. The stack 275 will engage sensor X20 and electronic control system will activate light X52 indicating to the system control operator that the stacked pallets are to be removed.

Under certain circumstances, transfer ram 222 may be interrupted and stopped between its reversed, home position and its forward position For safety purposes, the automatic control system allows transfer ram 222 to remain stationary at that position until a manual "home" push button is used to reactivate it. Upon receiving such manual signal, the automatic control system checks to determine whether or not the following conditions are true: (1) transfer ram 222 is stationary at neither its reversed "home" position, nor at its "forward" position; and (2) conveyor $210_3$ is stationary and empty. If the aforementioned conditions are true, transfer ram 222 is activated in a direction reverse of arrow 215 and stops upon sitting sensor X12.

Further, under certain circumstances, fork assembly 265 will be interrupted and stopped when it is not at its "down", "intermediate", or "up" position. For safety purposes, the automatic control system allows stacking fork assembly 265 to remain stationary at that position until a manual "stacking fork home" push button is used to reactivate it. Upon receiving such signal, the automatic control system checks to determine whether or not the following conditions are true: (1) stacking fork assembly 265 is stationary and not at any of its "down, intermediate", or "up" positions; (2) conveyor $230_{1-2}$ is stationary and sensor X13 does not detect a stack of base pallets to be discharged; and (3) pallet transfer ram 222 is not moving in the forward direction. If the aforementioned conditions are true, fork assembly 265 is activated to descend to move it to its "down" position upon hitting sensor X14, since stacking fork assembly 265 will be stopped in its "down" position.

The many features and advantages of the casing structure and de-casing system of the present invention will be apparent to those skilled in the art from the description of the preferred embodiments and the drawings. The system described herein provides a readily stackable secure and stable arrangement for packing bales of compressed material, having the tendency to expand, in a convenient warehouse-type arrangement. The casing structure described herein provides an inherently stable structure which eliminates the need for strapping of bales of large material, such as tobacco. The case manipulation system described herein provides an automated means for easily and quickly removing the casing structure described herein and for cohesively manipulating large volumes of encased bales. Numerous variations are possible as will be apparent to those skilled in the art; such variations are intended to be within the scope of the invention as defined by the specification and the following claims are intended to cover all the modification and its equivalent falling within the scope of the invention.

What is claimed is:

1. A casing system for storing and retrieving bales of material, comprising:
    storage means for encasing the bales of material, comprising
        a compliant sleeve, surrounding the material,
        first and second sideframes arranged at first and second opposing sides of the bale, and
        first and second slats, arranged at third and fourth opposing sides of the bale and between the first and second sideframes, the slats interlocking with the sideframes for retaining the sideframes in position; and
    automated means for removing the storage means from the bales of material, comprising
        means for positioning one or more of the bales in a de-casing region, and
        de-casing means for simultaneously securing the slats and removing the sideframes.

2. The system of claim 1 wherein the bales of material are provided to the machine in a stacked arrangement on storage pallets, and the automated means further includes
    means for stacking the sideframes, and
    means for stacking the storage pallets.

3. The system of claim 1 wherein the means for positioning includes
    tongs mounted to a positioning structure, the tongs for gripping an encased bale of material, the positioning structure being movable in both the horizontal and vertical directions for positioning the tongs at a plurality of locations;
    a support structure for the tongs and positioning structure, the support structure comprising a four poster structure of a height sufficient for positioning a stacked arrangement of bales thereunder.

4. The system of claim 1 wherein the de-casing means includes
    a shoe member for securing the slats, the shoe member being mounted to a rotational arm for positioning the shoe member on a bale;
    first and second de-casing arms, the de-casing arms being retractable into and away from the de-casing region, the arms including sub-arms for clamping the frame members to the de-casing arms;
    wherein one of the de-casing arms is rotatable to position one of the removed casing members in an interdigited relationship with respect to another of the removed casing members.

5. An automated system for removing casing structures comprised of a plurality of component parts from encased bales of material stored therein, said structures being provided to the automated system on shipping pallets, comprising:
    means for removing the casing structure from the encased material and for retaining some of the component parts of the casing structure;
    means for retrieving the encased bales from the shipping pallets and for providing the encased bales to the means for removing the casing structure;
    first means for stacking some of the component parts of removed casing structures onto shipping pallets;
    means for transporting some of the component parts of the casing structure from the means for removing and retaining to the means for stacking; and
    second means for stacking the shipping pallets on which the encased bales of material are provided to the system.

6. The automated system of claim 5 further including control means for controlling the sequence and operation of said means for removing and retaining, means for retrieving and providing, means for transporting, and first and second means for stacking.

7. The automated system of claim 6 wherein
    said component parts of said casing structure comprise a compliant sleeve, surrounding the material, first and second sideframes arranged at first and second opposing sides of the bale, and first and second slats, arranged at third and fourth opposing sides of the bale and between the first and second sideframes, the slats interlocking with the sideframes for retaining the sideframes in position, and said means for removing and retaining includes first and second frame removal members, said sideframe removal members removing and retaining said sideframes for said means for transporting.

8. The automated system of claim 7 wherein said first frame removal member is rotatable, and said first and second frame removal members mounted to be positionable between an open position, wherein the members may surround an encased bale, and a closed position, wherein the members provide the sideframes in an interdigited relationship when said first frame removal member is rotated.

9. The automated system of claim 7 wherein said means for providing includes a tong structure mounted to a positioning structure, the positioning structure being movable in both the horizontal and vertical directions for positioning the tongs at a plurality of locations between an un-loading region and a de-casing region, the de-casing region being adjacent the frame removal members, the tong structure for gripping an encased bale of material and lifting the encased bale from the un-loading region to the de-casing region;

a support structure for the tongs and positioning structure, the support structure comprising a four poster structure of a height sufficient for positioning a stacked arrangement of bales thereunder.

10. The automated system of claim 8 wherein said means for transporting includes a frame carrying assembly mounted on a sled provided on an overhead track, the sled being positionable on the overhead track between a location over the means for removing and retaining, and a location over the first means for stacking, said frame carrying assembly further being vertically positionable at high, intermediate, and low positions, the high position for transporting the sideframes, the low position for retrieving the sideframes from the frame removal members, and the intermediate position for providing said sideframes to the first stacking means.

* * * * *